(12) United States Patent
Lombardi

(10) Patent No.: US 9,403,944 B2
(45) Date of Patent: Aug. 2, 2016

(54) ANTIPATHOGENIC GUANIDINIUM COPOLYMER

(71) Applicant: John L. Lombardi, Tucson, AZ (US)

(72) Inventor: John L. Lombardi, Tucson, AZ (US)

(*) Notice: Subject to any disclaimer, the term of this patent is extended or adjusted under 35 U.S.C. 154(b) by 0 days.

(21) Appl. No.: 14/372,207

(22) PCT Filed: Jan. 14, 2013

(86) PCT No.: PCT/US2013/021495
§ 371 (c)(1),
(2) Date: Jul. 14, 2014

(87) PCT Pub. No.: WO2013/106863
PCT Pub. Date: Jul. 18, 2013

(65) Prior Publication Data
US 2015/0011716 A1    Jan. 8, 2015

Related U.S. Application Data

(60) Provisional application No. 61/585,807, filed on Jan. 12, 2012, provisional application No. 61/645,529, filed on May 10, 2012.

(51) Int. Cl.
C08G 73/02        (2006.01)

(52) U.S. Cl.
CPC ............ *C08G 73/0206* (2013.01); *C08G 73/02* (2013.01)

(58) Field of Classification Search
CPC . C08G 73/02; C08G 73/0206; C08G 73/0213
USPC ...................................................... 525/540
See application file for complete search history.

(56) References Cited

U.S. PATENT DOCUMENTS

| | | | |
|---|---|---|---|
| 4,945,112 A | 7/1990 | Zipplies et al. | |
| 6,225,417 B1* | 5/2001 | Imashiro | C08G 18/025 525/452 |
| 9,000,105 B2* | 4/2015 | Lombardi | A01N 47/44 525/540 |
| 2004/0058202 A1* | 3/2004 | Payne | B41J 11/0015 428/704 |
| 2009/0130052 A1* | 5/2009 | Schmidt | A01N 47/44 424/78.37 |
| 2009/0182118 A1 | 7/2009 | Nyzhnyk et al. | |
| 2011/0003689 A1* | 1/2011 | Rosslenbroich | A01N 47/44 504/100 |
| 2011/0257321 A1* | 10/2011 | Peretolchin | C08G 73/0644 524/413 |
| 2011/0269936 A1 | 11/2011 | Tets et al. | |
| 2014/0228528 A1* | 8/2014 | Schmidt | A01N 47/44 525/540 |
| 2015/0011716 A1* | 1/2015 | Lombardi | C08G 73/02 525/540 |

(Continued)

FOREIGN PATENT DOCUMENTS

| | | |
|---|---|---|
| CN | 101715780 | 6/2010 |
| WO | 2011135577 | 11/2011 |

OTHER PUBLICATIONS

Zhou, Z. et al., "Extensive in vitro activity of guanidine hydrochloride polymer analogs against antibiotics-resistant clinically isolated strains", Materials Science and Engineering: C., 2011, vol. 31, pp. 1836-1843.

(Continued)

*Primary Examiner* — Mike M Dollinger
(74) *Attorney, Agent, or Firm* — Dale F. Regelman; Quarles & Brady LLP

(57) ABSTRACT

An antipathogenic copolymer 122, formed by the process of heating hexamethylenediamine HMDA 102, bis(hexamethylene)triamine BHMT 104, guanidinium hydrochloride 106.

5 Claims, 45 Drawing Sheets

(56) References Cited

U.S. PATENT DOCUMENTS

2015/0071982 A1* 3/2015 Lee ............... A61L 27/34 424/423
2015/0376336 A1* 12/2015 Lombardi ............. C08G 73/02 525/540

OTHER PUBLICATIONS

PCT/US2013/021495—Search Report and Written Opinion dated May 13, 2013.

PCT/US2013/021495—International Preliminary Report on Patentability dated Jul. 24, 2014.

* cited by examiner

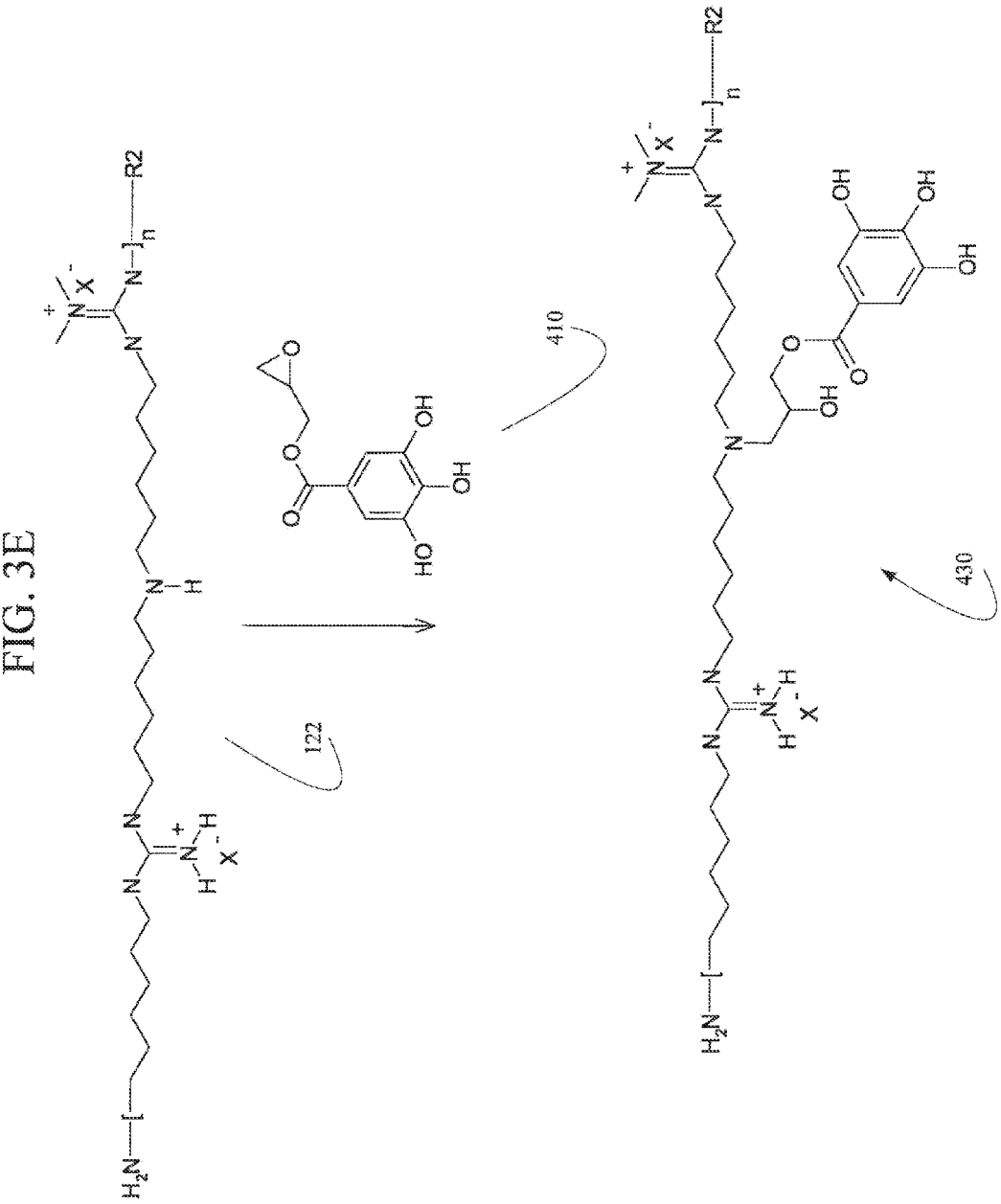

ANTIPATHOGENIC GUANIDINIUM COPOLYMER

TECHNICAL FIELD

Applicant's invention relates to a guanidinium polymer that is effective as a broad-spectrum disinfectant capable of immobilizing and/or killing pathogens, including active bacteria and dormant bacteria spores.

BACKGROUND ART

The presence of certain types of bacteria and other pathogens, whether airborne or on exposed surfaces, creates a health risk. These pathogens may be naturally occurring in the environment or may be introduced by a sick or infected personal or animal. The risk of harm from pathogens is particularly a concern in healthcare settings, such a hospitals and nursing homes, where individuals are more likely to have weakened immune systems. Certain pathogens may be "weaponized," and used as biological agents against both civilian and military personnel. These include anthrax (*Bacillus anthracis*) and botulinum (*Clostridium botulinum*).

To minimize the risk of harm as a result of exposure to bacteria, it has been a goal to develop substances and/or treatments that are effective in reducing or eliminating harmful bacteria. For instance, disinfectants are commonly applied to surfaces (i.e., floors, walls, work surfaces, and the like) to reduce or eliminate any exposed bacteria. These disinfectants, however, generally reside only on the surface and are, as such, easily washed away or otherwise removed. Such disinfectants must be periodically reapplied to maintain their effectiveness.

Bacteria exist in either an active or a dormant state. In the active state, often referred to as the "vegetative state," the bacteria is capable of growing and reproducing. It is in this state that the bacteria causes infections and illnesses. In the dormant state, often referred to as "spores," "endospores" or "microbial cysts," the bacteria is surrounded by a very tough outer coating. A bacteria spore requires little or no nutrients, can survive for a long period of time in harsh conditions, and is resistant to ultraviolet radiation, high and low temperature extremes, desiccation, and most chemical disinfectants. As such, disinfectants may be highly effective against bacteria in the vegetative state, but generally have little or no effect on the same bacteria in the dormant state. Strong oxidants, such as peroxyacetic acid, are capable of killing spores, but have the disadvantages of a limited shelf life, an unpleasant odor, and causing irritation to the skin, eyes, and respiratory system upon exposure.

Accordingly, it would be an advance in the state of the art to provide an antipathogenic composition that is (i) capable of effectively killing bacteria in the vegetative state, (ii) capable of effectively killing bacteria in the dormant state, (iii) capable of retaining its antipathogenic properties over a long period of time, (iv) capable of coating hard or soft surfaces to form an antipathogenic surface, (v) effective in relatively small concentrations, and (vi) capable of receiving various functional compounds to enhance the efficacy against vegetative and dormant bacteria and non-bacterial pathogens.

BRIEF DESCRIPTION OF THE DRAWINGS

The invention will be more fully understood by referring to the following Detailed Description of Specific Embodiments in conjunction with the Drawings, of which:

FIG. 3E illustrates Applicant's gallate-modified antipathogenic co-polymer 430;

FIG. 17(*b*) illustrates a spore coat comprising a hydroxyl functional group;

DETAILED DESCRIPTION OF SPECIFIC EMBODIMENTS

Referring to the foregoing paragraphs, this invention is described in preferred embodiments in the following description with reference to the Figures, in which like numerals represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the above description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 27:
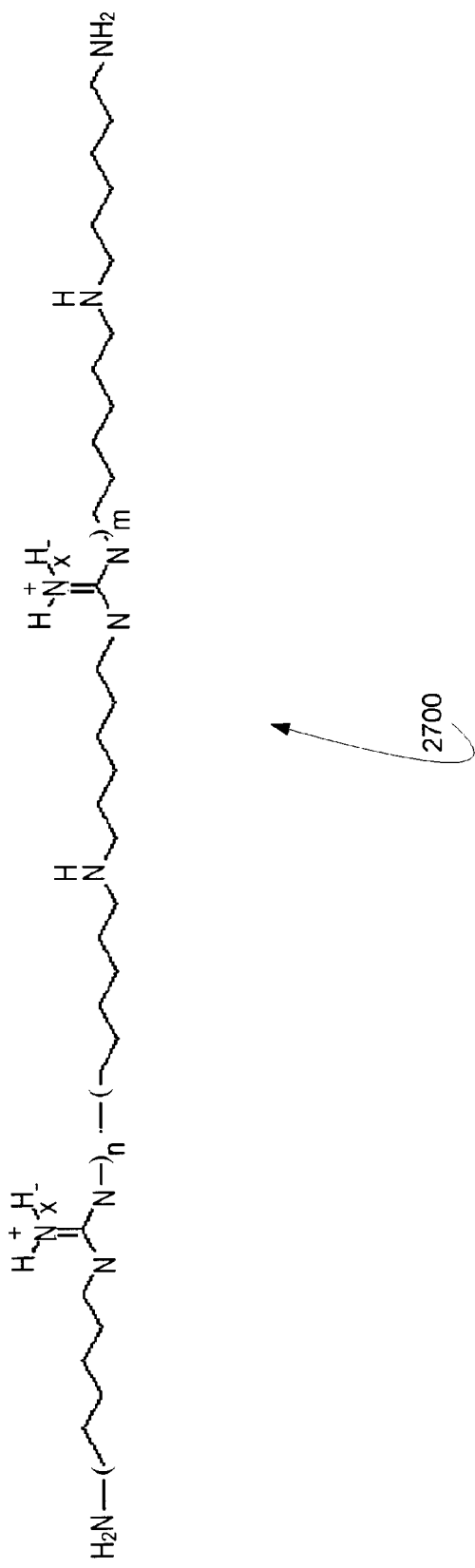
FIG. 27 shows polymer 2700 formed by heating hexamethylenediamine, bis(hexamethylene)triamine, and guanidinium hydrochloride to form.

Referring now to FIG. 27, in certain embodiments Applicant reacts about one equivalent each of hexamethylenediamine (HMDA) 102, bis(hexamethylene)triamine (BHMT) 104, and guanidinium hydrochloride 106 under heat to form polymer 2700 (FIG. 27) wherein (n) is between 1 and about 100, and wherein m is between 1 and about 100. Ammonia 110 is eliminated as a byproduct of the reaction product.

Figure 1A:
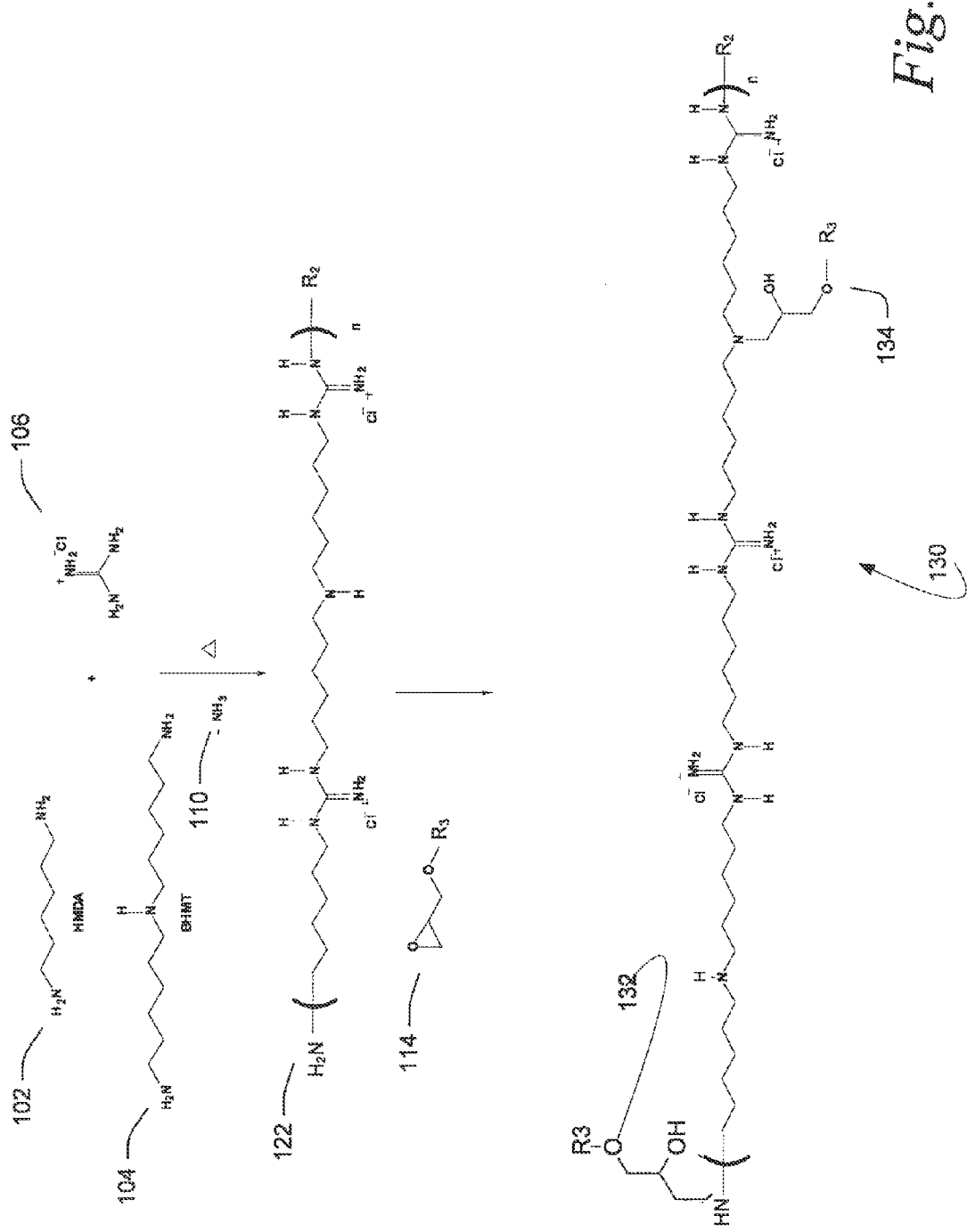
FIG. 1A summarizes the chemical components and multi-step reaction used to make one embodiment of Applicant's antipathogenic co-polymer 130.

Referring to FIG. 1A, co-polymer 122 comprises a plurality of guanidinium salt moeities. In certain embodiments, Applicant reacts the co-polymer 122 with a substituted epoxide. In certain embodiments, the epoxide is a substituted glycidyl ether 114. In various embodiments, the epoxide is an epoxy ester or related epoxide derivative. In various other embodiments, the epoxide is an epoxy silane ester, which enables Applicant's co-polymer to adhere to various hard and soft surfaces (e.g. glass, metal, ceramics, fabrics).

The epoxide group on the glycidyl ethers 114 reacts with either a terminal primary amine to give an adduct 132, or with an internal secondary amine to give an adduct 134, or with both one or more primary amines and one or more secondary amines.

In one embodiment, the repeat unit (n) of Applicant's co-polymer 130 is equal to or greater than 2. In one embodiment, the repeat unit (n) of Applicant's co-polymer 128 is less than 10. In one embodiment, the repeat unit (n) of Applicant's co-polymer 130 is about 10. In one embodiment, the repeat unit (n) of Applicant's co-polymer 128 is greater than 10.

Each repeat unit (n) of Applicant's co-polymer 130 may contain different arrangements of HMDA, BHMT, guanidinium salt, and glycidyl ester functional groups, and adjacent repeat units may differ in the particular order of these components. In various embodiments, Applicant's co-polymer 130 is linear, branched, or a combination thereof. In one embodiment, the guanidinium salt is guanidinium thiocyanate (CAS number 593-84-0). In one embodiment, a guanidinium derivative, such as guanidinium hydroxide or guanidinium carbonate, is used in place of the guanidinium hydrochloride shown.

Figure 1B:
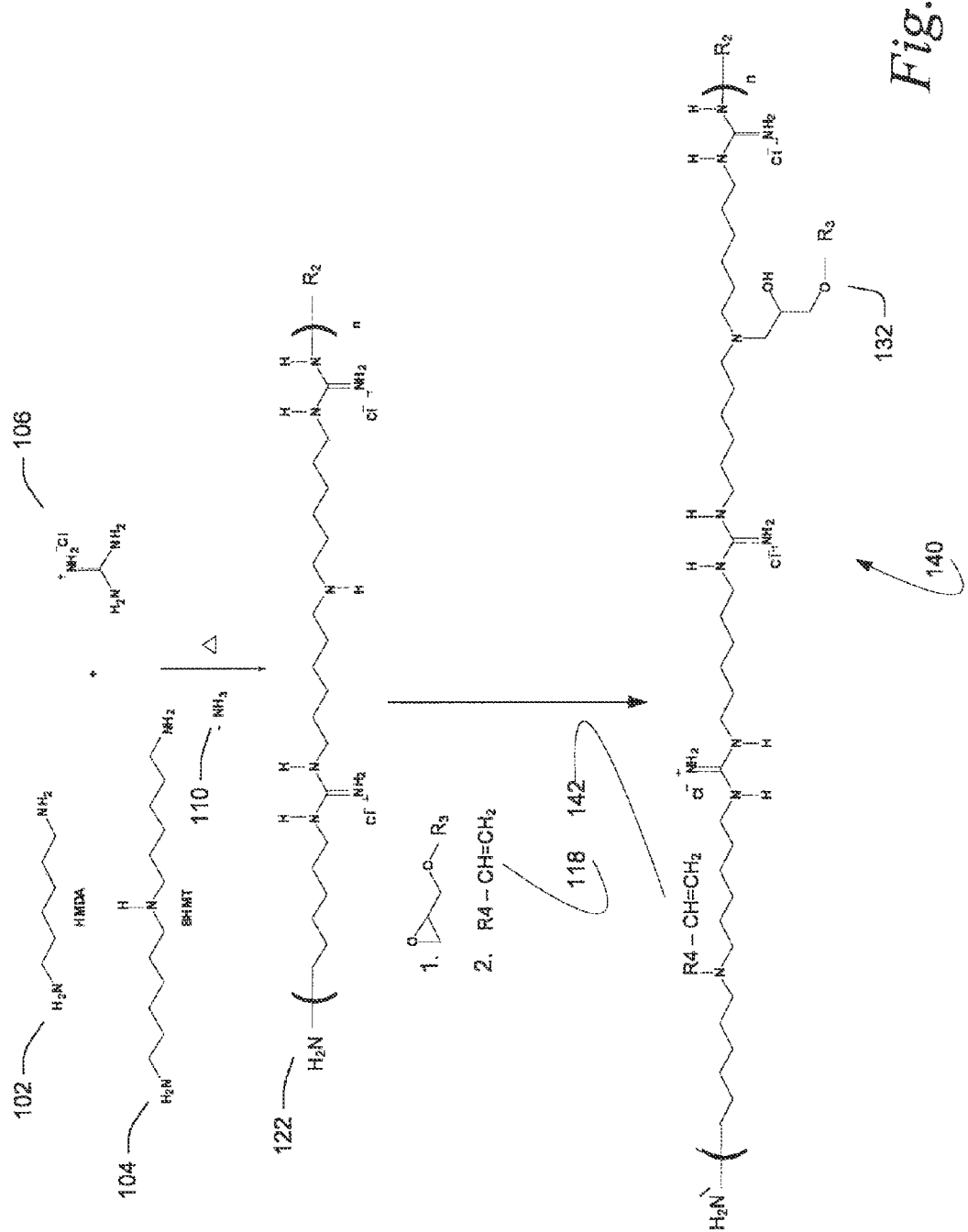
FIG. 1B summarizes the chemical components and multi-step reaction used to make one embodiment of Applicant's antipathogenic co-polymer 140.

Referring to FIG. 1B, in certain embodiments, Applicant reacts the co-polymer 122 with a substituted epoxide 114 and with a compound 118 comprising a group R4 attached to a terminal alkene moeity. In certain embodiments, the terminal alkene moiety is selected from the group consisting of moeity 121, 123, 125, 127, and 129.

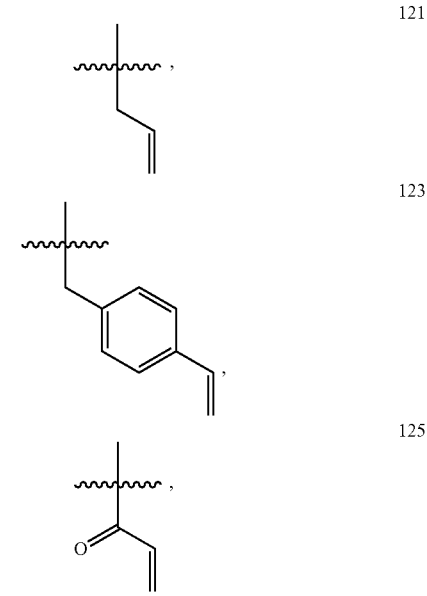

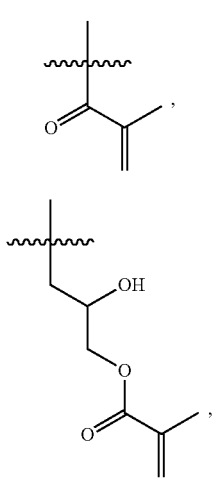

In certain embodiments, group R4 comprises a substituted epoxide. In certain embodiments, group R4 comprises a glycidyl epoxide.

The epoxide 114 and/or compound 118 reacts with internal secondary amines to give a co-polymer 140. In one embodiment, the repeat unit (n) of Applicant's co-polymer 140 is equal to or greater than 2. In one embodiment, the repeat unit (n) of Applicant's co-polymer 140 is less than 10. In one embodiment, the repeat unit (n) of Applicant's co-polymer 140 is about 10. In one embodiment, the repeat unit (n) of Applicant's co-polymer 140 is greater than 10.

Each repeat unit (n) of Applicant's co-polymer 140 may contain different arrangements of HMDA, BHMT, guanidinium salt, and adducts 142 and 144, and adjacent repeat units may differ in the particular order of these components. In various embodiments, Applicant's co-polymer 140 is linear, branched, or a combination thereof. In one embodiment, the guanidinium salt is guanidinium thiocyanate (CAS number 593-84-0). In one embodiment, a guanidinium derivative, such as guanidinium hydroxide or guanidinium carbonate, is used in place of the guanidinium hydrochloride shown.

Figure 1C:
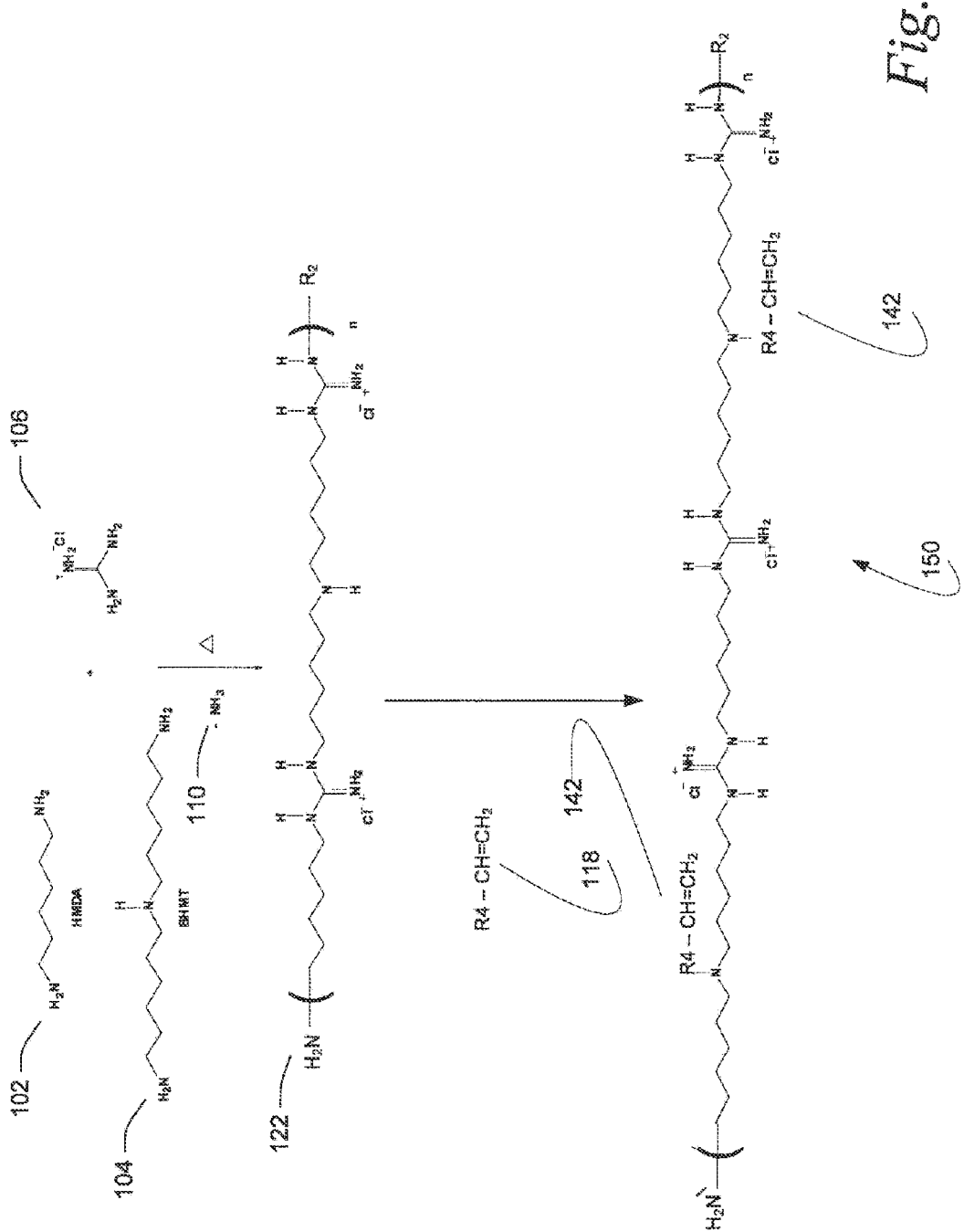
FIG. 1C summarizes the chemical components and multi-step reaction used to make one embodiment of Applicant's antipathogenic co-polymer 150.
Figure 1D:
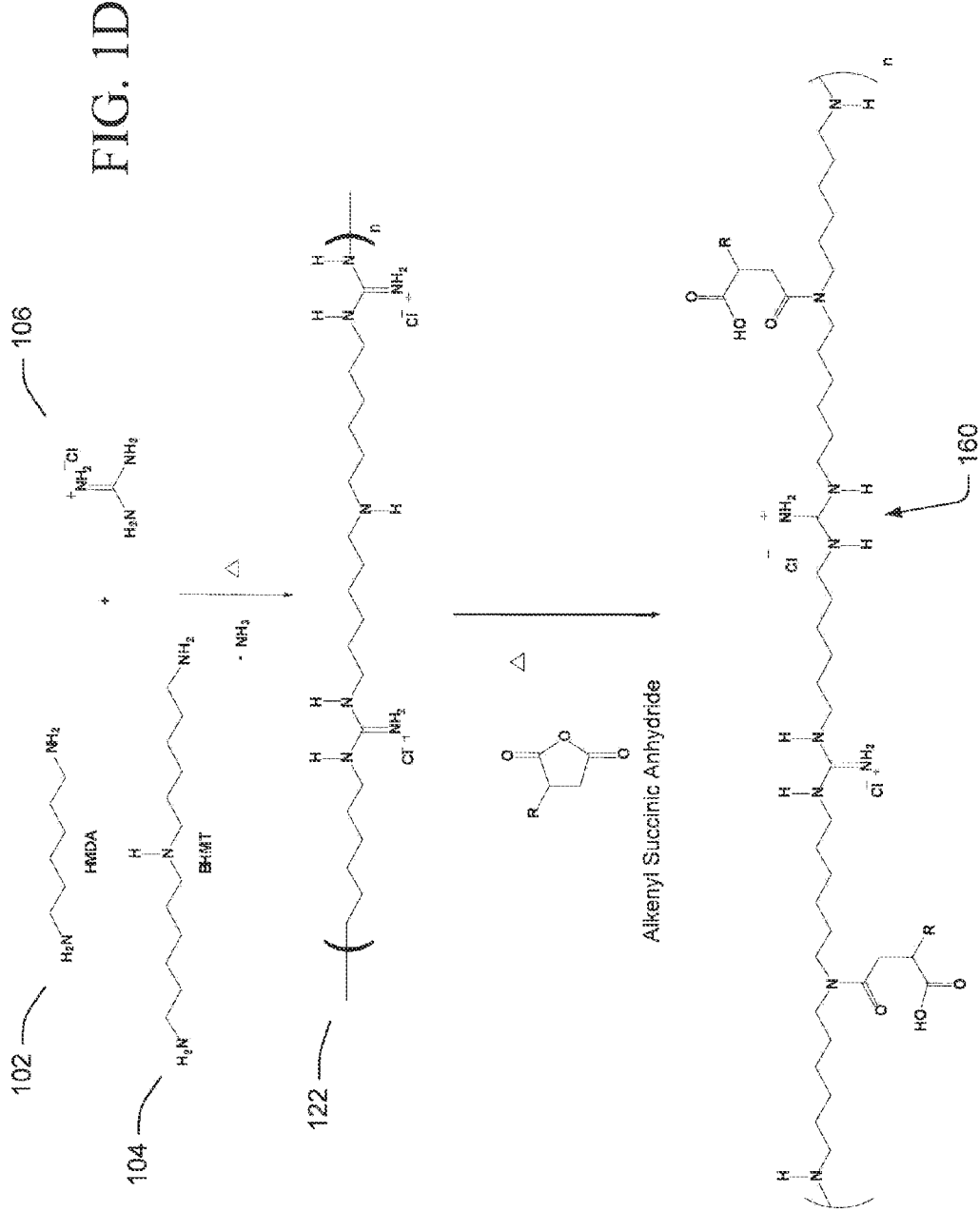
FIG. 1D summarizes the chemical components and multi-step reaction used to make one embodiment of Applicant's antipathogenic co-polymer 160.

Referring to FIG. 1C, in certain embodiments, Applicant reacts the co-polymer 122 with compound 118 comprising a group R4 attached to a terminal alkene moeity. In certain embodiments, the terminal alkene moiety is selected from the group consisting of moeity 121, 123, 125, 127, and 129.

Compound 118 reacts with internal secondary amines to give a co-polymer 150. In one embodiment, the repeat unit (n) of Applicant's co-polymer 150 is equal to or greater than 2. In one embodiment, the repeat unit (n) of Applicant's co-polymer 150 is less than 10. In one embodiment, the repeat unit (n) of Applicant's co-polymer 150 is about 10. In one embodiment, the repeat unit (n) of Applicant's co-polymer 150 is greater than 10.

Each repeat unit (n) of Applicant's co-polymer 150 may contain different arrangements of HMDA, BHMT, guanidinium salt, and adduct 142, and adjacent repeat units may differ in the particular order of these components. In various embodiments, Applicant's co-polymer 150 is linear, branched, or a combination thereof. In one embodiment, the guanidinium salt is guanidinium thiocyanate (CAS number 593-84-0). In one embodiment, a guanidinium derivative, such as guanidinium hydroxide or guanidinium carbonate, is used in place of the guanidinium hydrochloride shown.

Figure 2A:
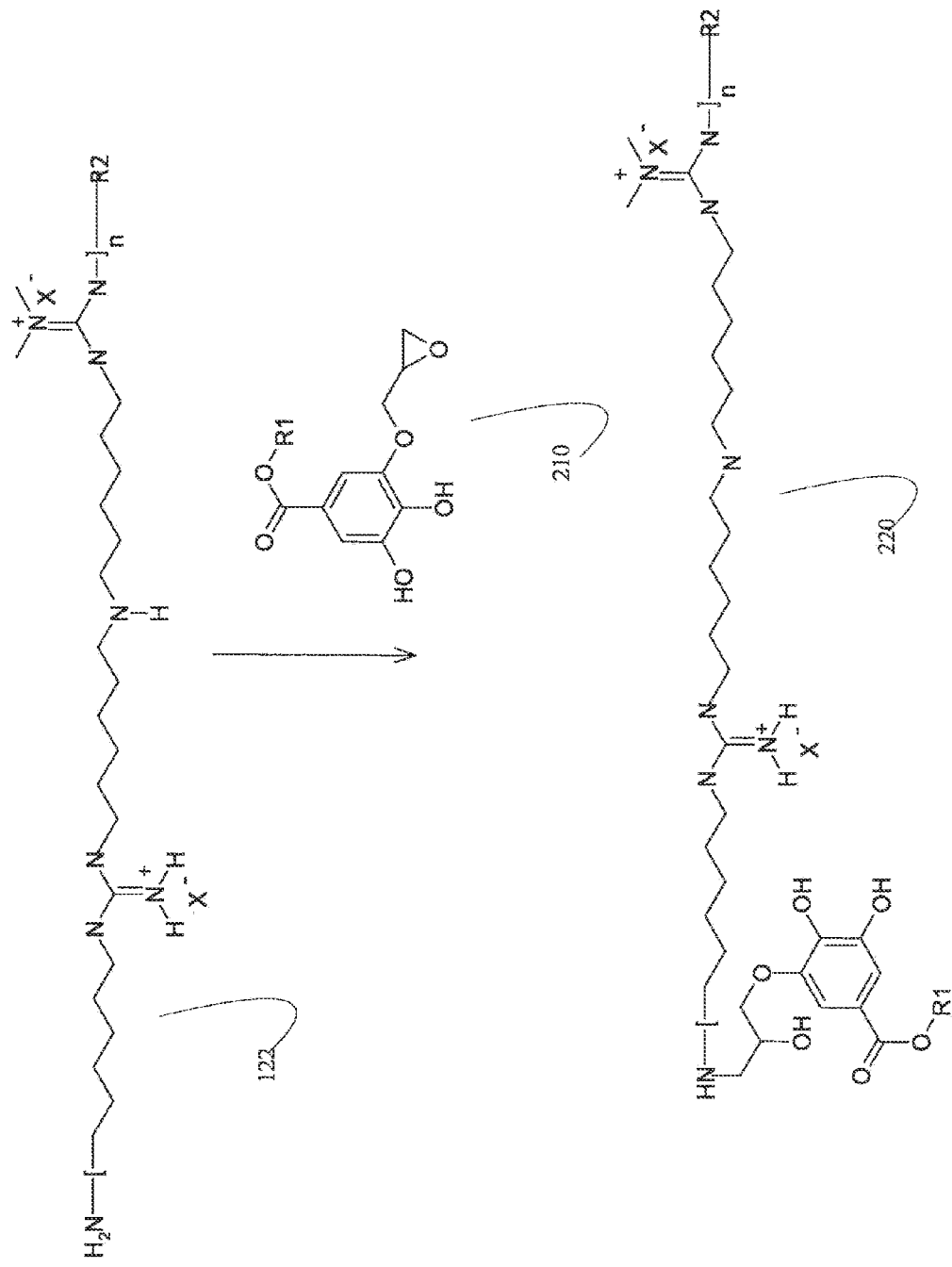
FIG. 2A illustrates Applicant's gallate-modified antipathogenic co-polymer 220.

Referring to FIG. 2A, in certain embodiments Applicant reacts guanidinium salt-containing polymer 122 with a gallate ester-derived epoxide 210 to give a substituted guanidinium salt copolymer 220. Each repeat unit (n) of Applicant's co-polymer 220 may contain different arrangements of HMDA, BHMT, guanidinium salt, and gallate ester functional groups, and adjacent repeat units may differ in the particular order of these components. In various embodiments, Applicant's co-polymer 220 is linear, branched, or a combination thereof.

Figure 2B:
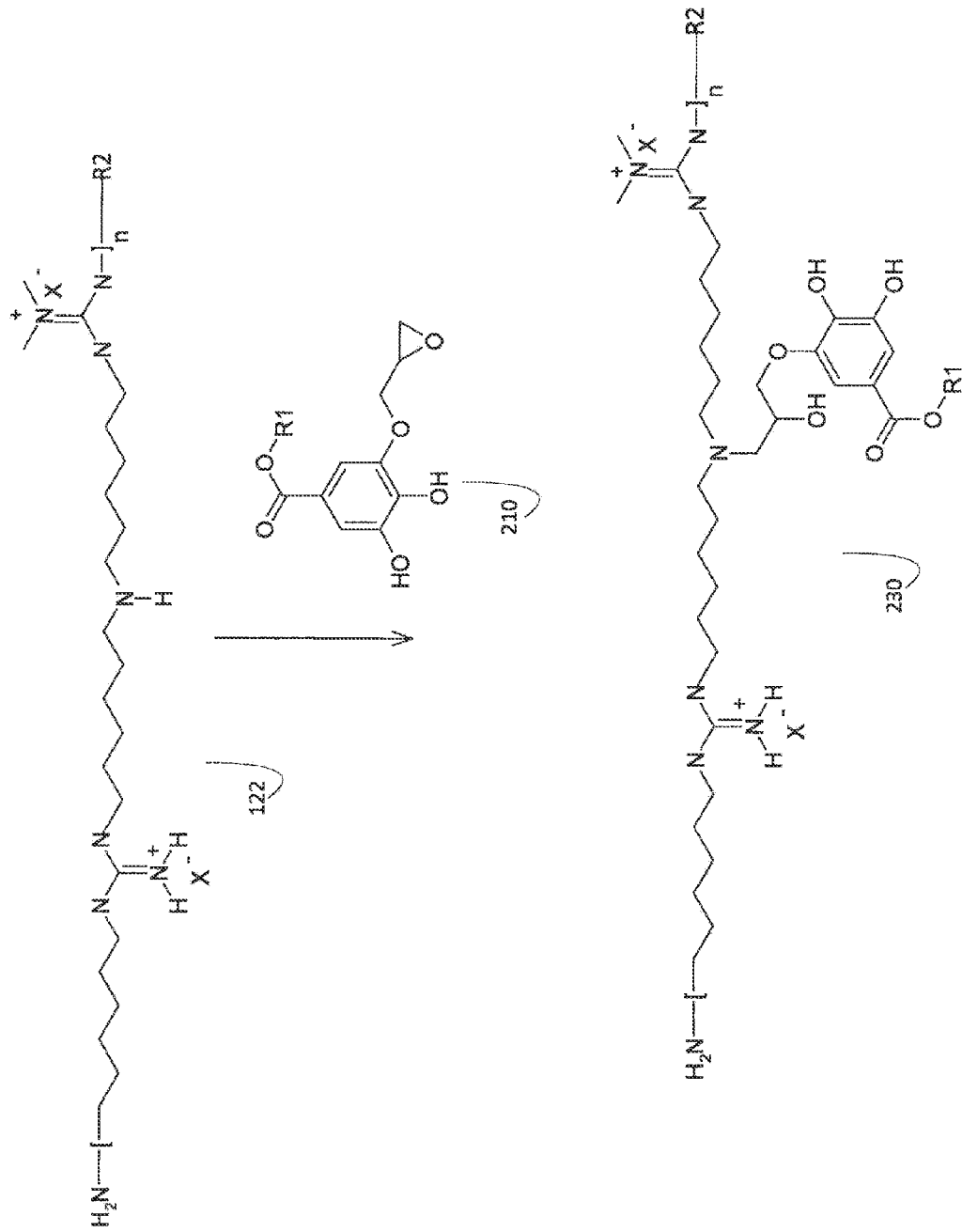
FIG. 2B illustrates Applicant's gallate-modified antipathogenic co-polymer 220.

Referring to FIG. 2B, in certain embodiments Applicant reacts guanidinium salt-containing polymer 122 with a gallate ester-derived epoxide 210 to give a substituted guanidinium salt copolymer 230. Each repeat unit (n) of Applicant's co-polymer 230 may contain different arrangements of HMDA, BHMT, guanidinium salt, and gallate ester functional groups, and adjacent repeat units may differ in the particular order of these components. In various embodiments, Applicant's co-polymer 230 is linear, branched, or a combination thereof.

Figure 2C:
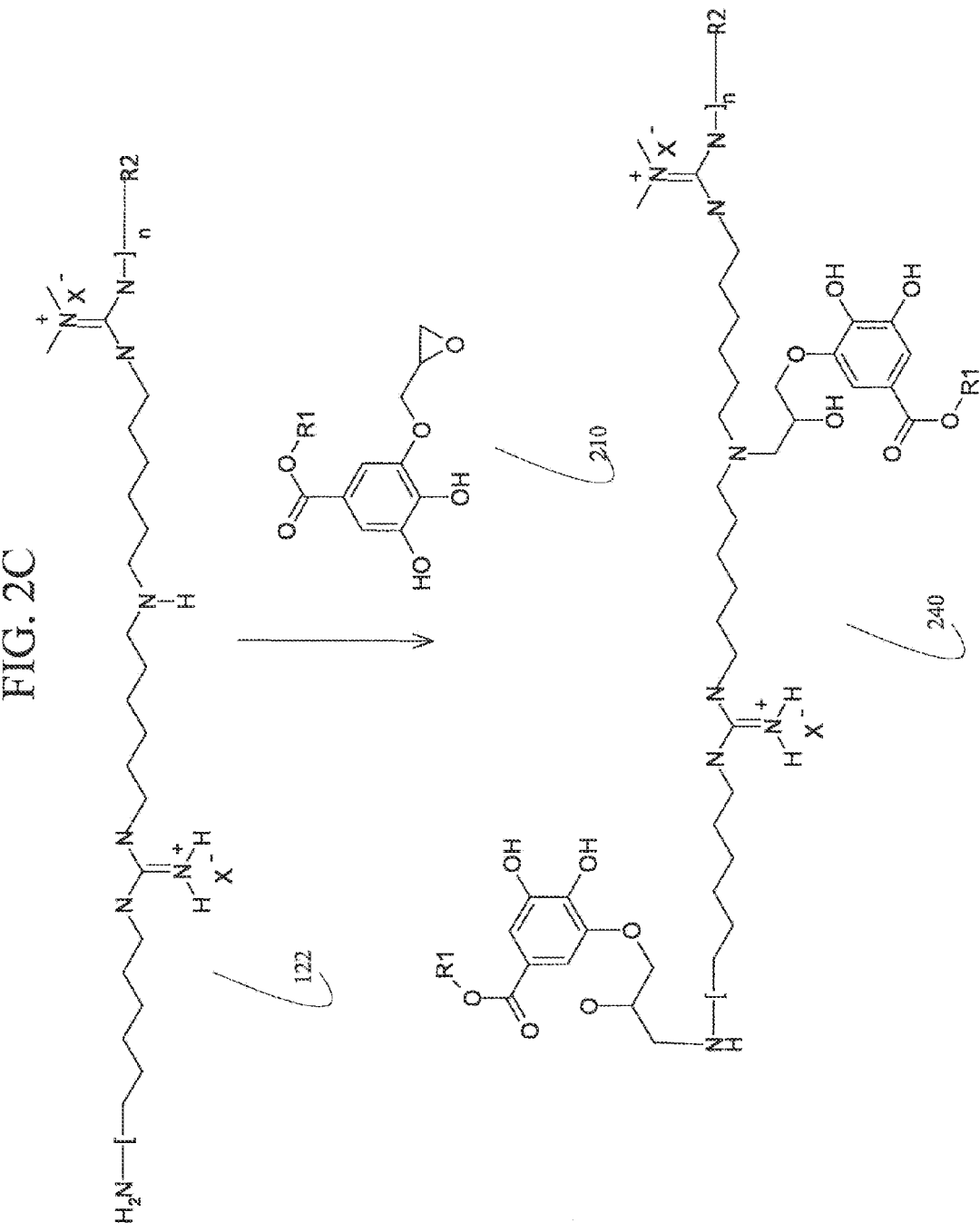
FIG. 2C illustrates Applicant's gallate-modified antipathogenic co-polymer 240.

Referring to FIG. 2C, in certain embodiments Applicant reacts guanidinium salt-containing polymer 122 with a gallate ester-derived epoxide 210 to give a substituted guanidinium salt copolymer 240. Each repeat unit (n) of Applicant's co-polymer 240 may contain different arrangements of HMDA, BHMT, guanidinium salt, and gallate ester functional groups, and adjacent repeat units may differ in the particular order of these components. In various embodiments, Applicant's co-polymer 220 is linear, branched, or a combination thereof.

Figure 2D:
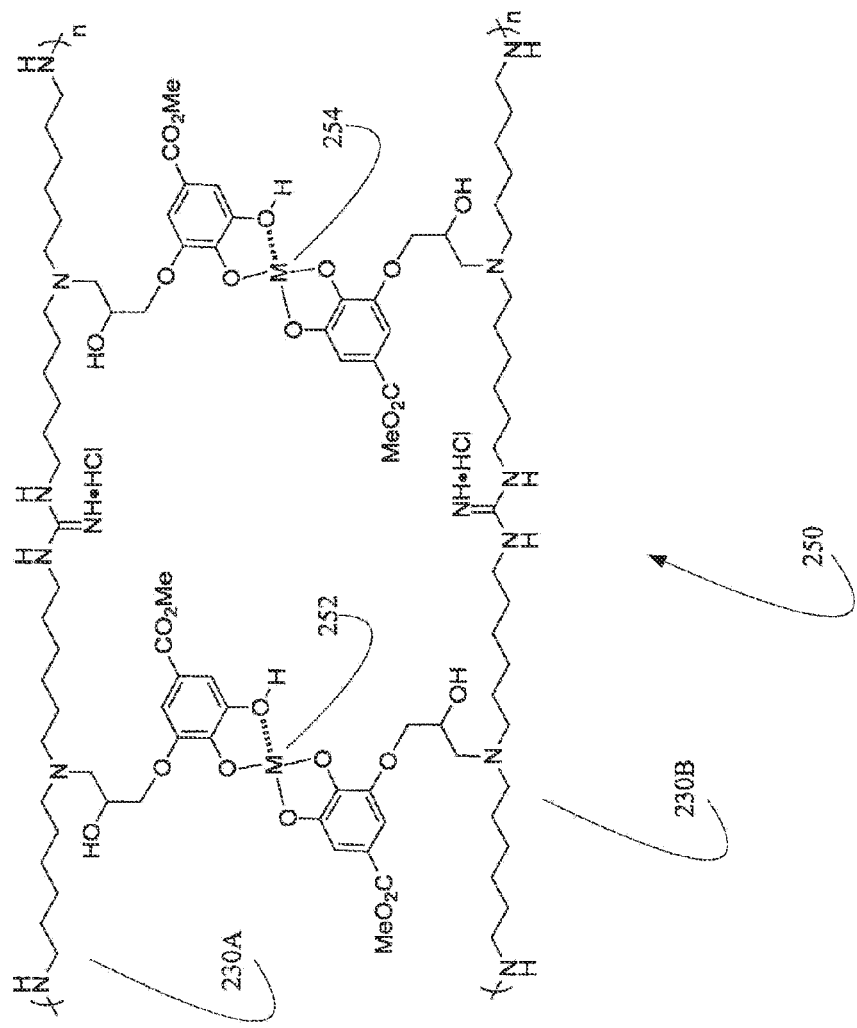
FIG. 2D illustrates two gallate-modified antipathogenic co-polymers 230 coordinated with a metal.

Referring to FIG. 2D, neighboring pendent phenolic anions on differing co-polymers 230 can coordinate with a metal ion M to form a metal complex 252/254. In embodiments wherein the metal ion comprises a trivalent metal ion, such as and without limitation, $Al^{13+}$ or $Fe^{3+}$, that metal ion is coordinated with a total of three (3) phenolic anions disposed on two different co-polymer chains, as illustrated in the coordinated metal ion in moiety 13.

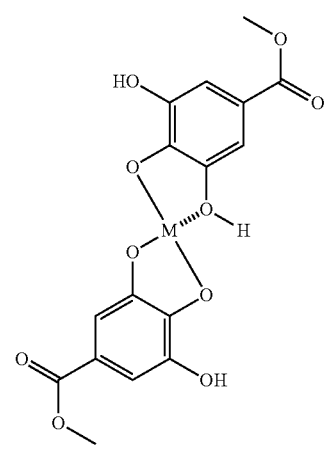

In embodiments wherein the metal ion comprises a tetravelent metal, such as and without limitation, B Si, Ti, or Zr, that metal is coordinated with a total of four (4) phenolic anions disposed on two different co-polymer chains, as illustrated in the coordinated metal ion in moiety 14.

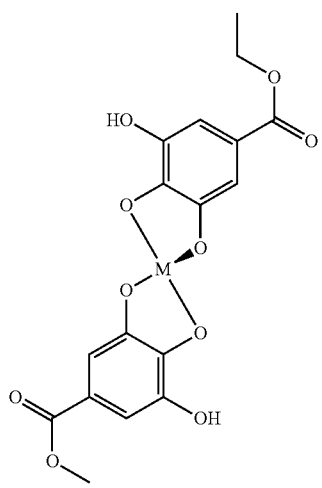

Figure 2E:
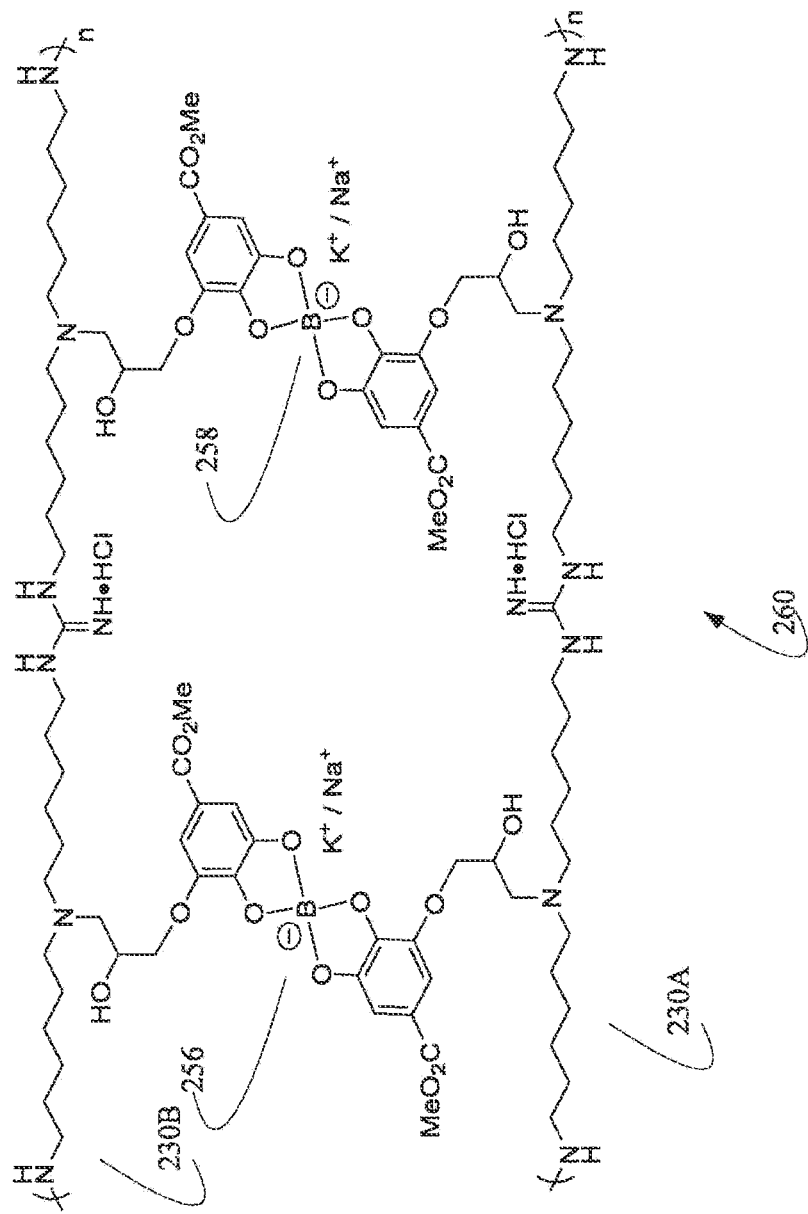
FIG. 2E illustrates two gallate-modified antipathogenic co-polymers 230 coordinated with a boron moeity.

FIG. 2E illustrates borate complexes 256/258 each formed by a boron atom and neighboring pendent phenolic anions on differing co-polymers 230. The resulting borate complex comprises a net negative charge. Therefore, in certain embodiments the borate complexes further comprise a metal cation, such as and without limitation a potassium cation or a sodium cation.

Figure 3A:
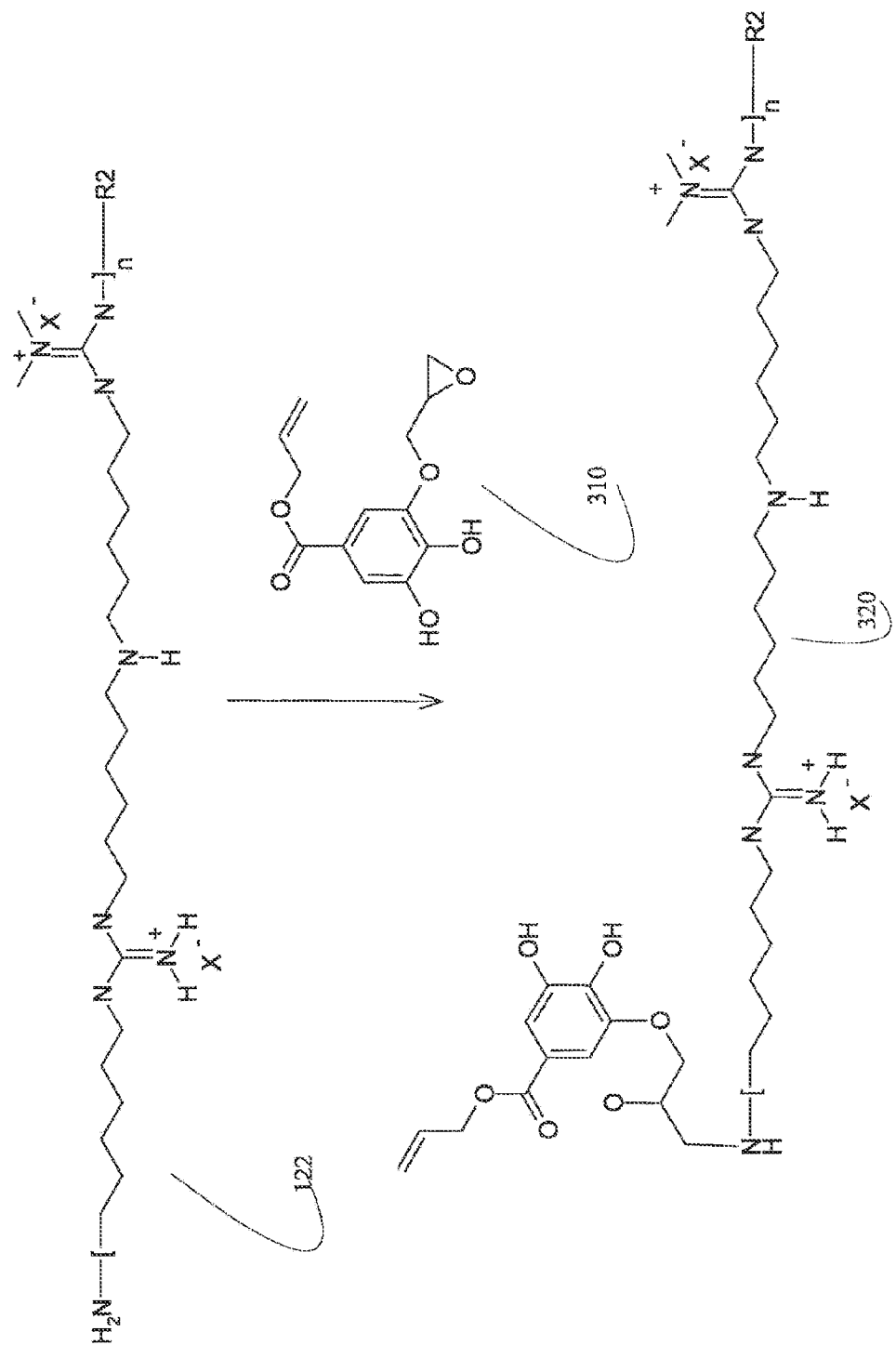
FIG. 3A illustrates Applicant's gallate-modified antipathogenic co-polymer 320.

Referring to FIG. 3A, in certain embodiments Applicant reacts guanidinium salt-containing polymer 122 with a gallate ester-derived epoxide 310 to give a substituted guanidinium salt copolymer 220. Each repeat unit (n) of Applicant's co-polymer 320 may contain different arrangements of HMDA, BHMT, guanidinium salt, and gallate ester functional groups, and adjacent repeat units may differ in the particular order of these components. In various embodiments, Applicant's co-polymer 320 is linear, branched, or a combination thereof.

Figure 3B:
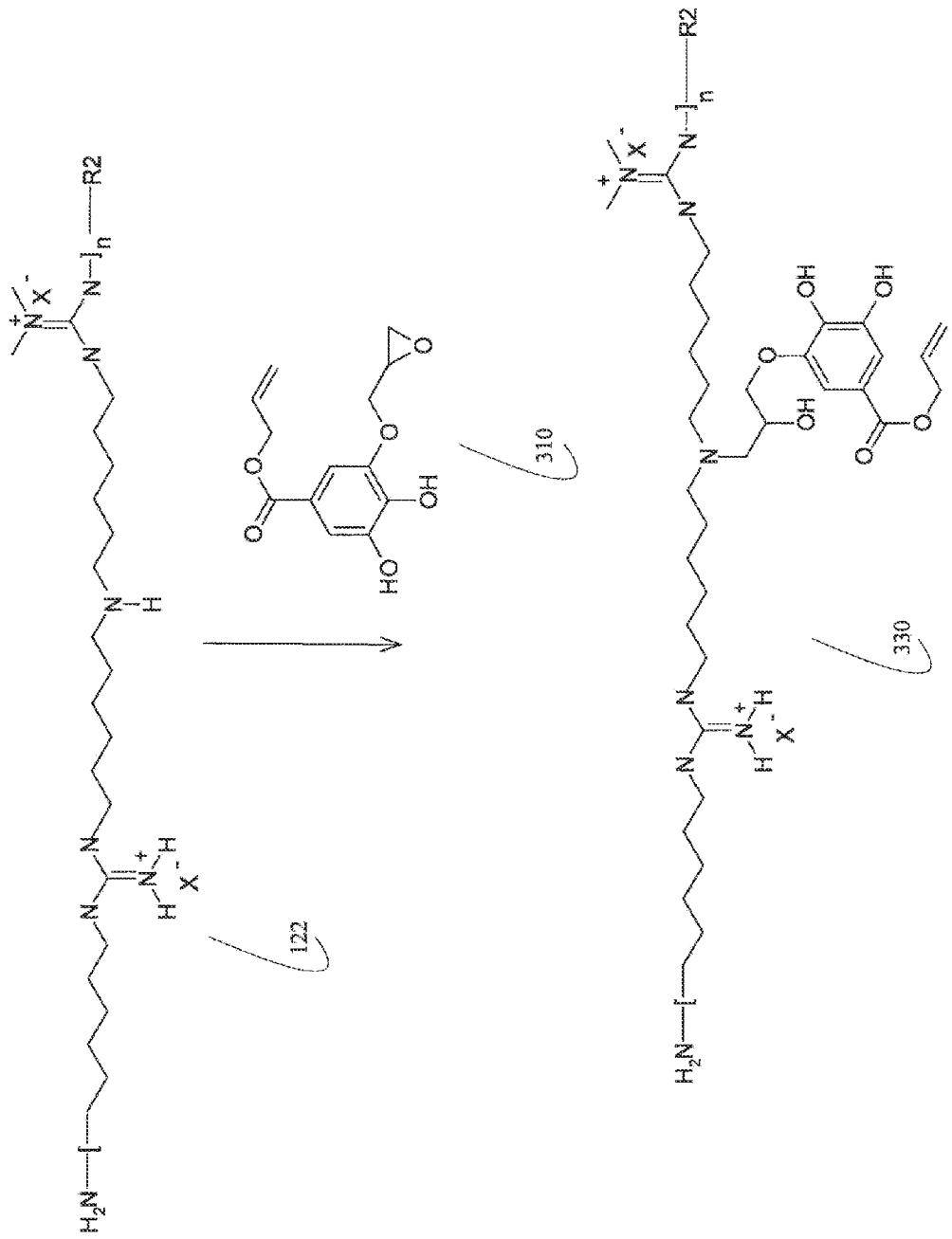
FIG. 3B illustrates Applicant's gallate-modified antipathogenic co-polymer 330.

Referring to FIG. 3B, in certain embodiments Applicant reacts guanidinium salt-containing polymer 122 with a gallate ester-derived epoxide 310 to give a substituted guanidinium salt copolymer 330. Each repeat unit (n) of Applicant's co-polymer 230 may contain different arrangements of HMDA, BHMT, guanidinium salt, and gallate ester functional groups, and adjacent repeat units may differ in the particular order of these components. In various embodiments, Applicant's co-polymer 330 is linear, branched, or a combination thereof.

Figure 3C:
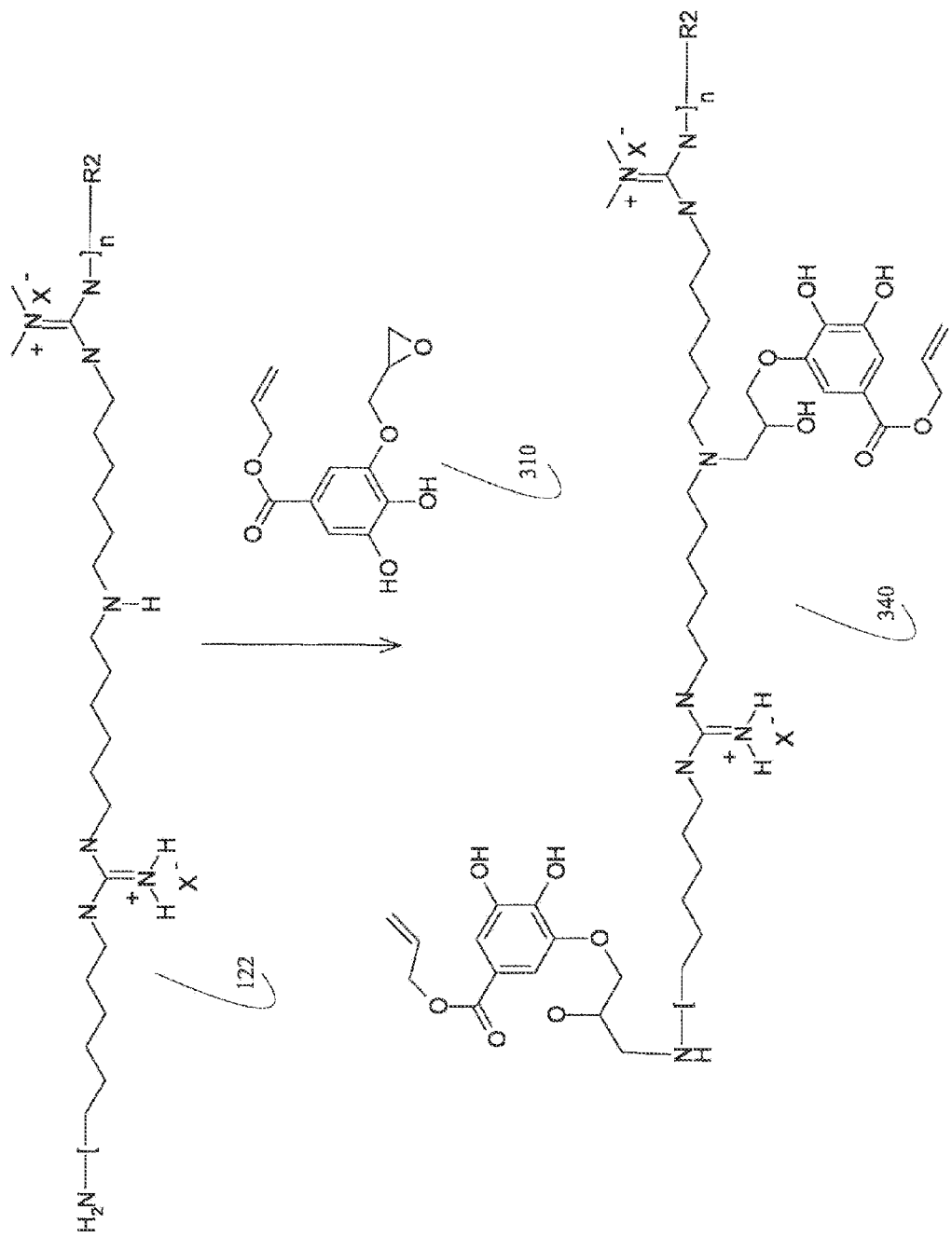
FIG. 3C illustrates Applicant's gallate-modified antipathogenic co-polymer 340.

Referring to FIG. 3C, in certain embodiments Applicant reacts guanidinium salt-containing polymer 122 with a gallate ester-derived epoxide 310 to give a substituted guanidinium salt copolymer 340. Each repeat unit (n) of Applicant's co-polymer 240 may contain different arrangements of HMDA, BHMT, guanidinium salt, and gallate ester functional groups, and adjacent repeat units may differ in the particular order of these components. In various embodiments, Applicant's co-polymer 320 is linear, branched, or a combination thereof.

Figure 3D:
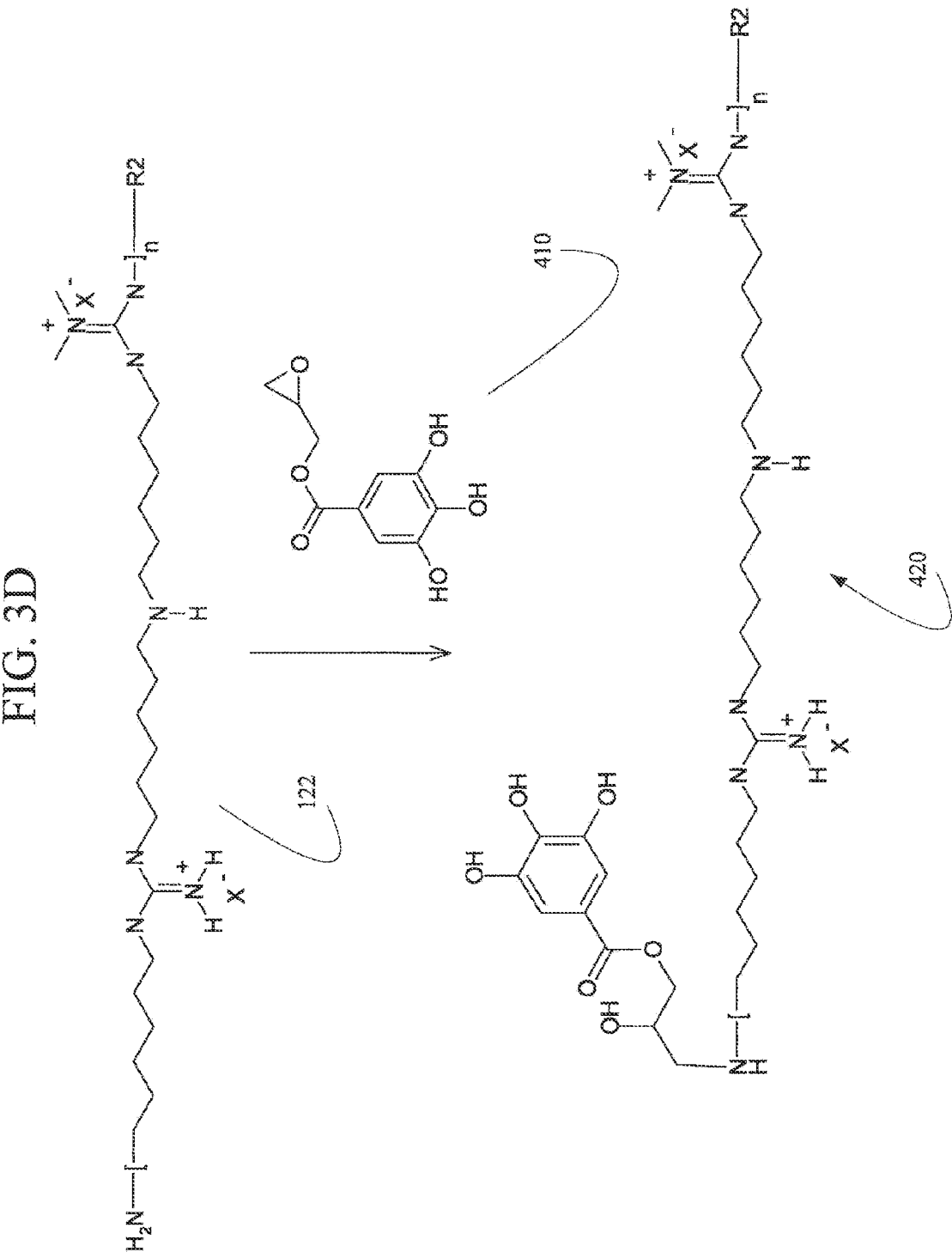
FIG. 3D illustrates Applicant's gallate-modified antipathogenic co-polymer 420.

Referring to FIG. 3D, in certain embodiments Applicant reacts guanidinium salt-containing polymer 122 with a gallate ester-derived epoxide 410 to give a substituted guanidinium salt copolymer 420. Each repeat unit (n) of Applicant's co-polymer 420 may contain different arrangements of HMDA, BHMT, guanidinium salt, and gallate ester functional groups, and adjacent repeat units may differ in the particular order of these components. In various embodiments, Applicant's co-polymer 420 is linear, branched, or a combination thereof.

Referring to FIG. 3E, in certain embodiments Applicant reacts guanidinium salt-containing polymer 122 with a gallate ester-derived epoxide 410 to give a substituted guanidinium salt copolymer 430. Each repeat unit (n) of Applicant's co-polymer 430 may contain different arrangements of HMDA, BHMT, guanidinium salt, and gallate ester functional groups, and adjacent repeat units may differ in the particular order of these components. In various embodiments, Applicant's co-polymer 430 is linear, branched, or a combination thereof.

Figure 3F:
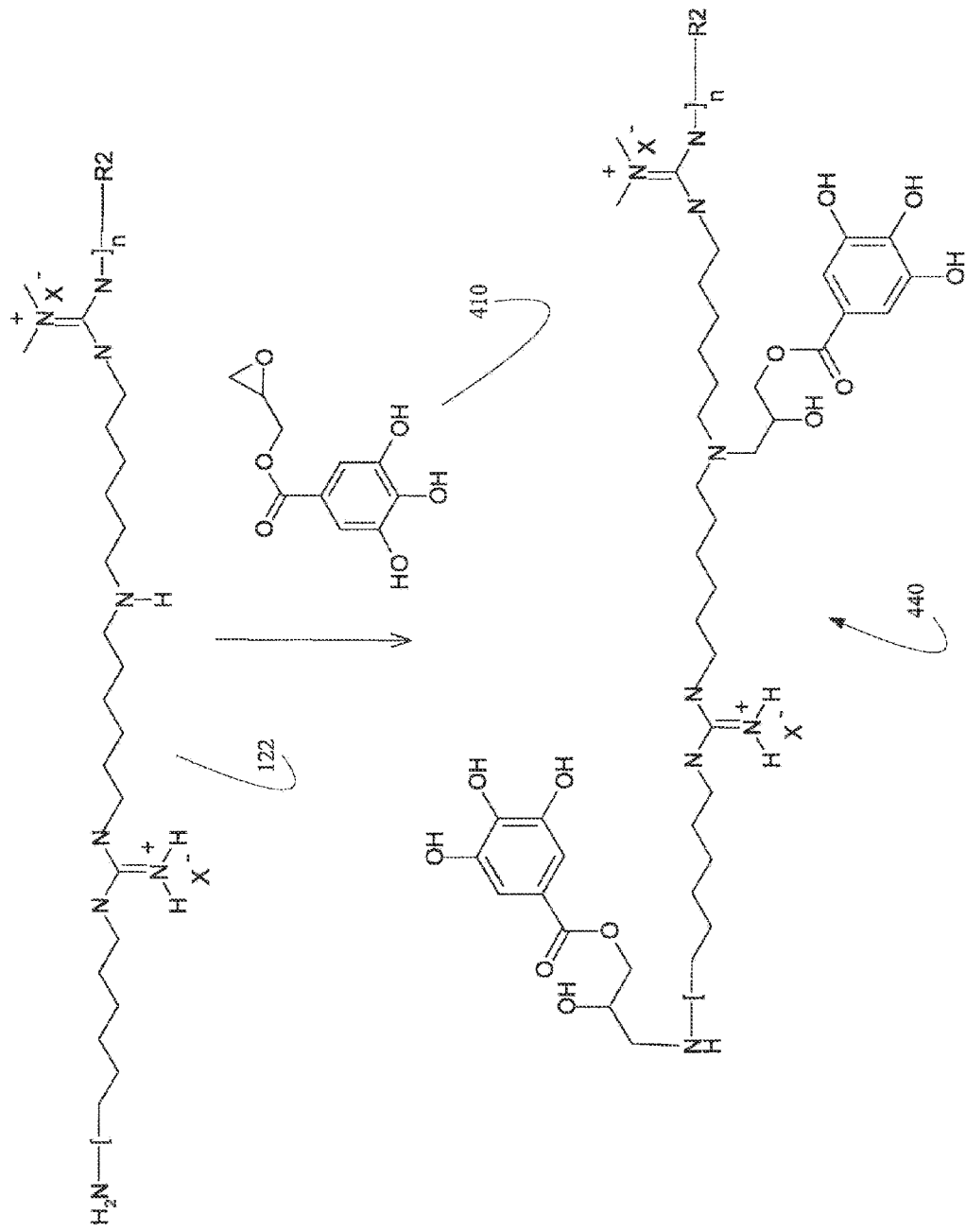
FIG. 3F illustrates Applicant's gallate-modified antipathogenic co-polymer 440.

Referring to FIG. 3F, in certain embodiments Applicant reacts guanidinium salt-containing polymer 122 with a gallate ester-derived epoxide 410 to give a substituted guanidinium salt copolymer 440. Each repeat unit (n) of Applicant's co-polymer 440 may contain different arrangements of HMDA, BHMT, guanidinium salt, and gallate ester functional groups, and adjacent repeat units may differ in the particular order of these components. In various embodiments, Applicant's co-polymer 440 is linear, branched, or a combination thereof.

Figure 3G:
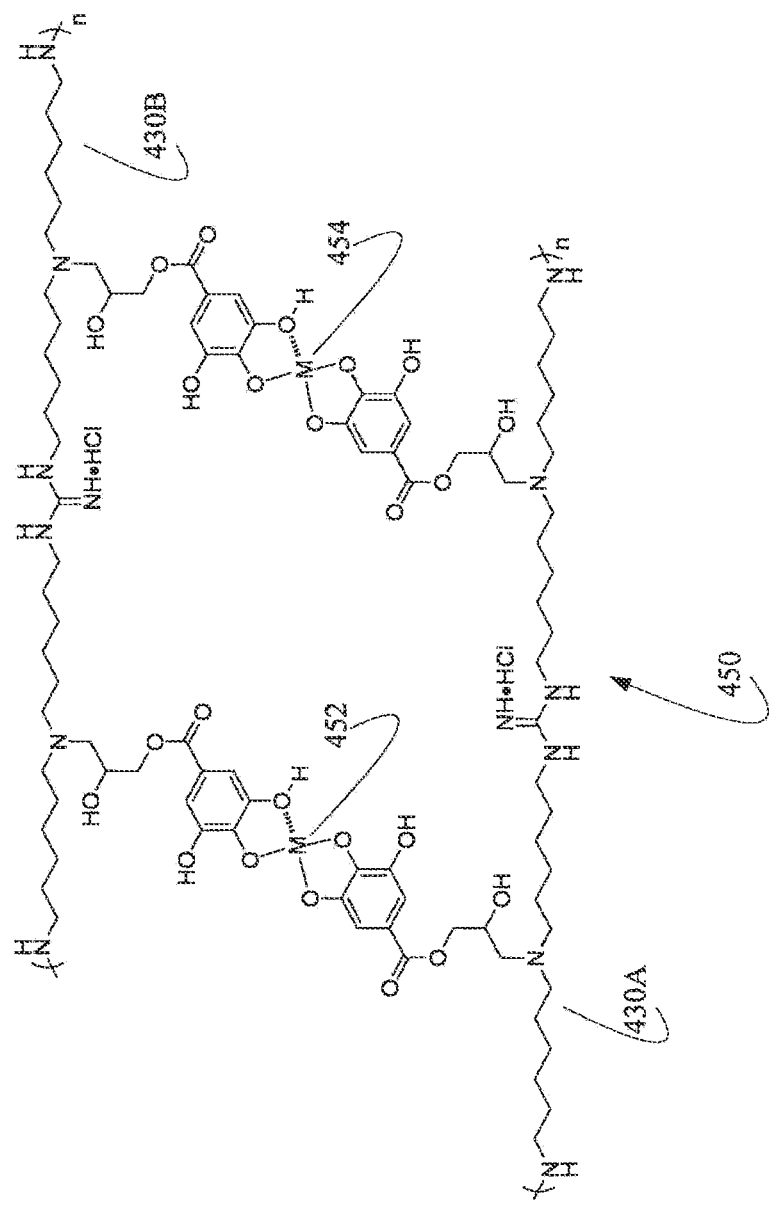
FIG. 3G illustrates two gallate-modified antipathogenic co-polymers 430 coordinated with a metal.

Referring to FIG. 3G, neighboring pendent phenolic anions on differing co-polymers 430 can coordinate with a metal ion M. In embodiments wherein the metal ion comprises a trivalent metal ion, such as and without limitation, $Al^{13+}$ or $Fe^{3+}$, that metal ion complex 452/454 is coordinated with a total of three (3) phenolic anions disposed on two different co-polymer chains, as illustrated in the coordinated metal ion in moiety 13 illustrated hereinabove.

In embodiments wherein the metal ion comprises a tetravelent metal, such as and without limitation, B Si, Ti, or Zr, that metal is coordinated with a total of four (4) phenolic anions disposed on two different co-polymer chains, as illustrated in the coordinated metal ion in moiety 14 illustrated hereinabove.

Figure 3H:
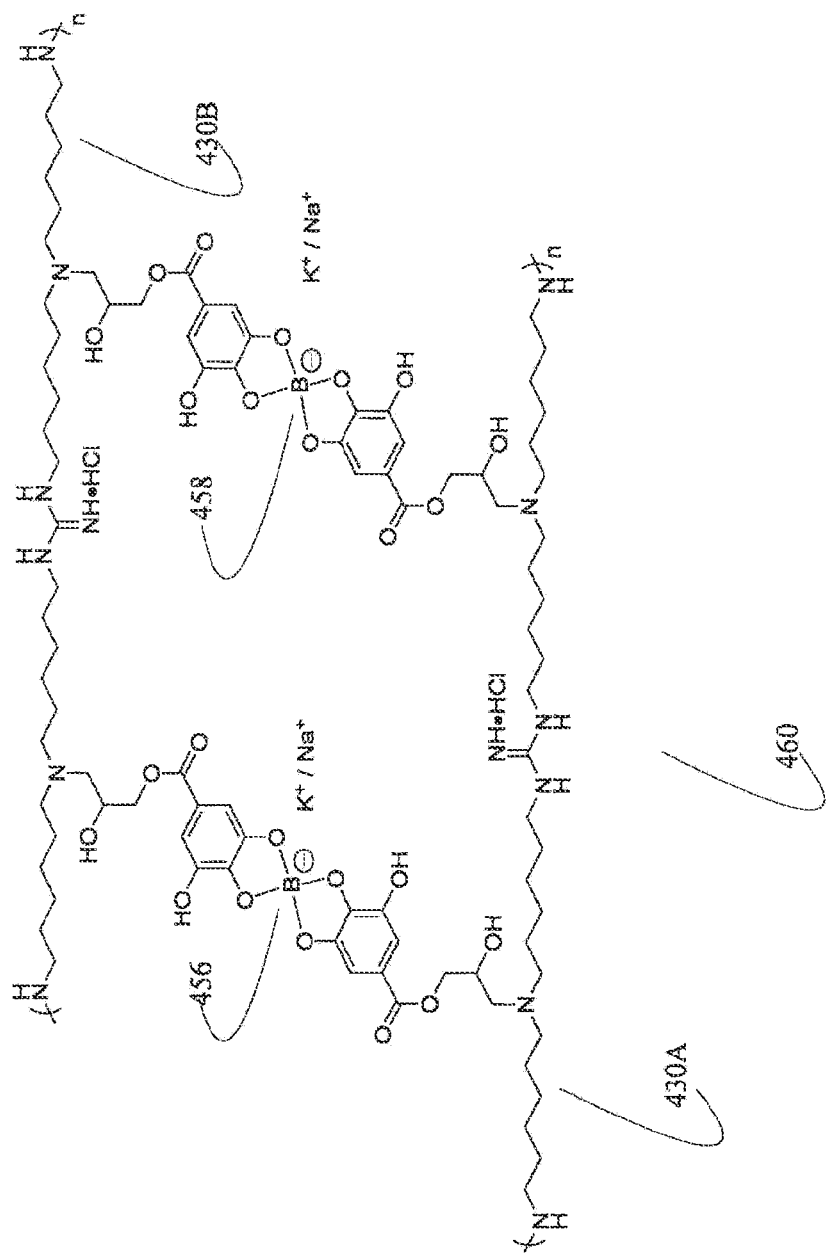
FIG. 3H illustrates two gallate-modified antipathogenic co-polymers 430 coordinated with a boron moeity.

FIG. 3H illustrates borate complexes 456/458 each formed by a boron atom and neighboring pendent phenolic anions on differing co-polymers 430. The resulting borate complex comprises a net negative charge. Therefore, in certain embodiments the borate complexes 456/458 further comprise a metal cation, such as and without limitation a potassium cation or a sodium cation Ellagic acid 2 is an oxidative dimer of gallic acid 1.

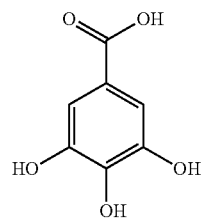

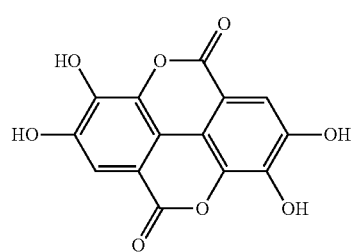

Figure 4A:
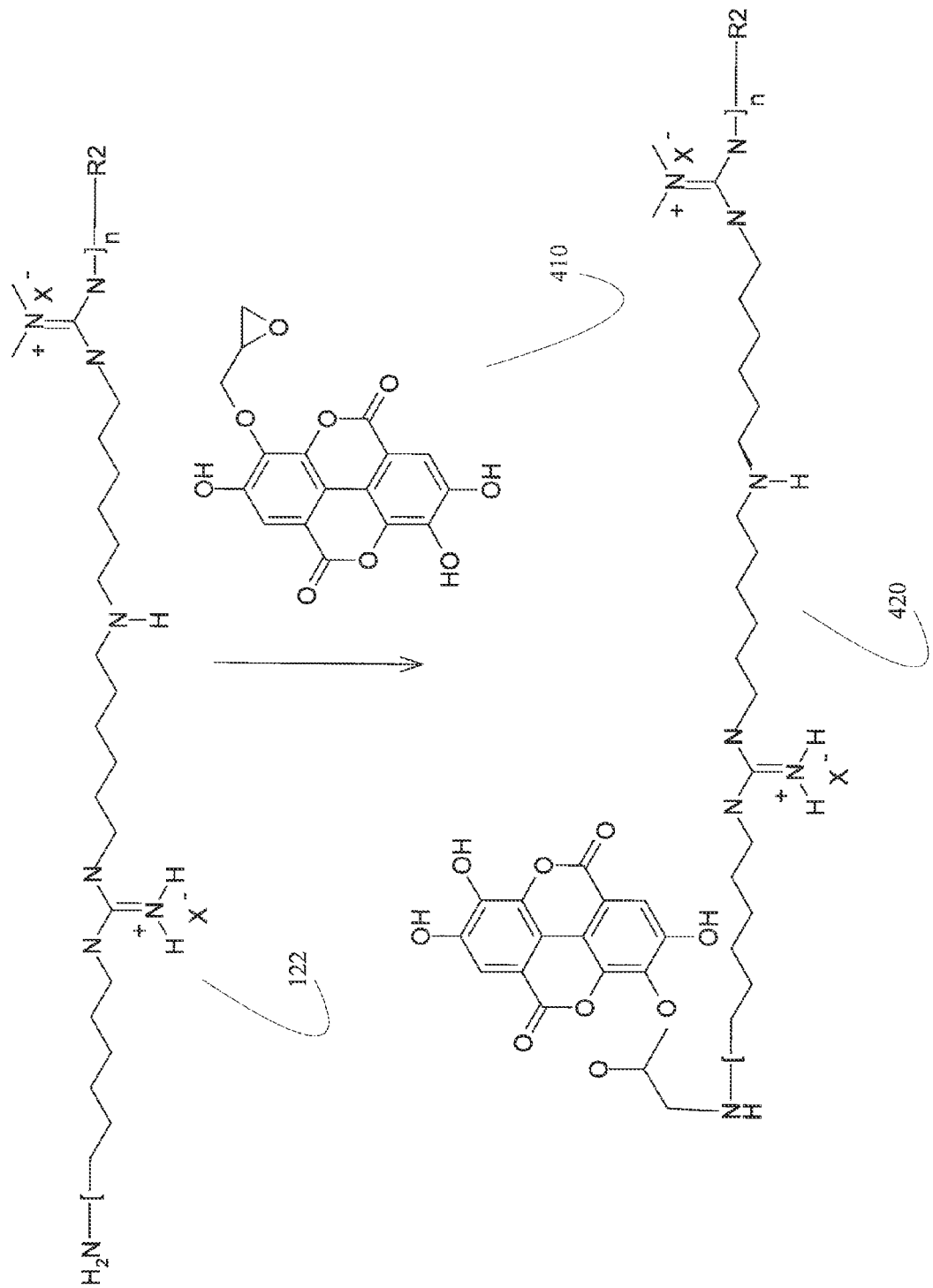
FIG. 4A illustrates a first embodiment of Applicant's ellagic acid-modified antipathogenic co-polymer.

Referring to FIG. 4A, in certain embodiments Applicant reacts guanidinium salt-containing polymer 122 with ellagic ester-derived epoxide 410 to give a substituted guanidinium salt copolymer 420. Each repeat unit (n) of Applicant's co-polymer 420 may contain different arrangements of HMDA, BHMT, guanidinium salt, and ellagic ester functional groups, and adjacent repeat units may differ in the particular order of these components. In various embodiments, Applicant's co-polymer 420 is linear, branched, or a combination thereof.

Figure 4B:
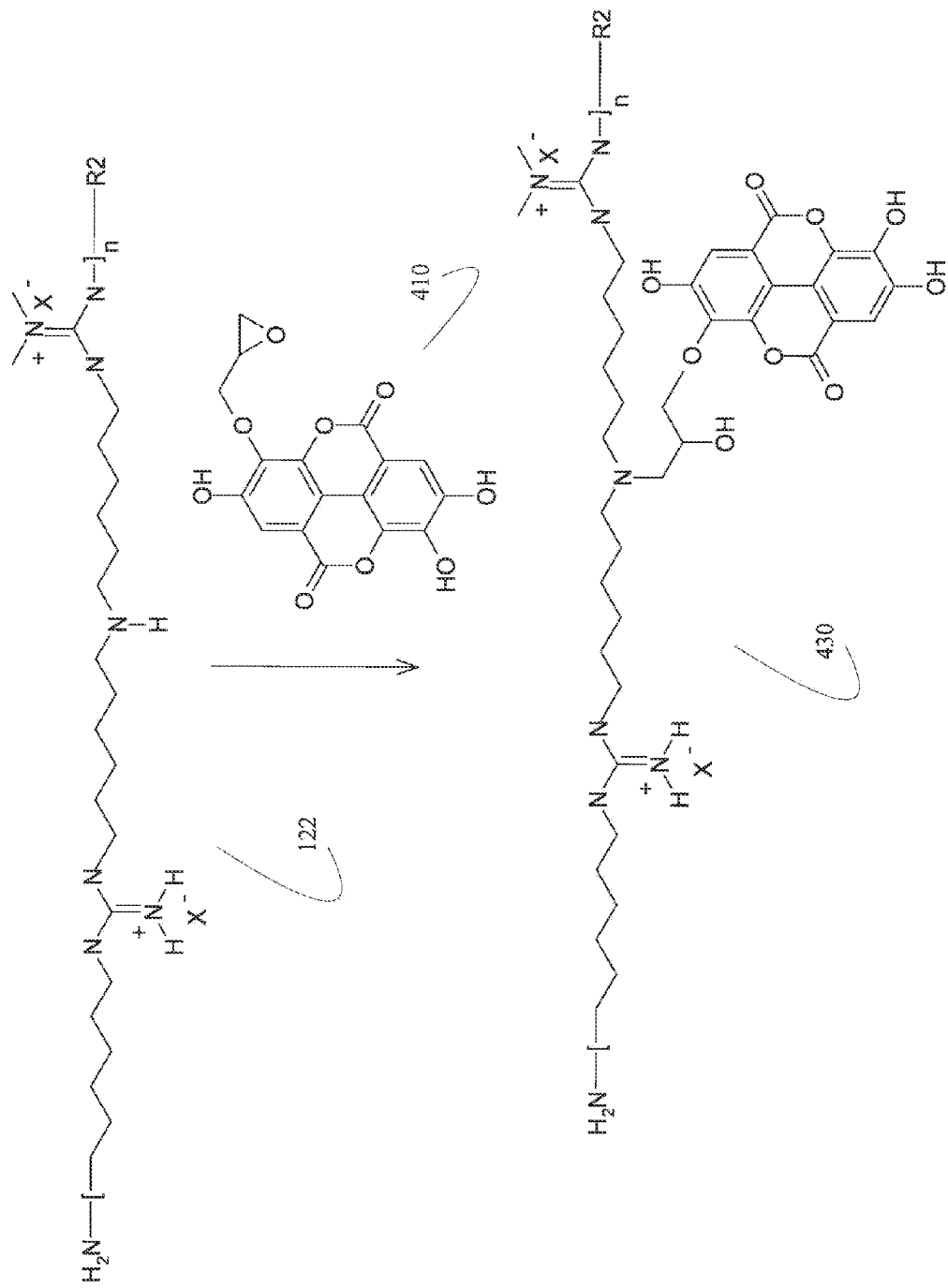
FIG. 4B illustrates a second embodiment of Applicant's ellagic acid-modified antipathogenic co-polymer.

Referring to FIG. 4B, in certain embodiments Applicant reacts guanidinium salt-containing polymer 122 with a ellagic ester-derived epoxide 410 to give a substituted guanidinium salt copolymer 430. Each repeat unit (n) of Applicant's co-polymer 230 may contain different arrangements of HMDA, BHMT, guanidinium salt, and ellagic ester functional groups, and adjacent repeat units may differ in the particular order of these components. In various embodiments, Applicant's co-polymer 430 is linear, branched, or a combination thereof.

Figure 4C:
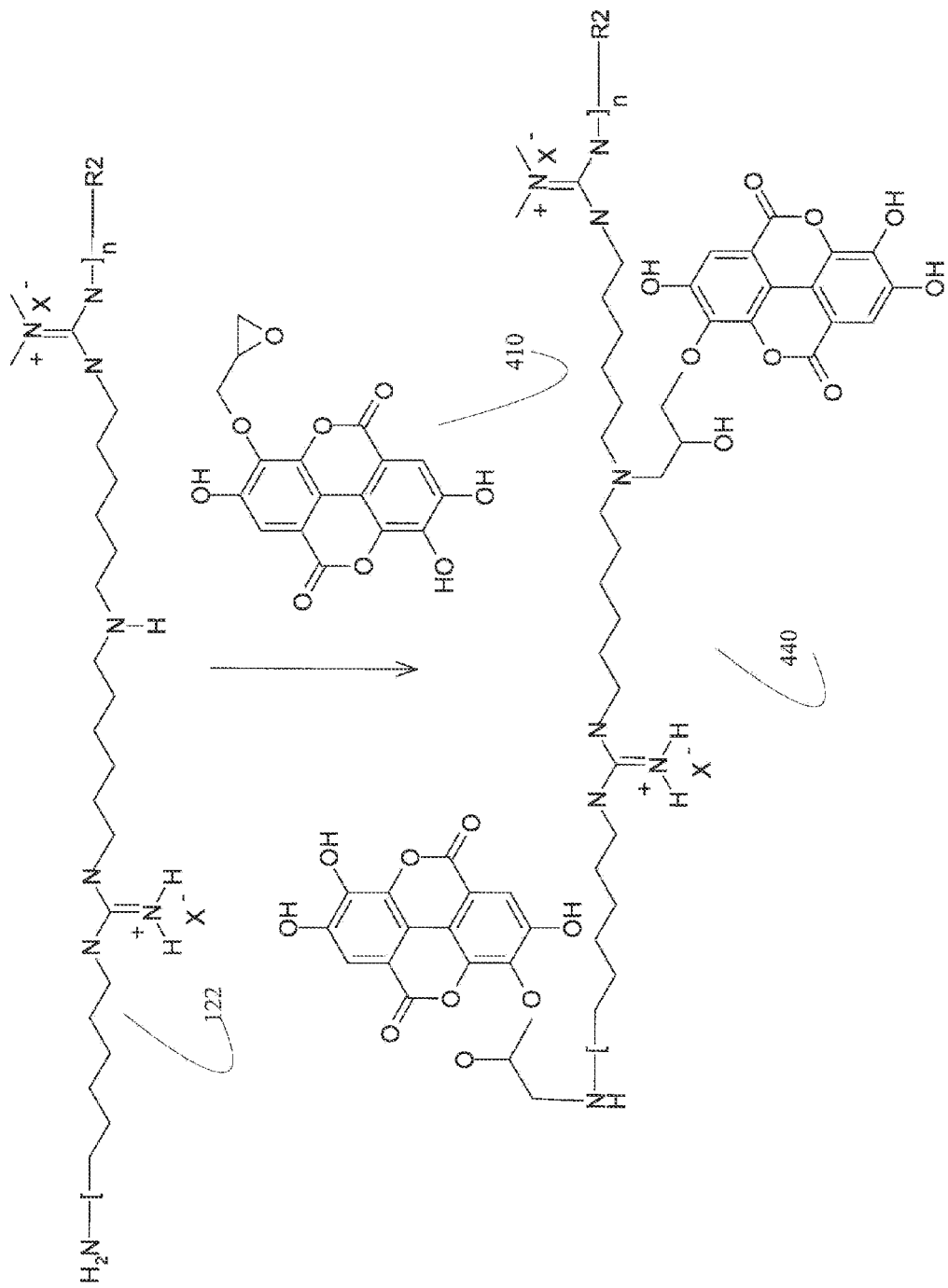
FIG. 4C illustrates a third embodiment of Applicant's ellagic acid-modified antipathogenic co-polymer.

Referring to FIG. 4C, in certain embodiments Applicant reacts guanidinium salt-containing polymer 122 with a ellagic ester-derived epoxide 410 to give a substituted guanidinium salt copolymer 440. Each repeat unit (n) of Applicant's co-polymer 240 may contain different arrangements of HMDA, BHMT, guanidinium salt, and ellagic ester functional groups, and adjacent repeat units may differ in the particular order of these components. In various embodiments, Applicant's co-polymer 440 is linear, branched, or a combination thereof.

EXPERIMENTAL

Preparation of Modified Gallate and Ellagic Acid Esters/Epoxides

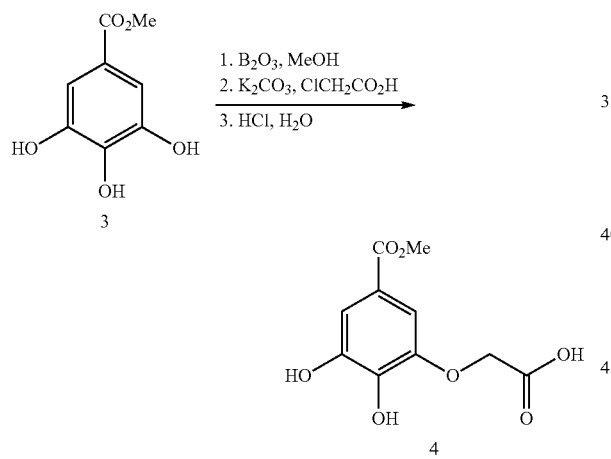

To a reaction vessel, is added $B_2O_3$ (2 equiv to methyl gallate) and methanol (volume: ~4.5 times methyl gallate 3 weight). Upon stirring, the mixture turned to a colorless solution, heat releasing during dissolution. When flake B2O3 is used instead of powder, gentle heating is recommended to accelerate the dissolution.

To the above solution is added methyl gallate, this solvation of methyl gallate is slightly endothermic. $K_2CO_3$ (2.4-3 equiv) is added, accompanied by heat release and CO2 evolution.

The resultant suspension is added with chloroacetic acid (1.1 equiv), producing heat and $CO_2$. The reaction is then heated to reflux with an equipped reflux condenser for 5 hr.

Subsequently, the peach-colored reaction mixture undergoes vacuum distillation, to remove ~50-times methyl gallate weight) and 12N HCl, to pH 3. Pre-mix of the acid with $H_2O$ is recommended.

Figure 5:
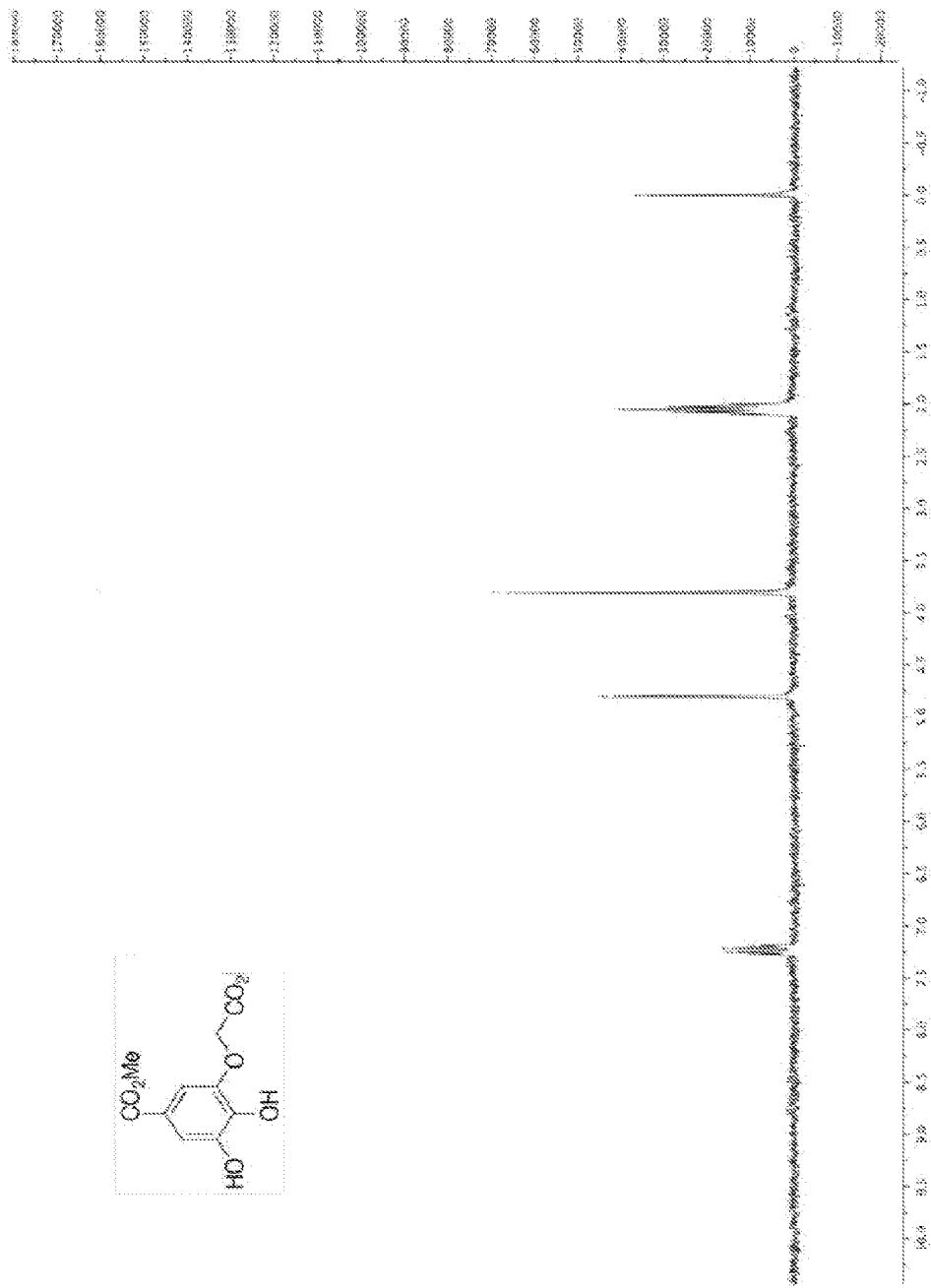
FIG. 5 recites a proton NMR spectrum for a mono adduct of 2-chloro-acetic acid with methyl gallate.

Product 4 crashes out as a white powdery precipitate upon acidifying. The crude product is then collected by filtration. The crude material is washed with warm water (50 □C) and filtered again to yield the pure product. FIG. 5 shows a proton NMR for product 4.

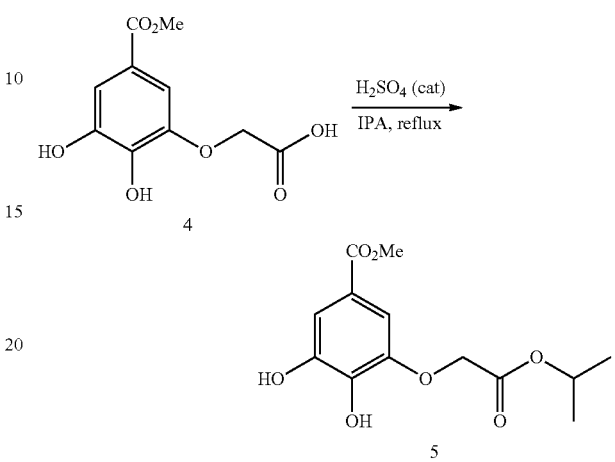

Figure 6:
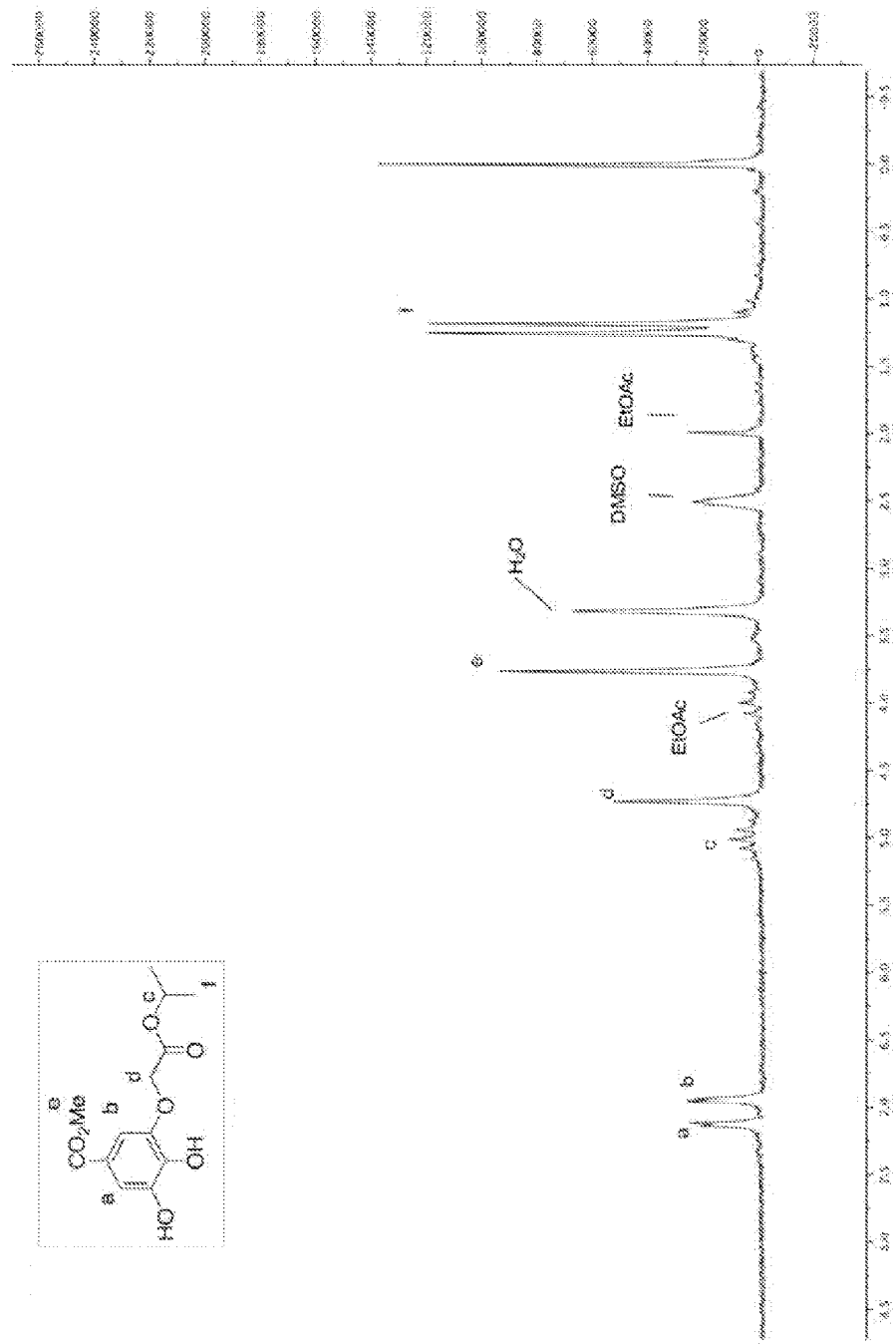
FIG. 6 recites a proton NMR spectrum for the isopropyl ester of the mono adduct of FIG. 5.

To a reaction vessel, is added acid and isopropyl alcohol. The suspension is then stirred and added with catalytic amount of concentrated sulfuric acid. The reaction is heated to refluxed for 16 hr and cooled to room temperature. The alcohol is removed under vacuo, and replaced by ethyl acetate. The organic layer is washed with $H_2O$ till pH=~7 and dried on $Na_2SO_4$ (anhydrous). Ethyl acetate is subsequently removed under vacuo to afford the isopropyl ester 5, in quantitative yield. FIG. 6 is a proton NMR of isopropyl ester 5.

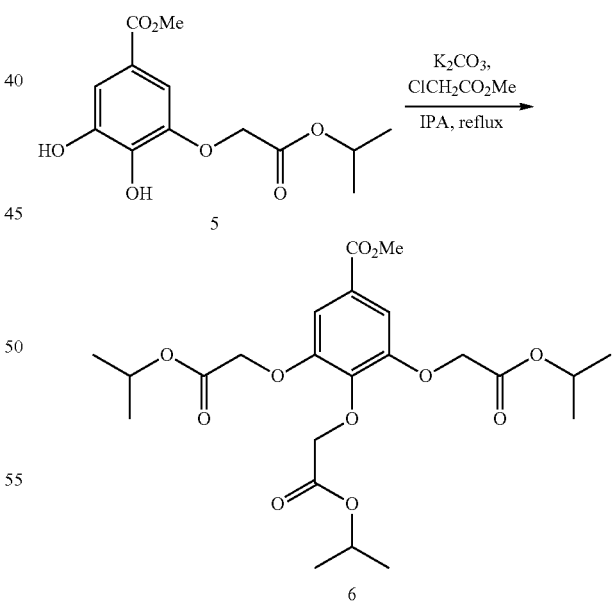

Figure 7:
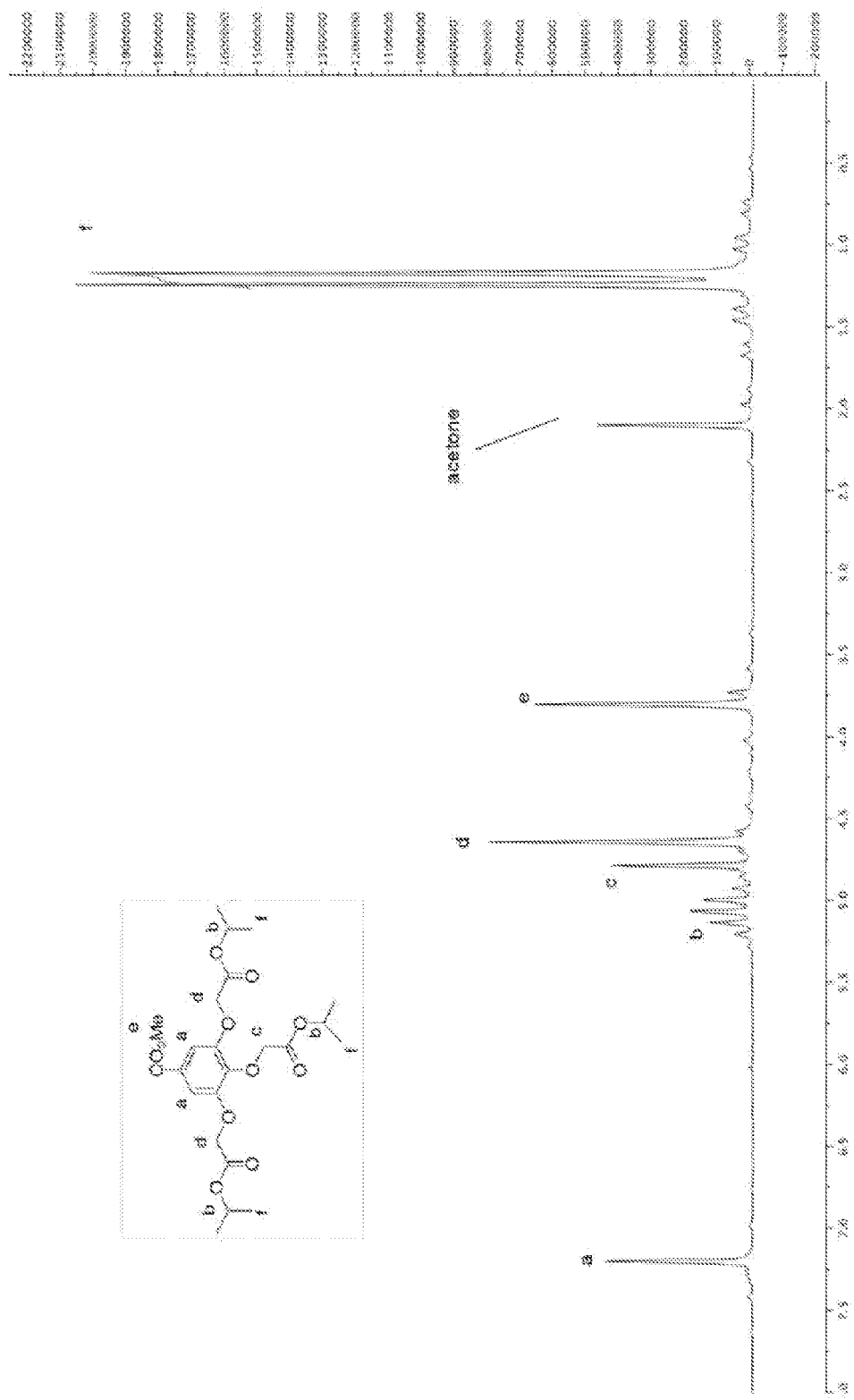
FIG. 7 recites a proton NMR spectrum for a tris adduct of methyl gallate prepared using the mono adduct of FIG. 5.

To a reaction vessel, is added the isopropyl ester, $K_2CO_3$ and a mixed solvent of IPA and toluene (3:1, v/v). The solution is stirred and added with $K_2CO_3$ (2.2 equiv) and methyl chloroacetate (2.4 equiv) in sequence. The reaction is then heated to reflux for 16 hours to allow the alkylation and transesterification to complete. After cooled to room temperature, the solvent is removed under vacuo and replaced by ethyl acetate. The organic layer is neutralized with a diluted HCl solution and rinsed with $H_2O$. Aqueous layer is extracted with ethyl acetate and the organic layers are combined. After removal of ethyl acetate, the crude product is eluted through a short silica plug to afford the tri-ester 6, in moderate yield. FIG. 7 illustrates a proton NMR for tri-ester 6.

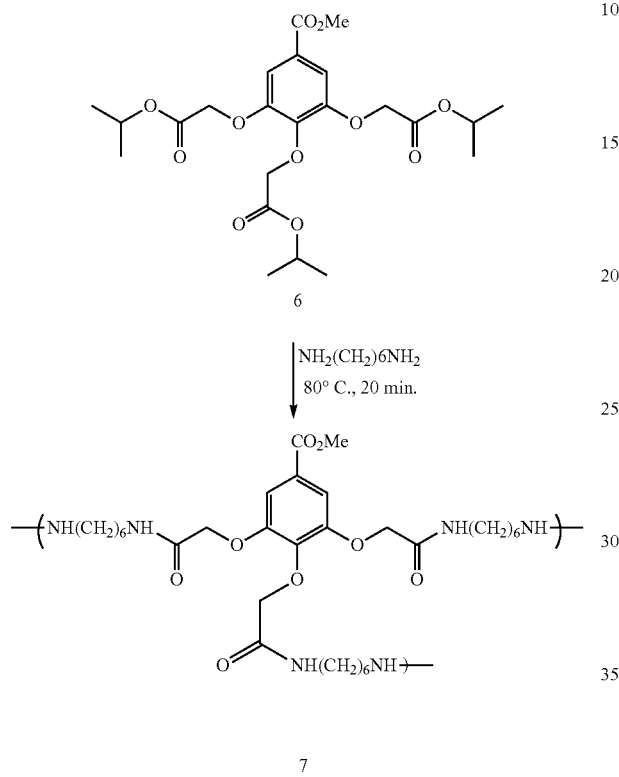

Figure 8:
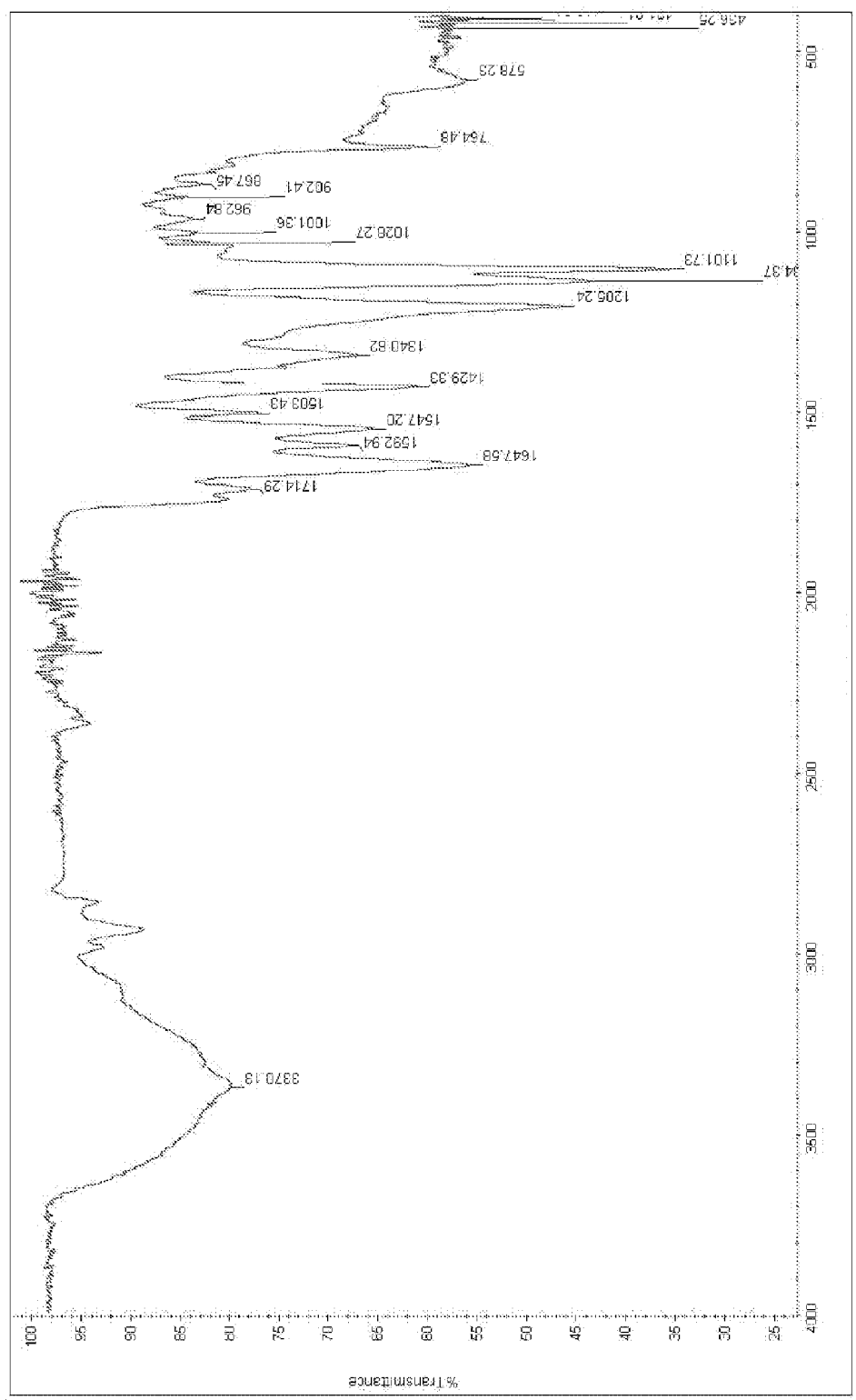
FIG. 8 shows an FT-IR spectrum for a polymeric amidation product of the material of FIG. 7.

Polyamidation of the above triester was realized with hexamethylenediamine. To a reaction vessel, is added trimester 6 (neat) and hexamethylenediamine (1.5 equiv). The reaction is then heated to 80° C. for 20 min, and yielded a solid plastic product 7. Note amide C=O stretch (1650 cm-1) in the FT-IR spectrum. FIG. 8 recites an FT-IR spectrum for solid plastic product 7.

Similarly, polyesters can be obtained from condensation of the triester with a variety of diols.

Figure 9:
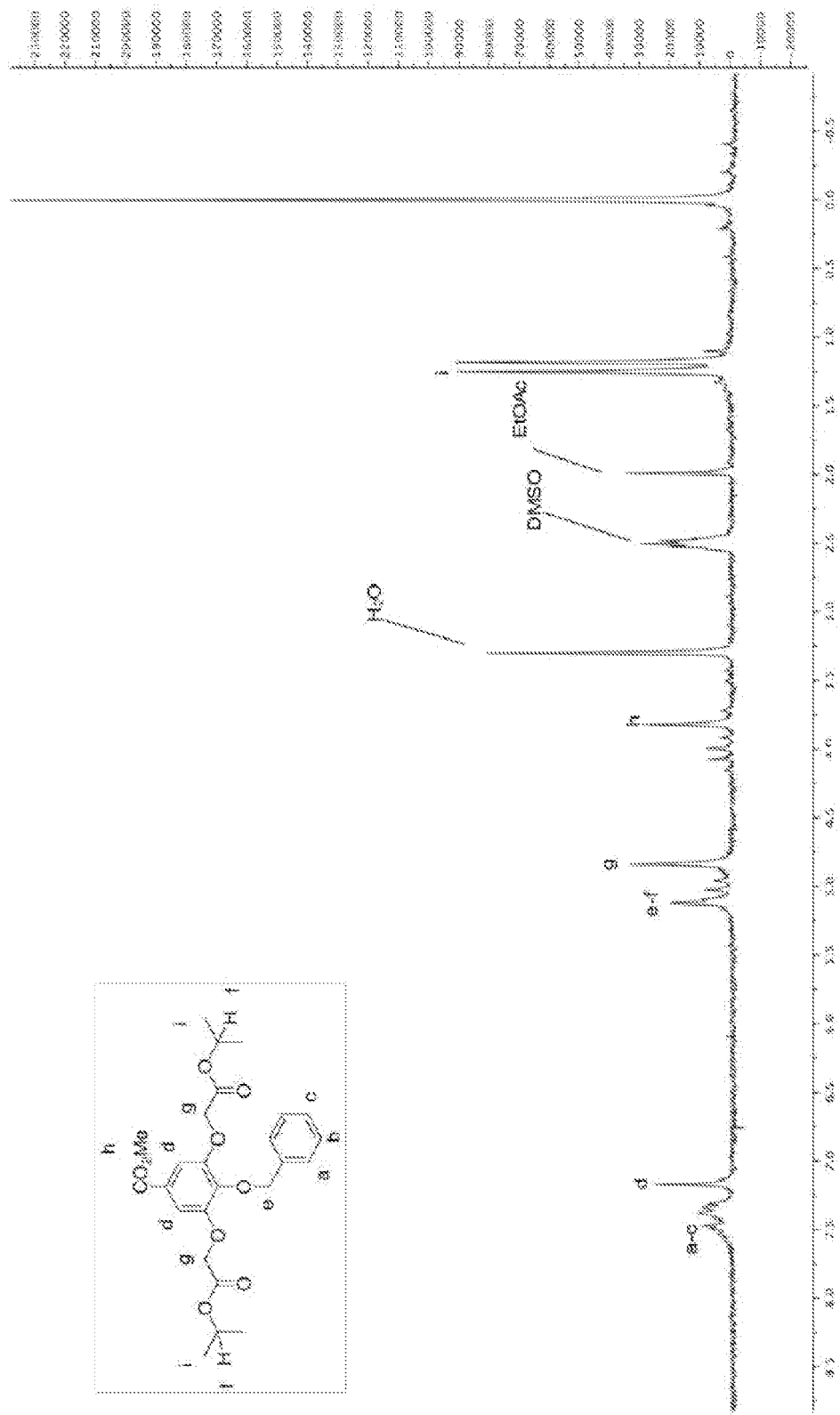
FIG. 9 recites a proton NMR spectrum for a monomer for linear polymerization formed from methyl gallate.

Monomer for linear polymerization was also prepared via a two-step synthesis. To a reaction vessel, is added methyl gallate, potassium carbonate (1 equiv) and benzyl bromide (1 equiv) and acetonitrile. The suspension is heated to reflux for 2 hr and cooled to rt. Solid material is filtered off and solvent is then removed under vacuo from the filtrate. The crude material is re-charged with isopropanol as the solvent and added with potassium carbonate (2 equiv) and methyl chloroacetate (2.4 equiv). The reaction is then heated to reflux for 16 hours to allow the alkylation and transesterification to complete. After cooled to room temperature, the solvent is removed under vacuo and replaced by ethyl acetate. The organic layer is neutralized with a diluted HCl solution and rinsed with $H_2O$. Aqueous layer is extracted with ethyl acetate and the organic layers are combined. After removal of ethyl acetate, the crude product is eluted through a short silica plug to afford the diester 8, in a yield of 84% over two steps. FIG. 9 recites a proton NMR for the diester 8.

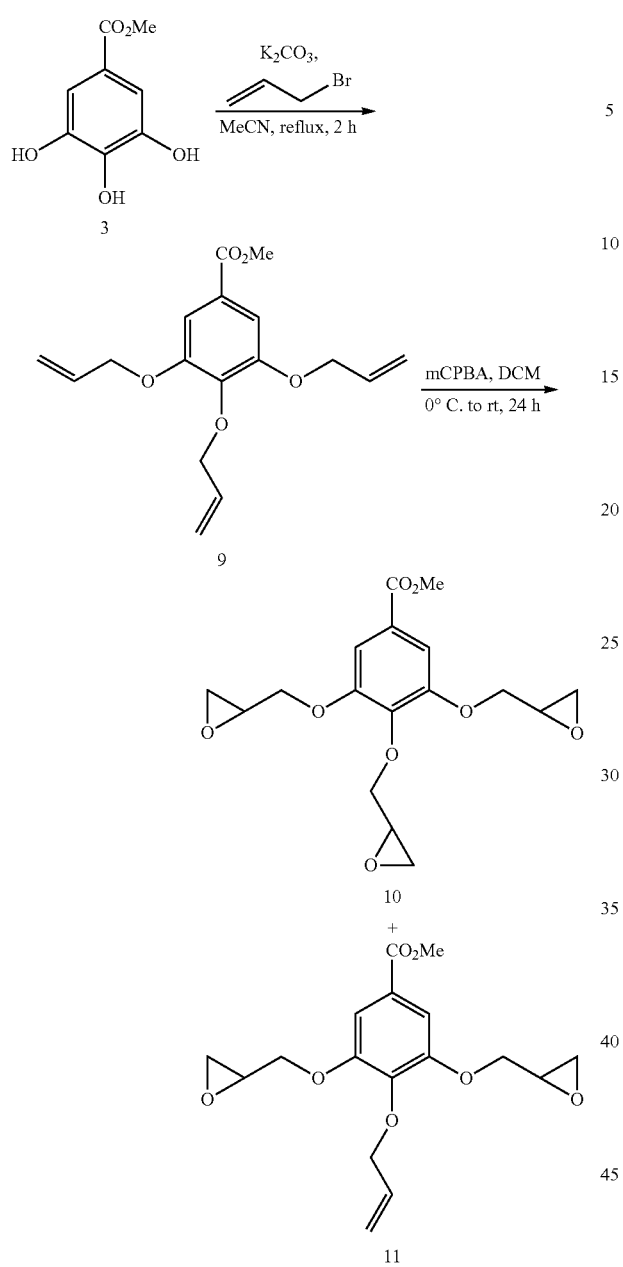

Figure 11:
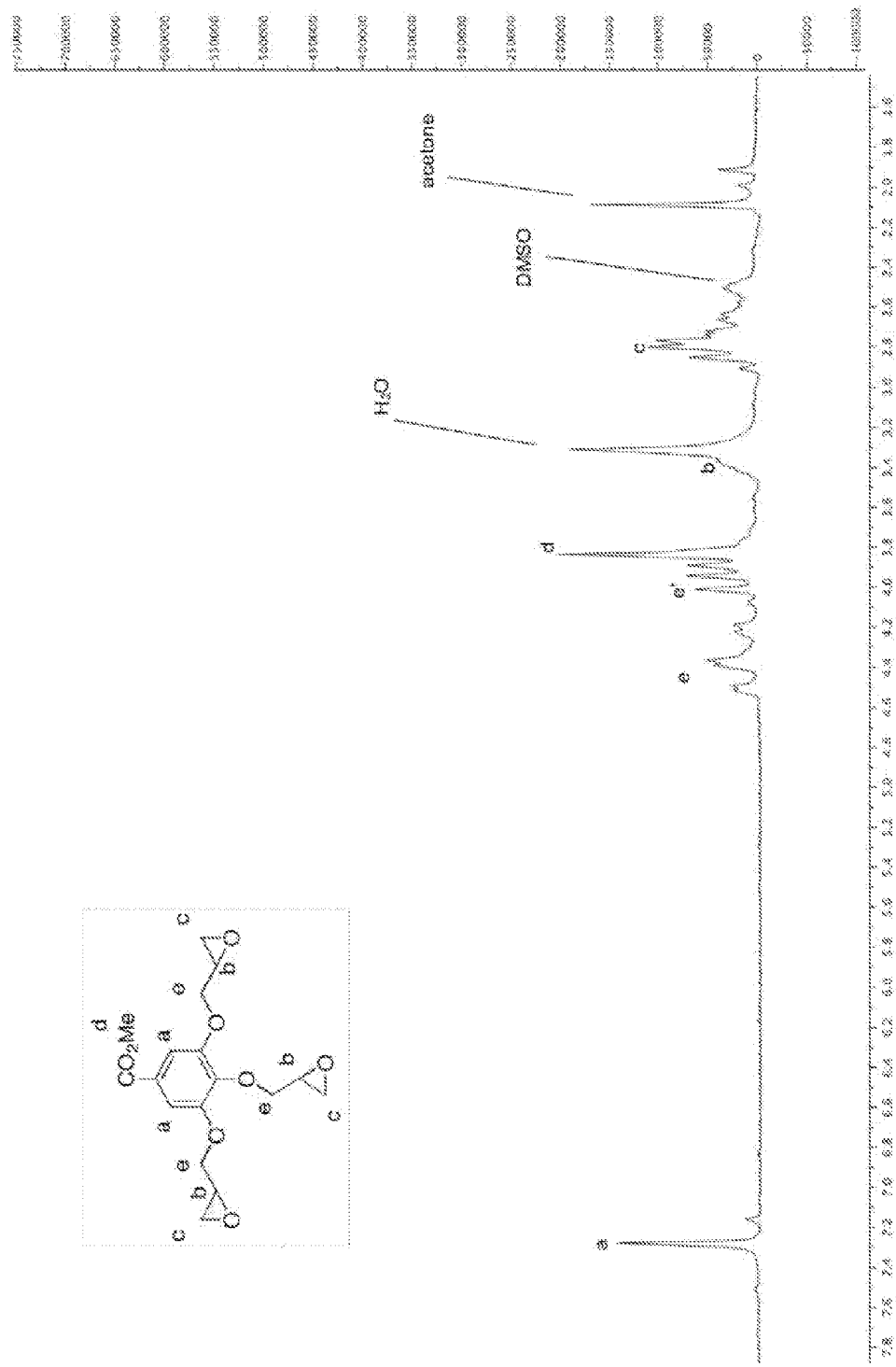
FIGS. 11 and 12 illustrate tri-epoxidized and di-epoxidized compounds, respectively, prepared from Tris(allyloxy)-methyl gallate.
Figure 12:
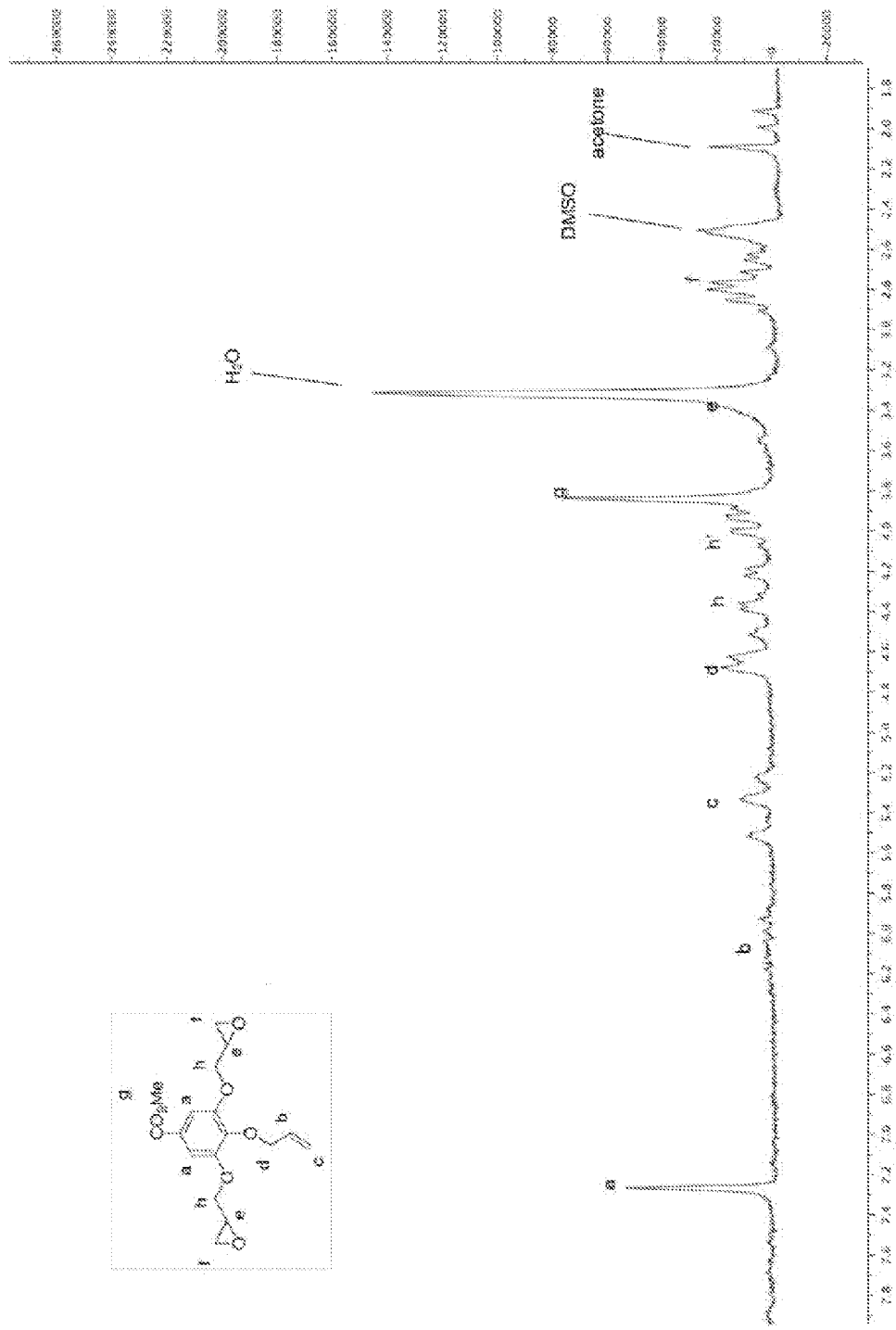

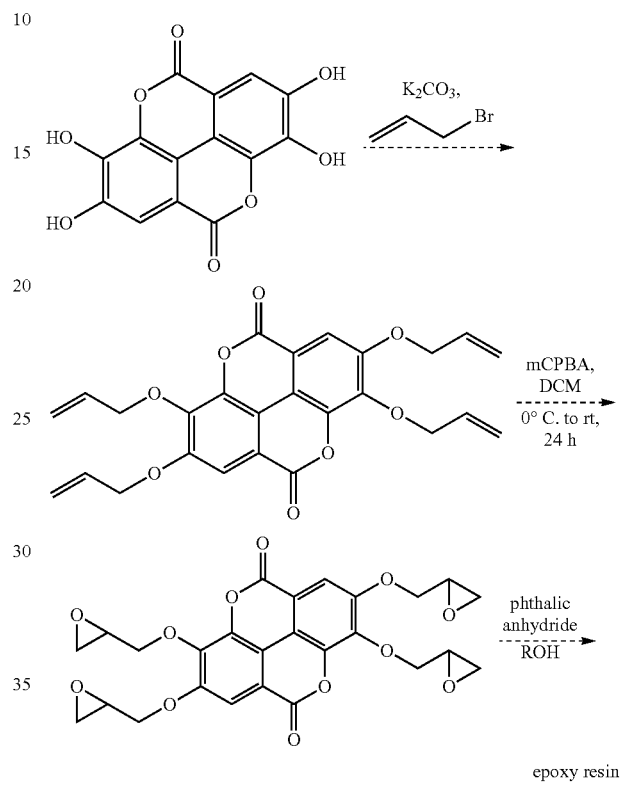

solution and washed with a 10% NaHCO₃ and brine sequentially. The organic layer is then dried and concentrated under vacuo. The crude product is eluted on a silica plug to give the tri-epoxidized and di-expoxidized compounds 10 and 11 in 67% combined yield (42% and 25%, respectively). FIGS. 11 and 12 recites proton NMR spectra for the tri-epoxidized and di-expoxidized compounds 10 and 11, respectively.

epoxy resin

A similar epoxy resin can be obtained from an epoxy monomer derived from ellagic acid 2. The epoxy monomer is expected to be synthesized under similar conditions with appropriate solvents.

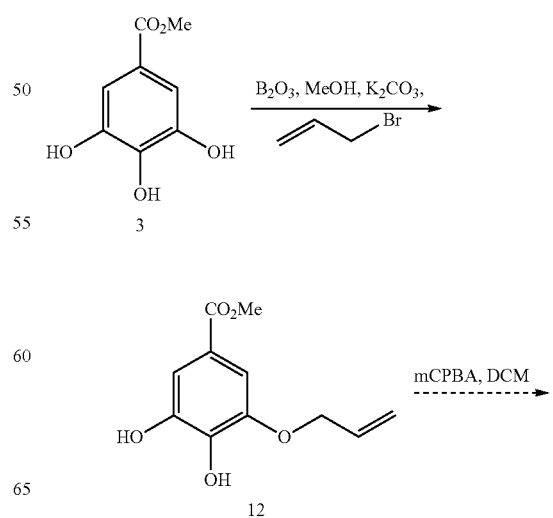

Figure 10:
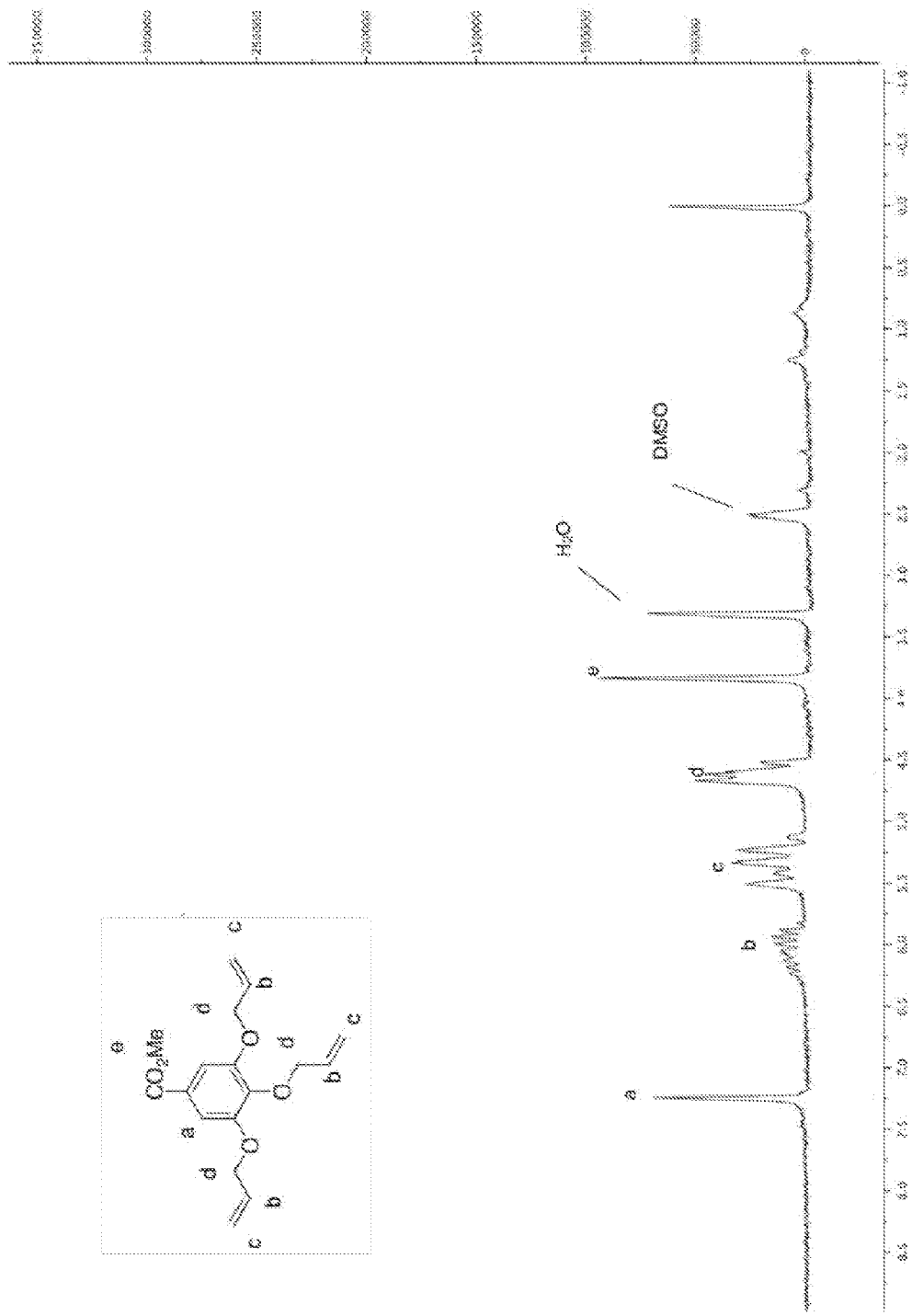
FIG. 10 recites a proton NMR spectrum for Tris(allyloxy)-methyl gallate.

Epoxy monomer can also be prepared from methyl gallate via a two-step synthesis. Tris(allyloxy)-methyl gallate 9 can be obtained by refluxing methyl gallate with allyl bromide (6 equiv) in acetonitrile in the presence of potassium carbonate (4.5 equiv) for 2 hr. The reaction is cooled to rt and solvent is removed under vacuo. The crude product is subsequently, neutralized with diluted HCl solution and extracted with ethyl acetate. The organic layers are combined, dried with Na₂SO₄ (anhyd.) and concentrated under vacuo. The crude product is then eluted through a short silica plug to afford the tris(allyloxy)-methyl gallate 9 in 98% yield. FIG. 10 recites a proton NMR for tris(allyloxy)-methyl gallate 9.

To the reaction vessel containing a solution of tri-allyl methyl gallate 9 in dichloromethane, is added meta-chloroperoxybenzoic acid (mCPBA, 3.6 equiv) in dichloromethane at 0° C. Subsequently, the reaction is warmed to rt and stirred for 24 hr. The reaction is then quenched with 10% a Na₂S₂O₃

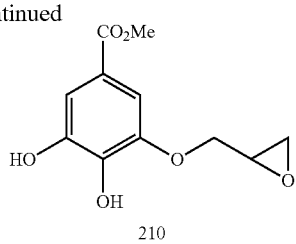

210

Figure 13:
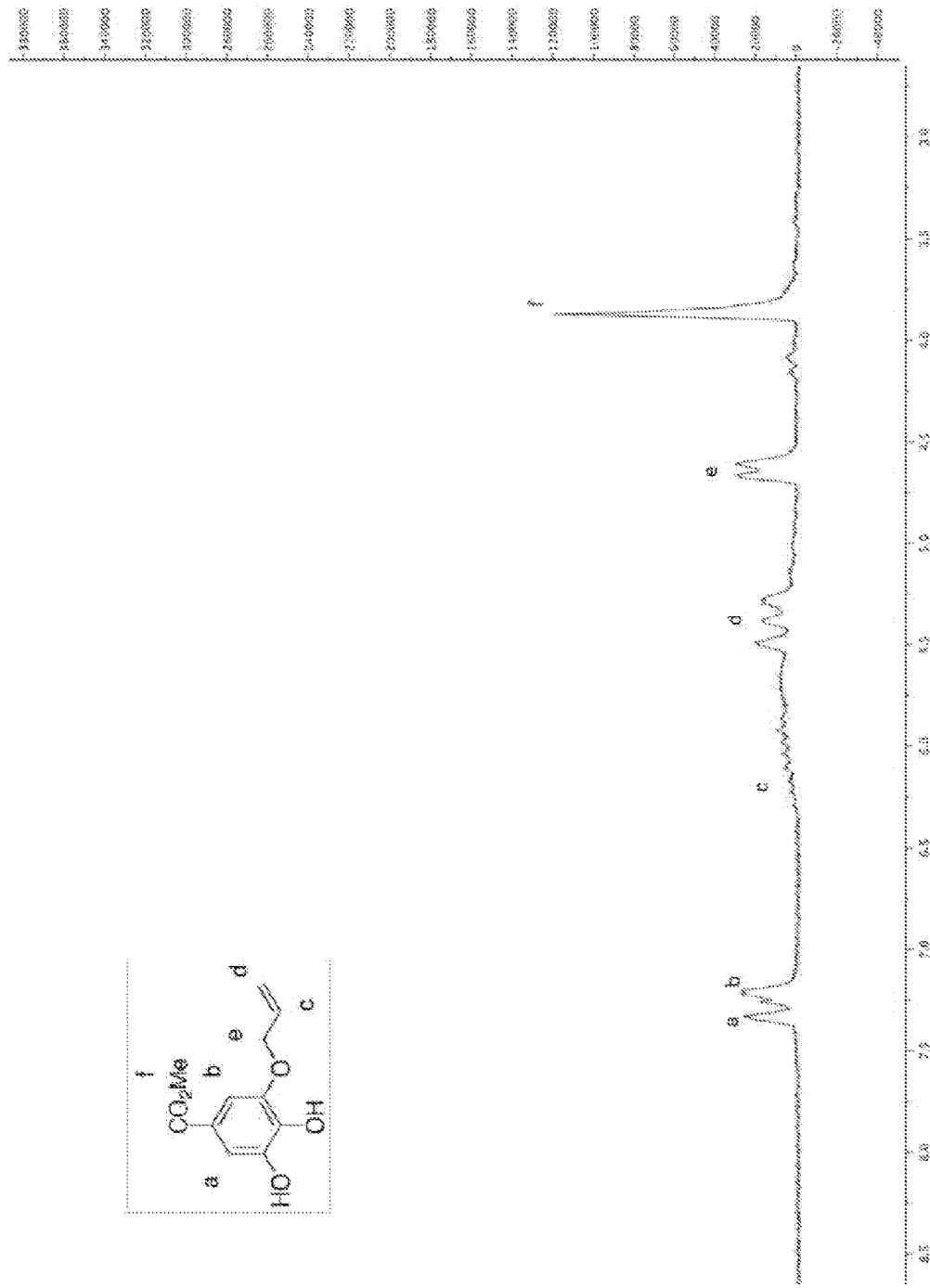
FIG. 13 recites a proton NMR spectrum for 3-allyloxy methyl gallate.

Methyl gallate 3 is regio-selectively alkylated with allyl bromide, the 3-allyloxy methyl gallate intermediate 12 can be epoxidized upon treatment with mCPBA to give gallate-derived epoxide 210. FIG. 13 recites a proton NMR spectrum for intermediate 12.

While the preferred embodiments of the present invention have been illustrated in detail, it should be apparent that modifications and adaptations to those embodiments may occur to one skilled in the art without departing from the scope of the present invention as set forth herein.

Figure 1E:
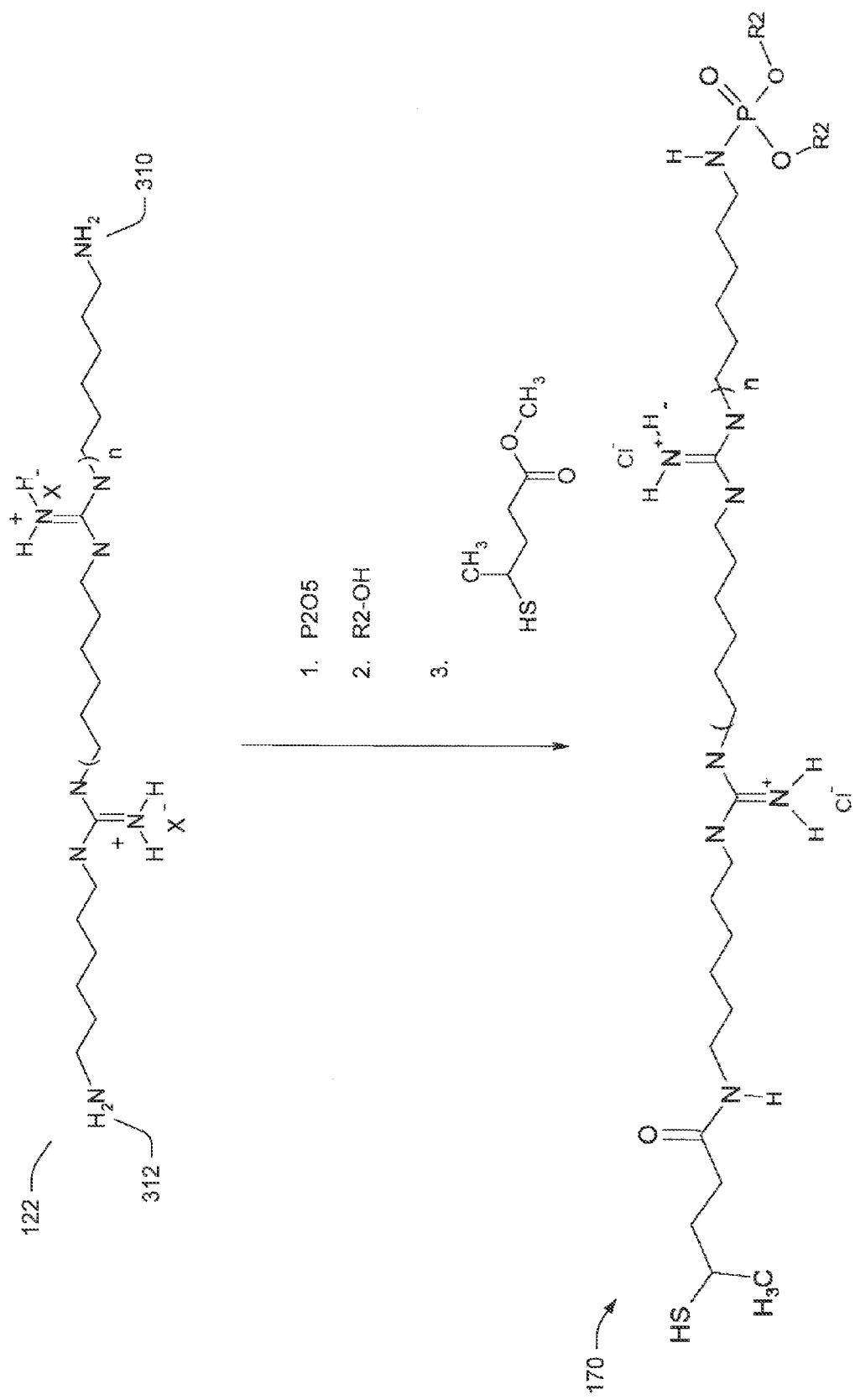
FIG. 1E summarizes the chemical components and multi-step reaction used to make one embodiment of Applicant's antipathogenic co-polymer 170.

Referring to FIG. 1E, Applicant reacts co-polymer 122 with $P_2O_5$. The phosphorus pentoxide reacts with a primary amine on the co-polymer 122. Applicant then reacts phosphorus-functionalized co-polymer with an alcohol R2-OH, which gives a phosphate ester end group. Applicant then reacts the modified co-polymer with a thio ester. In one embodiment, the thio ester is thiol mercapto acetic acid. In one embodiment, the thio ester is methyl thioglycolate. In one embodiment, the thio ester is any common depilatory containing a thio functional group and capable of forming a disulfide bond.

In one embodiment, the repeat unit (n) is a positive integer. In one embodiment, the repeat unit (n) is 0, which results in a diaminoguanidinium salt. In one embodiment, the repeat unit (n) is equal or greater than 2. In one embodiment, the repeat unit (n) is less than 10. In one embodiment, the repeat unit (n) is 10. In one embodiment, the repeat unit (n) is greater than 10. In one embodiment, both primary amine end groups are functionalized to a phosphate ester. In one embodiment, both primary amine end groups are functionalized to sulfide end groups.

Figure 14:
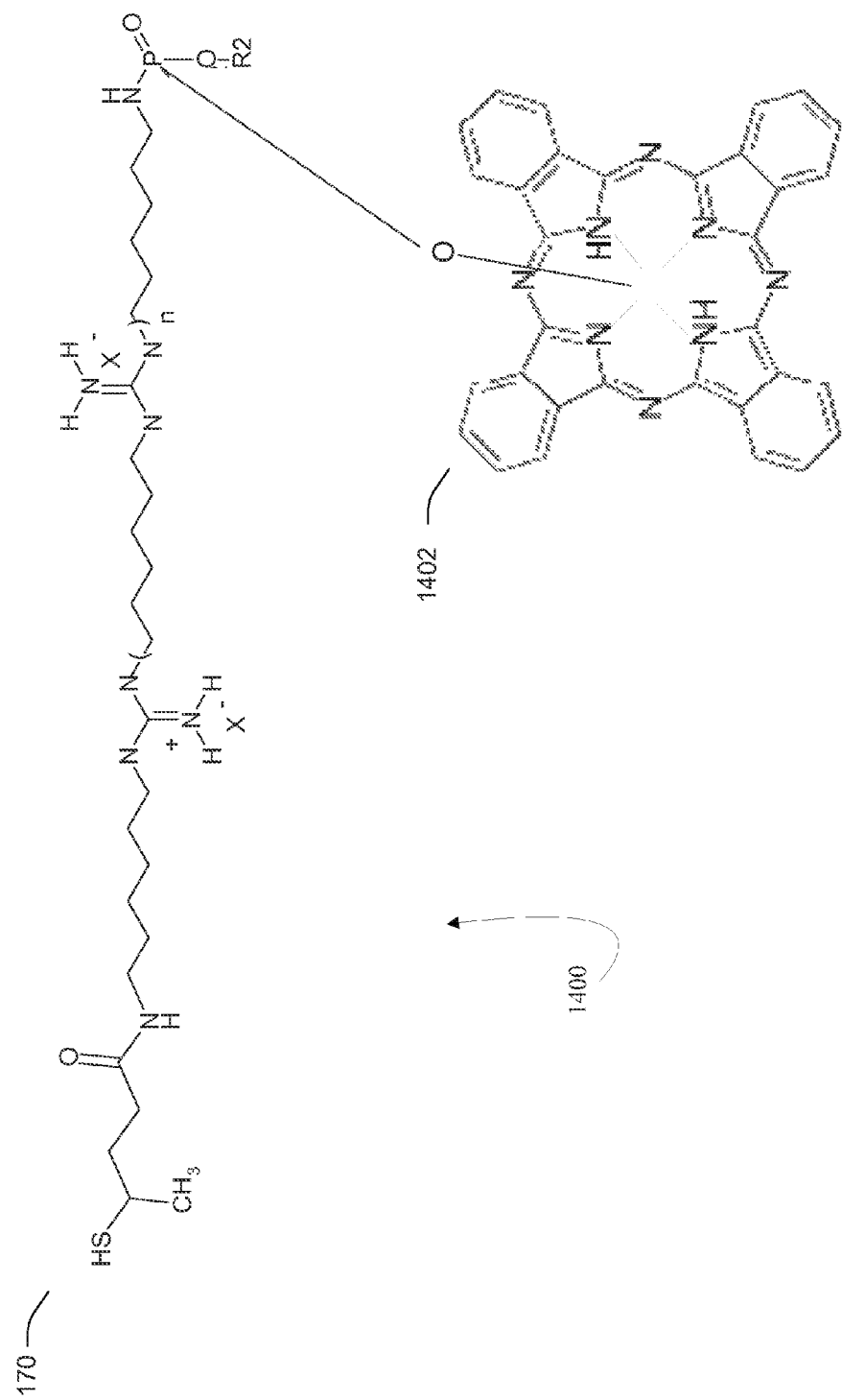
FIG. 14 illustrates the chemical structure of one embodiment of Applicant's antipathogenic co-polymer 1400 capable of producing singlet oxygen.

Referring to FIG. 14, Applicant reacts photocatalyst 1402 with co-polymer 170 to give a functionalized photocatalyst comprising co-polymer 1400 In the embodiment shown, the photocatalyst is a metal phthalocyanine.

In various embodiments, the photocatalyst 1402 comprises a photocatalyst selected from the group consisting of substituted Acetonaphthones, substituted Acetophenonse, substituted Acridines, substituted Anthracenes, substituted Anthraquinones, substituted Anthrones, substituted Azulenes, substituted Benzils, substituted Benzophenones, substituted Benzopyranones, substituted Benzoquinones, substituted Flavones, substituted Camphoroquinone, substituted Chrysenes, substituted 7-Dehydrocholesterols, substituted Ergosterols, substituted Fluorenes, substituted Fluorenones, substituted Eosins, substituted Fluoresceins, substituted Phloxines, substituted Rose Bengals, substituted Erythrosins, substituted Indoles, substituted Naphthalenes, substituted Phenanthrenes, substituted Phenazines, substituted Thionines, substituted Azures, substituted Toluidine Blue, substituted Methylene Blues, substituted Pyrenes, substituted Quinoxalines, substituted Retinols, substituted Riboflavins, substituted Rubrenes, substituted Bacteriochlorophylls, substituted Chlorophylls, substituted Pheophytins, substituted Pheophorbides, substituted Protochlorophylls, substituted Coproporphyrins, substituted Fullerenes, substituted Porphyrins, substituted Metallo Porphyrins, substituted Porphines, substituted Rubrenes, and substituted Phthalocyanines.

The co-polymer 1400 is shown in combination with a phthalocyanine composition to illustrate the use of photocatalysts with Applicant's antipathogenic guanidinium co-polymer. Applicant's guanidinium co-polymer containing functionalized phosphate esters can be employed with a wide variety of metal-containing photocatalyst moieties. This being the case, the description herein employing phthalocyanine photocatalyst moieties should not be taken as limiting.

Figure 15:
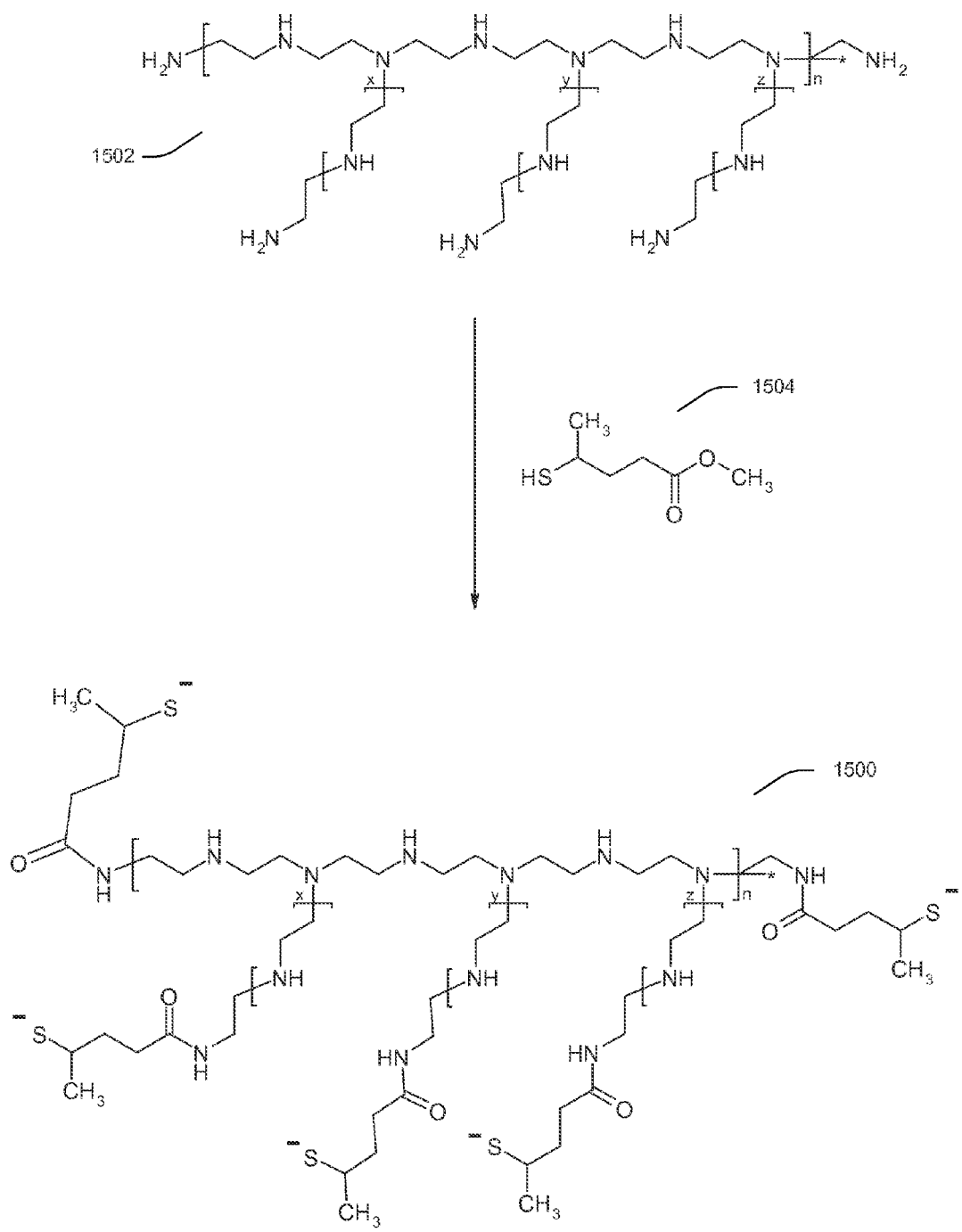
FIG. 15 summarizes the reaction used to make Applicant's antipathogenic polymer 1500.

Referring to FIG. 15, Applicant reacts polyethylenimine (PEI) 1502 with a thio ester 1504 to form a PEI polymer 1500 comprising sulfide end groups. In certain embodiment, the PEI 1502 is a non-linear polymer, sometimes referred to as a "comb polymer."

The sulfide end groups are capable of forming disulfide bonds with the sulfhydryl groups on a spore's outer covering. Applicant's polymer 1500 is therefore able to trap and immobilize spores with exposed sulfhydryl groups.

Figure 16:
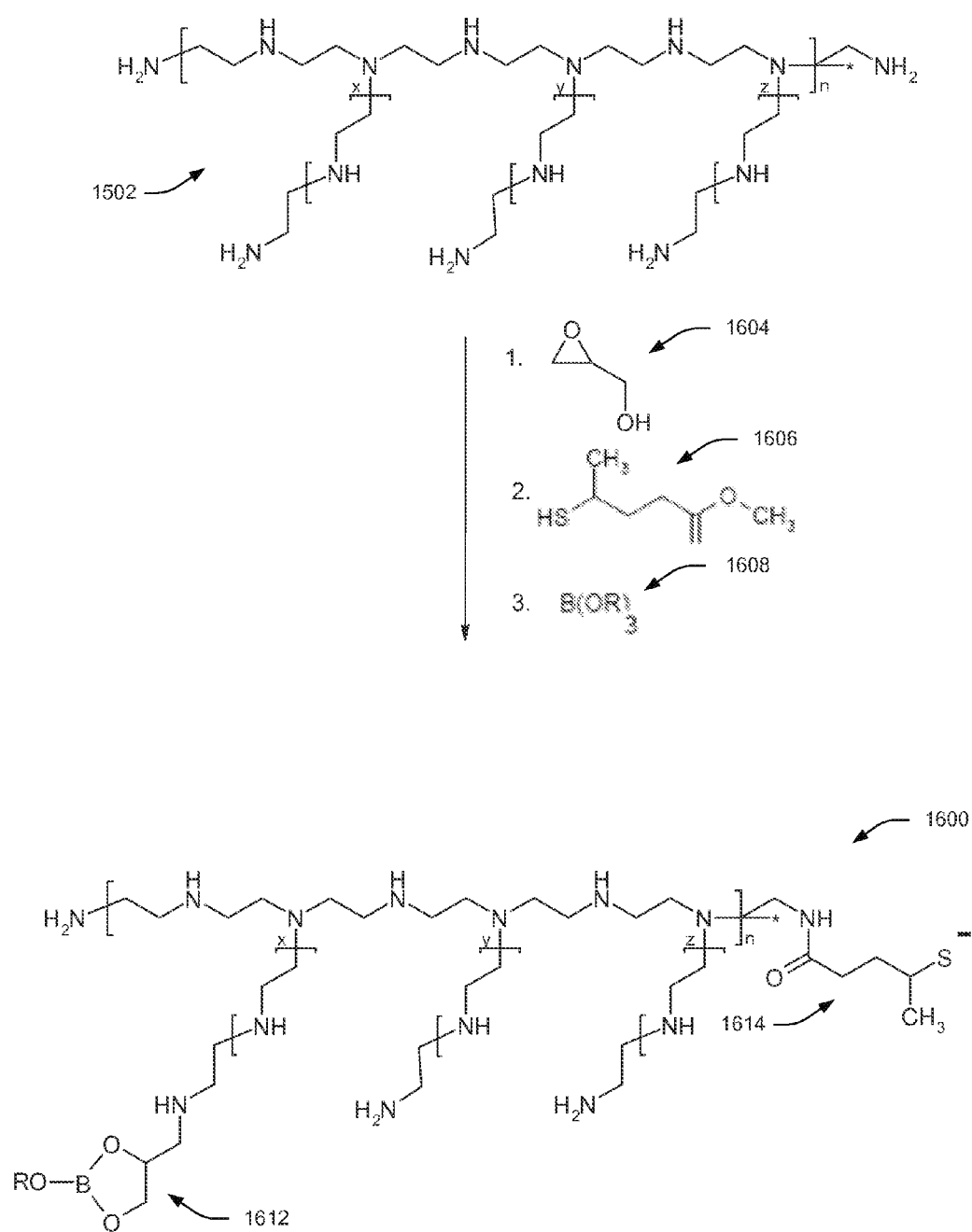
FIG. 16 summarizes the reaction used to make Applicant's antipathogenic polymer 1600 comprising a polyethylenimine backbone with borate ester, sulfide, and/or hydroxyl functional groups.

Referring to FIG. 16, Applicant reacts polyethylenimine (PEI) 1502 with an epoxide 1604, a thio ester 1606, and a borate ester 1608 to form a PEI polymer 1600 with sulfide end groups and borate end groups.

In various embodiments, the borate ester is of the form of (1610) where R' is an alkenyl functional group or a phenyl group.

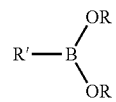

1610

In one embodiment, stoichiometric equivalent amounts of the thio ester, or the borate ester, or the epoxide are used. In one embodiment, the epoxide is glycidol.

Polymer 1600 provides two functionalities to trap and immobilize pathogenic spores. The sulfide end groups will trap and immobilize spores by forming a disulfide bond with the sulfhydryl functional groups on the outer covering of the spore's coat. The borate end groups will trap and immobilize spores by binding to form a coordination complex with the hydroxyl functional groups on the carbohydrate groups present on the spore's coat.

Figure 17A:
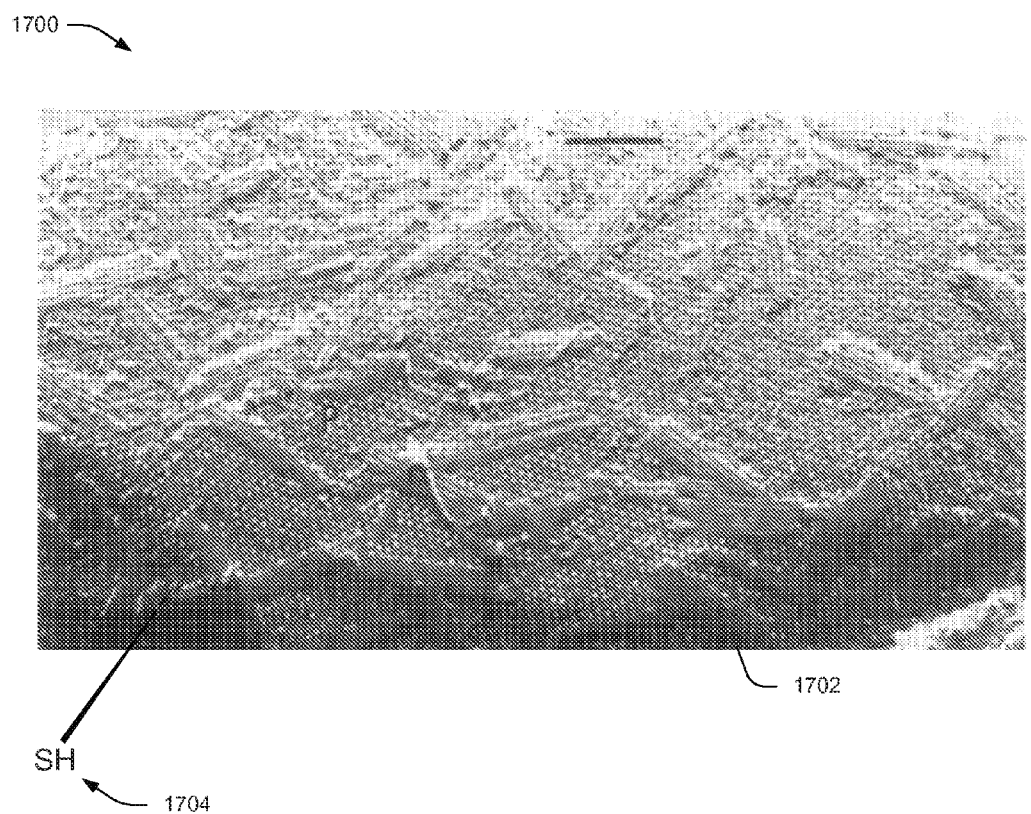
FIG. 17(*a*) illustrates a spore coat comprising a sulfhydryl functional group.
Figure 17B:
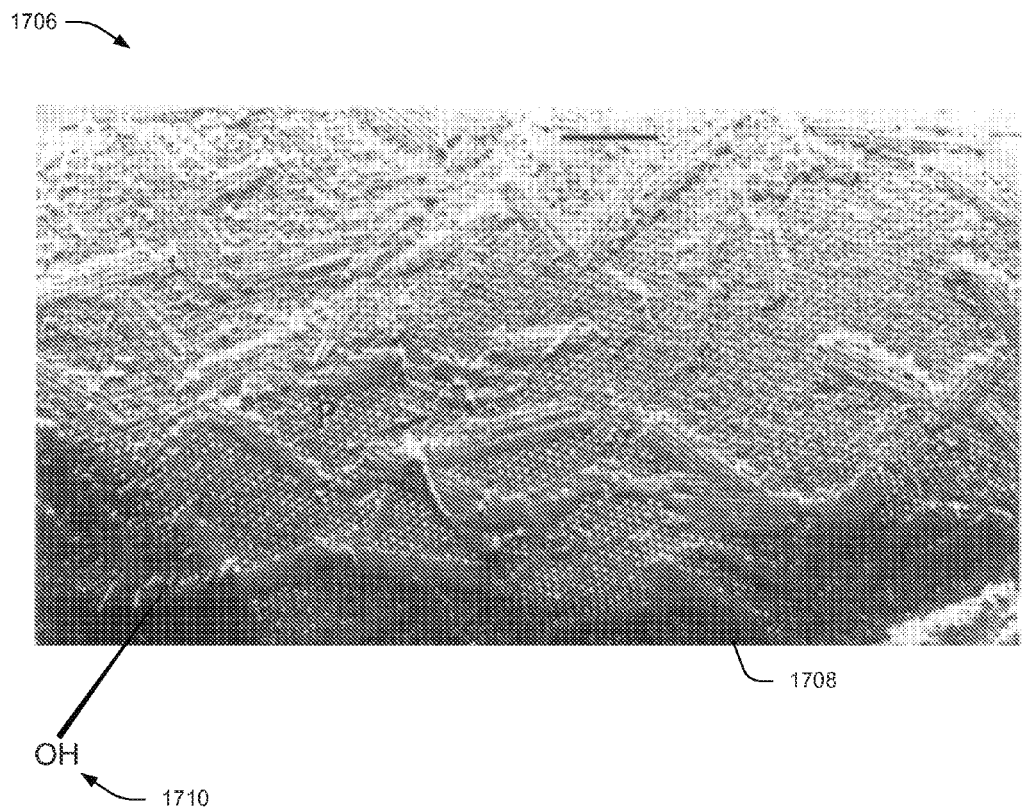

FIG. 17(a) illustrates a spore coat 1702 with a pendent/surface sulfhydryl functional group 1704. FIG. 7(b), a representation 1706 of a spore coat 1708 with a hydroxyl functional group 1710 is depicted.

Figure 18:
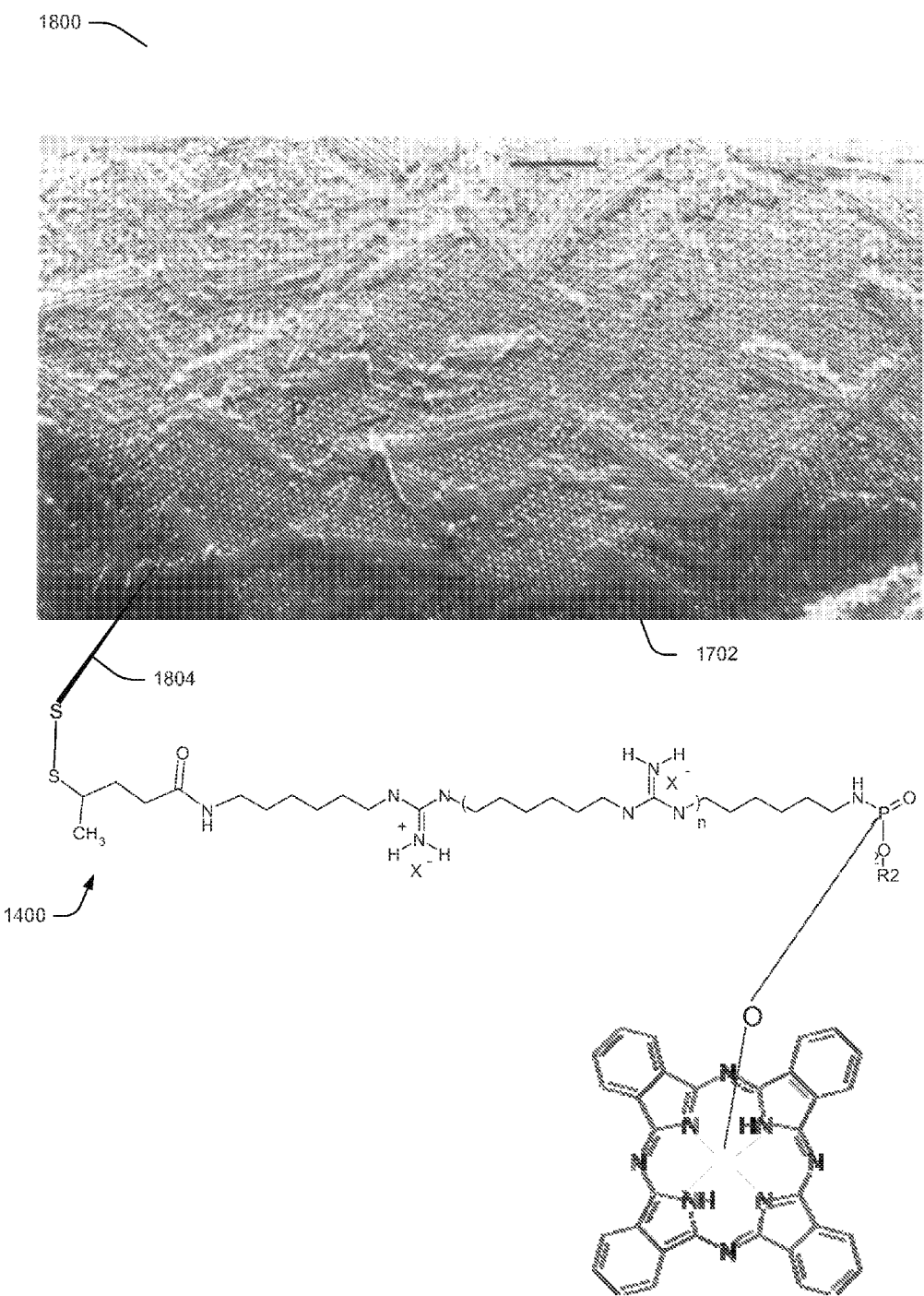
FIG. 18 illustrates Applicant's antipathogenic polymer 1400 comprising a photocatalyst and attached to a spore coat via a disulfide bond.

Referring to FIG. 18, 1 Applicant's co-polymer 1400, as shown in FIG. 14 and described hereinabove, is illustrated attached to the spore coat 1702 by a disulfide bond 1804.

Figure 19:
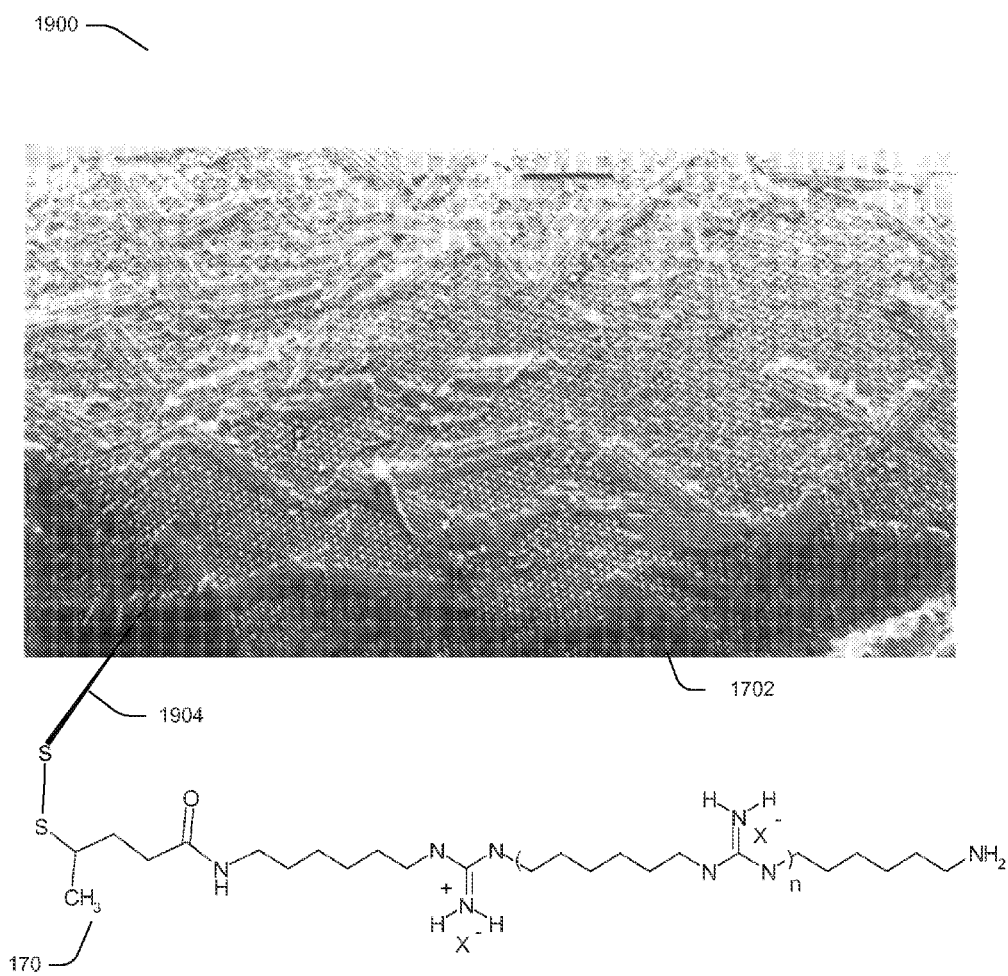
FIG. 19 illustrates Applicant's antipathogenic polymer 170 attached to a spore coat via a disulfide bond.

FIG. 19 illustrates Applicant's co-polymer 170 attached to the spore coat 1702 by a disulfide bond 1904.

Figure 20:
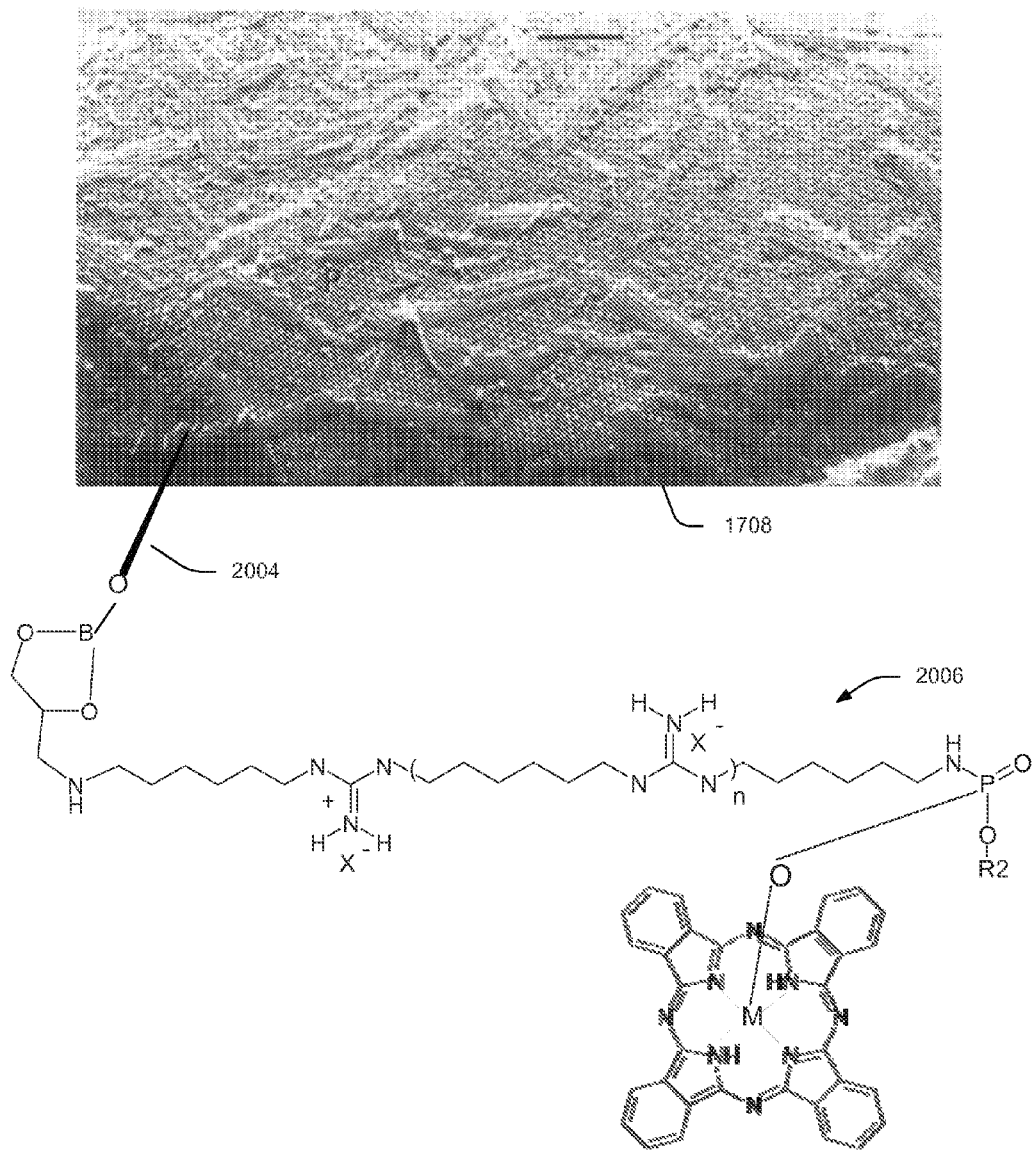
FIG. 20 illustrates Applicant's antipathogenic polymer 2006 comprising a photocatalyst and attached to a hydroxyl group on a spore coat.

FIG. 20 illustrates Applicant's antipathogenic co-polymer 2006 attached to a hydroxyl group on the spore coat via a borate ester. Applicant forms antipathogenic co-polymer 2006 by reacting co-polymer 122 with P2O5, then with R2OH, then with an epoxide 1604, and then with a borate ester 1608.

Figure 21:
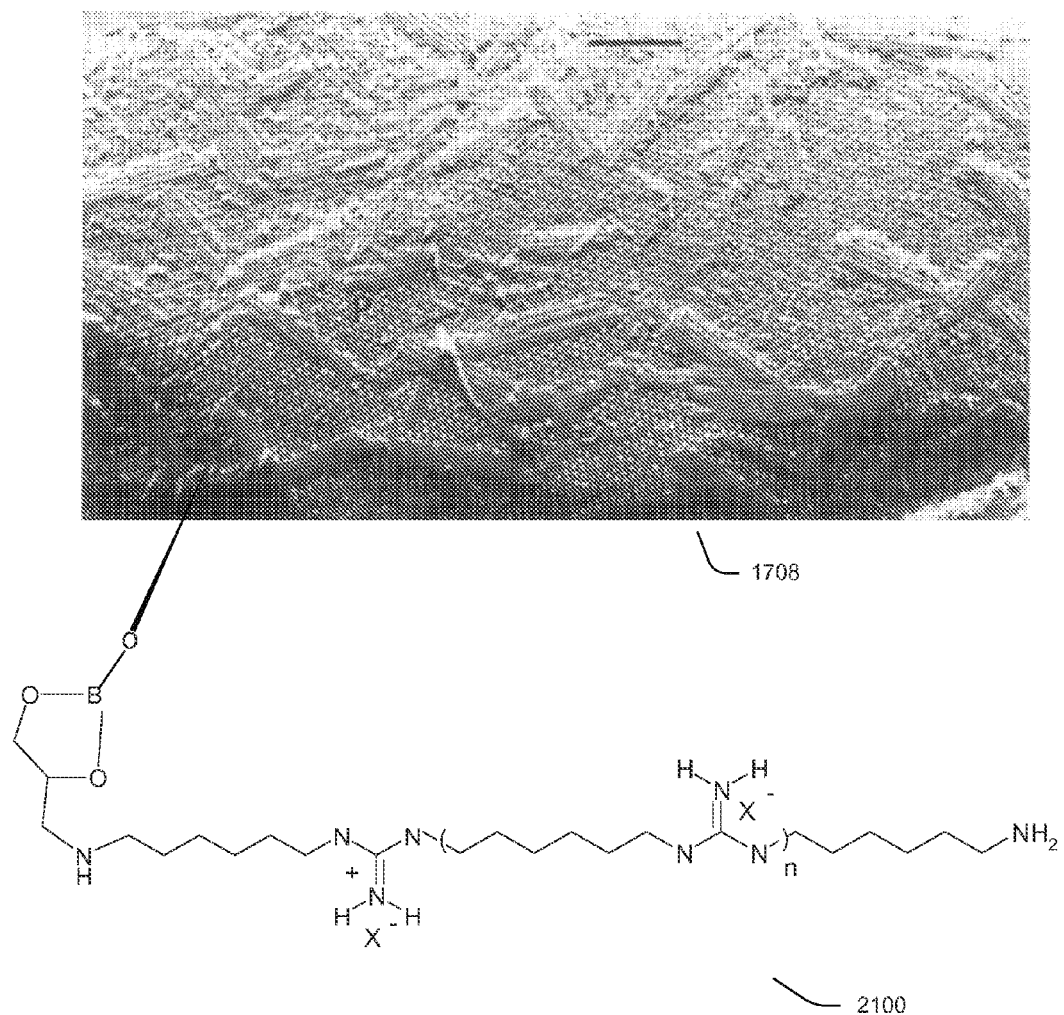
FIG. 21 illustrates Applicant's antipathogenic polymer 2100 attached to the hydroxyl group on a spore coat.

FIG. 21 illustrates Applicant's antipathogenic co-polymer 2100 attached to the hydroxyl group on the spore coat 1708 via a borate ester. Applicant forms antipathogenic co-polymer 2100 by reacting co-polymer 122 with an epoxide 1604, and then with a borate ester 1608.

Figure 22:
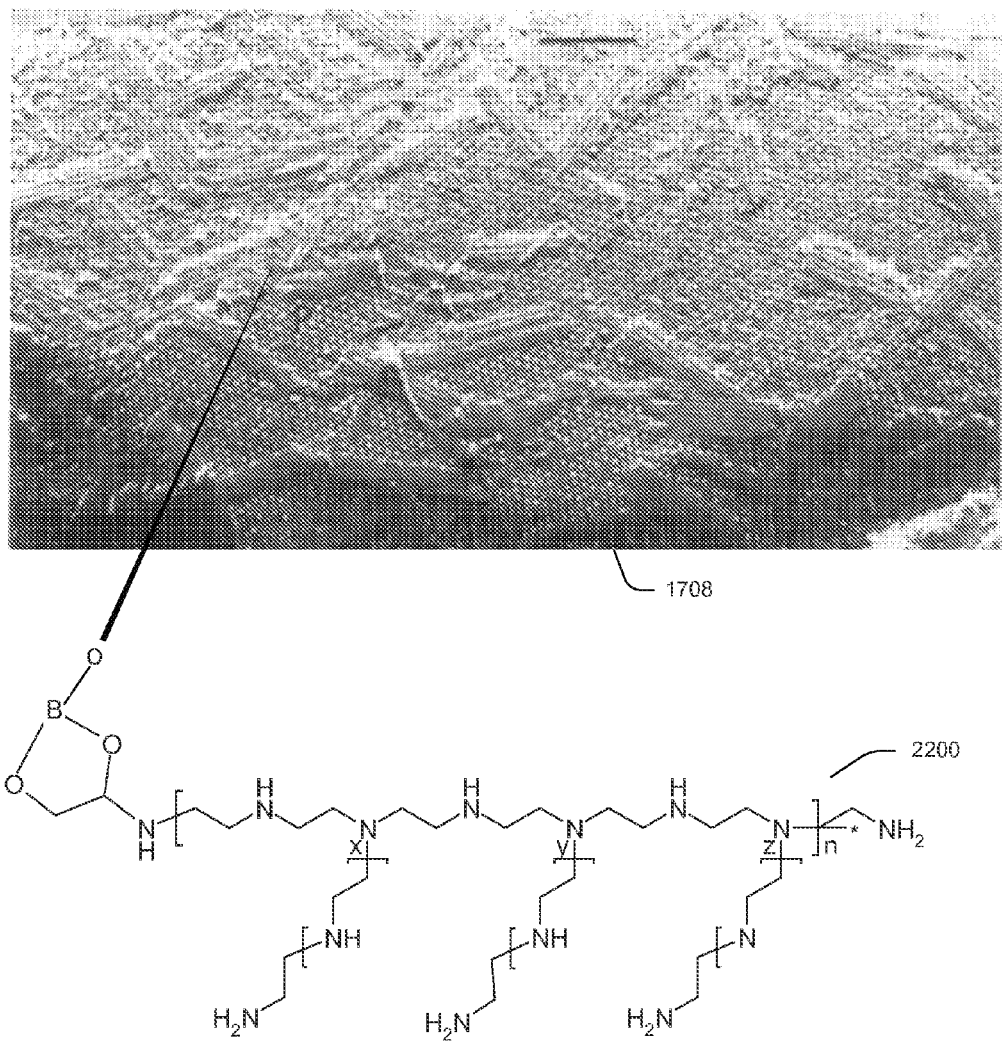
FIG. 22 illustrates Applicant's antipathogenic polymer 2200, which contains a borate-substituted polyethylenimine polymer, attached to the hydroxyl group on a spore coat.

FIG. 22 illustrates Applicant's antipathogenic polymer 2200 attached to a hydroxyl group on the spore coat 1708 via a borate ester. Applicant forms antipathogenic co-polymer 2200 by reacting polyethyleneimine (PEI) with an epoxide 1604, and then with a borate ester 1608.

FIG. 22 shows a single borate moiety attached to the PEI backbone. In other embodiments, a plurality of primary amine moieties disposed in the PEI backbone are substituted with a borate functional group. In one embodiment, all or nearly all primary amino end groups of the PEI backbone are functionalized with a borate end group. In one embodiment, Applicant's antipathogenic polymer contains PEI with different levels of saturation of borate functional groups.

Figure 23:
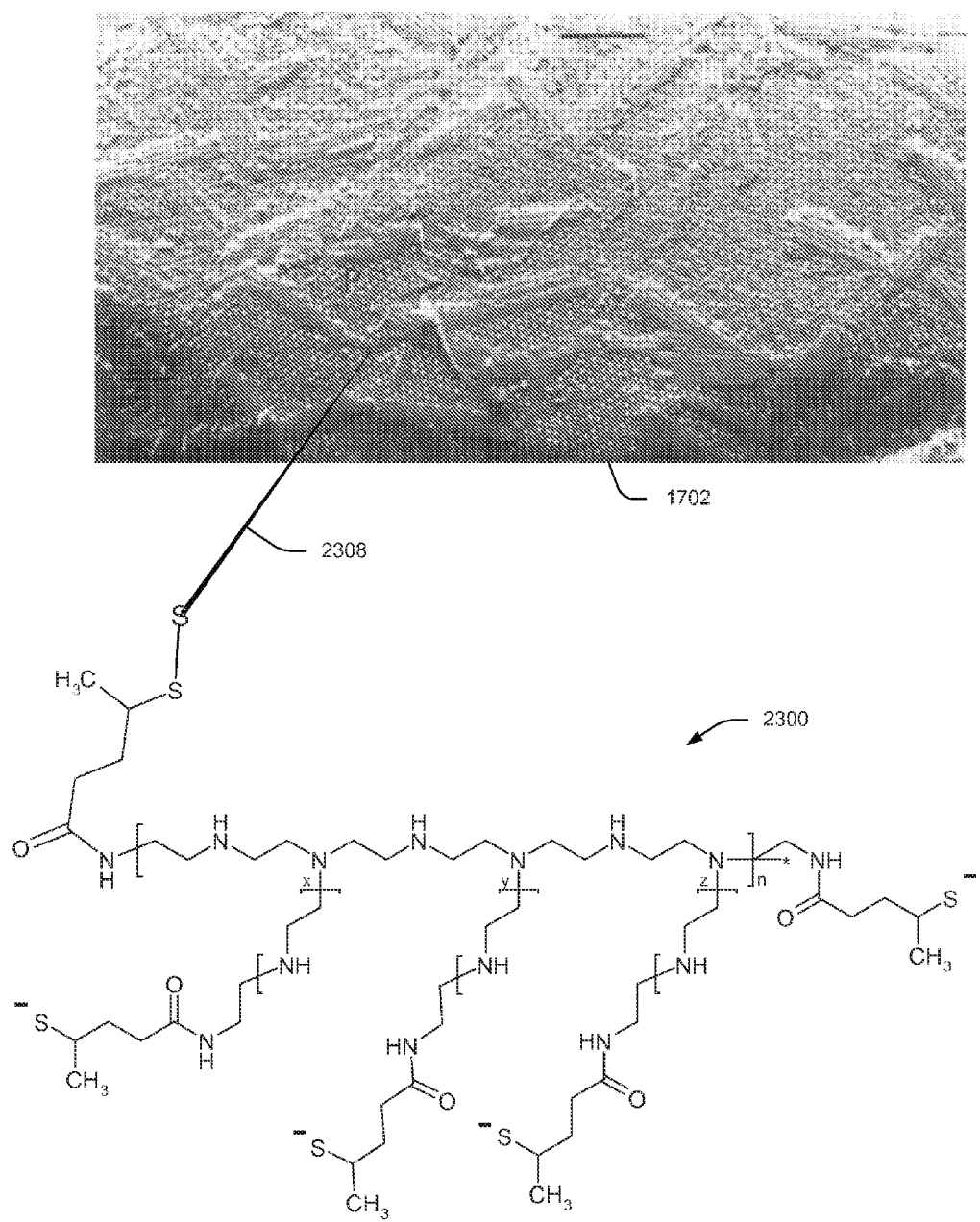
FIG. 23 illustrates Applicant's antipathogenic polymer 2300 comprising a substituted polyethylenimine polymer and attached to a spore coat via a disulfide bond.

FIG. 23 illustrates Applicant's antipathogenic polymer 2300 attached to a spore coat 1702 via a disulfide linkage 2308. FIG. 23 shows Applicant's antipathogenic modified-PEI polymer 2300 in which all end groups comprise a sulfide group. In other embodiments, fewer than all the end groups on Applicant's antipathogenic modified-PEI polymer 2300 comprise a sulfide group.

In each of FIGS. 18 and 20, in addition to immobilizing the spore via the disulfide or borate coordination bonding, both the guanidinium salt moieties and singlet oxygen generated by the photocatalyst moieties in Applicant's co-polymer attack the spore, resulting in a significant spore kill rate.

Microbiological tests were conducted to determine the efficacy of Applicant's antipathogenic polymer. These Test Results are not intended as a limitation, however, upon the scope of Applicants' invention.

Test Results

Various strains of bacteria, including both vegetative (i.e., active) bacteria and spores, were exposed to Applicant's antipathogenic co-polymer 130, wherein R3 comprises $C_9H_{19}$, and co-polymer 160. The reduction of live bacteria exposed to the co-polymer was measured at different time intervals and compared against a control. The results are expressed in $\log_{10}$ reduction. For example, a $\log_{10}$ reduction of 2 represents a kill percentage of 99%, where a $\log_{10}$ reduction of 5 represents a kill percentage of 99.999%. "SD" in each chart refers to "standard deviation."

Reduction of *Escherichia coli* (ATCC #25922) (stationary phase cells) after exposure to Applicant's antipathogenic co-polymer (100 ppm). The experiment was conducted with duplicate samples at room temperature in sterile phosphate-buffered saline (pH 7.4). The original bacterial titer was $1.72 \times 10^7$ Colony Forming Units (CFU)/ml.

| Time (min) | Control $\log_{10}$ Reduction ± SD | Co-Polymer 130 $\log_{10}$ Reduction ± SD | Co-Polymer 160 $\log_{10}$ Reduction ± SD |
|---|---|---|---|
| 1 | — | >5.54 ± 0.00 | >5.39 ± 0.21 |
| 5 | — | >5.54 ± 0.00 | >5.54 ± 0.00 |
| 15 | — | >5.54 ± 0.00 | >5.54 ± 0.00 |
| 30 | 0.01 ± 0.03 | >5.54 ± 0.00 | >5.54 ± 0.00 |

Reduction of *Enterococcus faecalis* (ATCC #19433) (stationary phase cells) after exposure to Applicant's antipathogenic co-polymer (100 ppm). The experiment was conducted with duplicate samples at room temperature in sterile phosphate-buffered saline (pH 7.4). The original bacterial titer was $1.29 \times 10^7$ CFU/ml.

| Time (min) | Control $\log_{10}$ Reduction ± SD | Co-Polymer 130 $\log_{10}$ Reduction ± SD | Co-Polymer 160 $\log_{10}$ Reduction ± SD |
|---|---|---|---|
| 1 | — | 4.24 ± 0.04 | <1.11 ± 0.00 |
| 5 | — | >5.11 ± 0.21 | 2.30 ± 0.13 |
| 15 | — | >5.41 ± 0.00 | 3.08 ± 0.21 |
| 30 | 0.03 ± 0.07 | >5.41 ± 0.00 | 4.09 ± 0.06 |

Reduction of *Acinetobacter baumannii* (ATCC #19606) (stationary phase cells) after exposure to Applicant's antipathogenic co-polymer (100 ppm). The experiment was conducted with duplicate samples at room temperature in sterile phosphate-buffered saline (pH 7.4). The original bacterial titer was $2.31 \times 10^7$ CFU/ml.

| Time (min) | Control $\log_{10}$ Reduction ± SD | Co-Polymer 130 $\log_{10}$ Reduction ± SD | Co-Polymer 160 $\log_{10}$ Reduction ± SD |
|---|---|---|---|
| 1 | — | >5.19 ± 0.67 | 5.08 ± 0.16 |
| 5 | — | >5.66 ± 0.00 | >5.66 ± 0.00 |
| 15 | — | >5.66 ± 0.00 | >5.66 ± 0.00 |
| 30 | 0.16 ± 0.25 | >5.66 ± 0.00 | >5.66 ± 0.00 |

Reduction of *Pseudomonas aeruginosa* (ATCC #27313) (stationary phase cells) after exposure to Applicant's antipathogenic co-polymer (100 ppm). The experiment was conducted with duplicate samples at room temperature in sterile phosphate-buffered saline (pH 7.4). The original bacterial titer was $3.68 \times 10^7$ CFU/ml.

| Time (min) | Control $\log_{10}$ Reduction ± SD | Co-Polymer 130 $\log_{10}$ Reduction ± SD | Co-Polymer 160 $\log_{10}$ Reduction ± SD |
|---|---|---|---|
| 1 | — | 2.86 ± 0.65 | 2.99 ± 0.05 |
| 5 | — | 5.63 ± 0.34 | >5.18 ± 0.98 |
| 15 | — | >5.87 ± 0.00 | >5.87 ± 0.00 |
| 30 | 0.05 ± 0.06 | >5.87 ± 0.00 | >5.87 ± 0.00 |

Reduction of methicillin resistant *Staphylococcus aureus* (MRSA; clinical isolate) (stationary phase cells) after exposure to Applicant's antipathogenic co-polymer (100 ppm). The experiment was conducted with duplicate samples at room temperature in sterile phosphate-buffered saline (pH 7.4). The original bacterial titer was $2.15 \times 10^7$ CFU/ml.

| Time (min) | Control $\log_{10}$ Reduction ± SD | Co-Polymer 130 $\log_{10}$ Reduction ± SD | Co-Polymer 160 $\log_{10}$ Reduction ± SD |
|---|---|---|---|
| 1 | — | 3.72 ± 0.05 | 1.43 ± 0.39 |
| 5 | — | 3.54 ± 0.16 | 2.93 ± 0.91 |
| 15 | — | 3.83 ± 0.06 | 3.64 ± 0.13 |
| 30 | 0.01 ± 0.00 | 3.82 ± 0.19 | 3.83 ± 0.17 |

Reduction of *Bacillus globigii* (*atrophaeus*) spores after exposure to Applicant's antipathogenic co-polymer (100 ppm). The experiment was conducted with duplicate samples at room temperature in sterile phosphate-buffered saline (pH 7.4). The original bacterial titer was $2.14 \times 10^7$ CFU/ml.

| Time (min) | Control Log$_{10}$ Reduction ± SD | Co-Polymer 130 Log$_{10}$ Reduction ± SD | Co-Polymer 160 Log$_{10}$ Reduction ± SD |
|---|---|---|---|
| 0.5 | — | 0.46 ± 0.08 | 0.34 ± 0.05 |
| 1 | — | 0.47 ± 0.05 | 0.52 ± 0.03 |
| 2 | — | 0.72 ± 0.09 | 0.72 ± 0.28 |
| 4 | 0.25 ± 0.19 | 0.97 ± 0.04 | 0.89 ± 0.12 |
| 24 | 0.00 ± 0.05 | 1.02 ± 0.37 | 0.77 ± 0.09 |

Reduction of *Salmonella enterica* Typhimurium (ATCC 23564) (stationary phase cells) after exposure to Applicant's antipathogenic co-polymer (100 ppm). The experiment was conducted with duplicate samples at room temperature in sterile phosphate-buffered saline (pH 7.4). The original bacterial titer was $1.60 \times 10^7$ CFU/ml.

| Time (min) | Control Log$_{10}$ Reduction ± SD | Co-Polymer 130 Log$_{10}$ Reduction ± SD | Co-Polymer 160 Log$_{10}$ Reduction ± SD |
|---|---|---|---|
| 1 | — | 5.11 ± 0.55 | 2.35 ± 0.54 |
| 5 | — | >5.50 ± 0.00 | 3.52 ± 0.89 |
| 15 | — | >5.50 ± 0.00 | >4.98 ± 0.74 |
| 30 | 0.28 ± 0.14 | >5.50 ± 0.00 | >5.50 ± 0.00 |

Reduction of *Listeria monocytogenes* (ATCC 19115) (stationary phase cells) after exposure to Applicant's antipathogenic co-polymer (100 ppm). The experiment was conducted with duplicate samples at room temperature in sterile phosphate-buffered saline (pH 7.4). The original bacterial titer was $3.08 \times 10^7$ CFU/ml.

| Time (min) | Control Log$_{10}$ Reduction ± SD | Co-Polymer 130 Log$_{10}$ Reduction ± SD | Co-Polymer 160 Log$_{10}$ Reduction ± SD |
|---|---|---|---|
| 1 | — | >5.79 ± 0.00 | 3.07** ± 0.36 |
| 5 | — | >5.79 ± 0.00 | 5.18** ± 0.98 |
| 15 | — | >5.79 ± 0.00 | >5.79 ± 0.00 |
| 30 | 0.00 ± 0.01 | >5.79 ± 0.00 | >5.79 ± 0.00 |

**The recovered colonies required two times the normal incubation time before they could be counted, indicating that these bacteria were injured.

Reduction of MS2 coliphage (ATCC 15597-B1) after exposure to Applicant's antipathogenic co-polymer (100 ppm). The experiment was conducted with duplicate samples at room temperature in sterile phosphate-buffered saline (pH 7.4). The original viral titer was $8.03 \times 10^6$ PFU/ml.

| Time (hours) | Control Log$_{10}$ Reduction ± SD | Co-Polymer 130 represented in FIG. 1 Log$_{10}$ Reduction ± SD | Co-Polymer 160 Log$_{10}$ Reduction ± SD |
|---|---|---|---|
| 0.5 | — | 3.18 ± 0.10 | 2.47 ± 0.11 |
| 1 | — | 3.56 ± 0.04 | 3.49 ± 0.05 |
| 3 | — | 2.69 ± 0.00 | 3.36 ± 0.00 |
| 6 | 0.07 ± 0.26 | 3.14 ± 0.24 | 3.73 ± 0.39 |
| 24 | 0.01 ± 0.59 | >5.21 ± 0.00 | >5.21 ± 0.00 |

Reduction of vancomycin-resistant *Enterococcus* (VRE; clinical isolate) (stationary phase cells) after exposure to Applicant's antipathogenic co-polymer (100 ppm). The experiment was conducted with duplicate samples at room temperature in sterile phosphate-buffered saline (pH 7.4). The original bacterial titer was $1.34 \times 10^7$ CFU/ml.

| Time (min) | Control Log$_{10}$ Reduction ± SD | Co-Polymer 130 Log$_{10}$ Reduction ± SD | Co-Polymer 160 Log$_{10}$ Reduction ± SD |
|---|---|---|---|
| 1 | — | 4.08 ± 0.12 | 0.85 ± 0.07 |
| 5 | — | >5.08 ± 0.50 | 1.19 ± 0.17 |
| 15 | — | >5.43 ± 0.00 | 1.53 ± 0.05 |
| 30 | 0.04 ± 0.05 | >5.43 ± 0.00 | 2.16 ± 0.29 |

Reduction of *Bacillus globigii* (*atrophaeus*) spores after exposure to Applicant's antipathogenic co-polymer (4500 ppm). The experiment was conducted with duplicate samples at room temperature in sterile phosphate-buffered saline (pH 7.4). The original bacterial titer was $7.13 \times 10^6$ CFU/ml.

| Time (hours) | Control Log$_{10}$ Reduction ± SD | Co-Polymer 130 Log$_{10}$ Reduction ± SD | Co-Polymer 160 Log$_{10}$ Reduction ± SD |
|---|---|---|---|
| 0.5 | — | 1.50 ± 0.04 | 2.97** ± 0.68 |
| 1 | — | 2.09 ± 0.01 | >4.85** ± 0.42 |
| 2 | — | 2.11 ± 0.04 | >5.15** ± 0.00 |
| 4 | — | 3.43 ± 0.17 | >5.15** ± 0.00 |
| 24 | 0.15 ± 0.05 | 4.49** ± 0.26 | >5.15** ± 0.00 |

**The spores were removed from suspension (possibly due to hydrophobic exclusion) and were found in a ring just above the liquid in the shaking flask. The antimicrobial solution also went from turbid (even prior to the addition of the spores) to clear during this process. The spores from the ring were still viable; however, this constitutes <0.01-log$_{10}$ reduction in the total number of bacteria in the flask. Therefore, the reductions observed with both antimicrobials are still significant.

Reduction of MS2 coliphage (ATCC 15597-B1) after exposure to Applicant's antipathogenic co-polymer (100 ppm). The experiment was conducted with duplicate samples at room temperature in sterile phosphate-buffered saline (pH 7.4). The original viral titer was $1.02 \times 10^7$ PFU/ml. The entire area of the flask above the line of the liquid was swabbed and test to reveal that the virus was found in concentrations of approximately $1.8 \times 10^3$ PFU and $4.7 \times 10^4$ PFU in this ring. This constitutes losses of <0,01-log$_{10}$ of the total coliphages in the flask. Therefore, the reductions observed with both antimicrobial solutions are still significant.

| Time (min) | Control Log$_{10}$ Reduction ± SD | Co-Polymer 130 Log$_{10}$ Reduction ± SD | Co-Polymer 160 Log$_{10}$ Reduction ± SD |
|---|---|---|---|
| 1 | — | 2.16 ± 0.14 | 0.96 ± 0.03 |
| 5 | — | 3.36 ± 0.12 | 1.54 ± 0.03 |
| 15 | — | 3.35 ± 0.24 | 2.03 ± 0.03 |
| 30 | — | 3.58 ± 0.29 | 2.09 ± 0.03 |
| 60 | 0.01 ± 0.05 | 3.50 ± 0.64 | 2.17 ± 0.06 |

Reduction of *Mycobacterium fortuitum* (ATCC 6841) (stationary phase cells) after exposure to Applicant's antipathogenic co-polymer (100 ppm). The experiment was conducted with duplicate samples at room temperature in sterile phosphate-buffered saline (pH 7.4). The original bacterial titer was $2.15 \times 10^6$ CFU/ml.

| Time (hours) | Control Log$_{10}$ Reduction ± SD | Co-Polymer 130 Log$_{10}$ Reduction ± SD | Co-Polymer 160 Log$_{10}$ Reduction ± SD |
|---|---|---|---|
| 1 | — | 0.80 ± 0.07 | 0.48 ± 0.02 |
| 3 | — | 1.29 ± 0.31 | 0.39 ± 0.26 |
| 6 | — | 1.47 ± 0.02 | 0.48 ± 0.15 |
| 24 | 0.00 ± 0.00 | 2.16 ± 0.10 | 0.43 ± 0.04 |

Reduction of *Mycobacterium fortuitum* (ATCC 6841) (stationary phase cells) after exposure to Applicant's antipathogenic co-polymer (500 ppm). The experiment was conducted with duplicate samples at room temperature in sterile phosphate-buffered saline (pH 7.4). The original bacterial titer was $2.12 \times 10^7$ CFU/ml.

| Time (hours) | Control $\text{Log}_{10}$ Reduction ± SD | Co-Polymer 130 $\text{Log}_{10}$ Reduction ± SD | Co-Polymer 160 $\text{Log}_{10}$ Reduction ± SD |
| --- | --- | --- | --- |
| 1 | | 0.78 ± 0.06 | 0.68 ± 0.00** |
| 3 | | 1.79 ± 0.19 | 1.34 ± 0.00 |
| 6 | 0.01 ± 0.13 | 3.05 ± 0.34 | 1.76 ± 0.00 |
| 24 | 0.63 ± 0.07 | >5.63 ± 0.00 | 1.86 ± 0.00 |

**Only one sample was used in the calculation of the bacterial reduction.

In one embodiment, Applicant's antipathogenic compositions as described herein are disposed on hard substrates, including without limitation, concrete, drywall, painted surfaces, glass, and other architectural surfaces. In one embodiment, Applicant's antipathogenic compositions as described herein are disposed on soft surfaces, including without limitation, sheets, hospital gowns, facemasks, and other fabrics. Treated materials exhibit antipathogenic properties by immobilizing and/or killing exposed pathogens.

Figure 24:
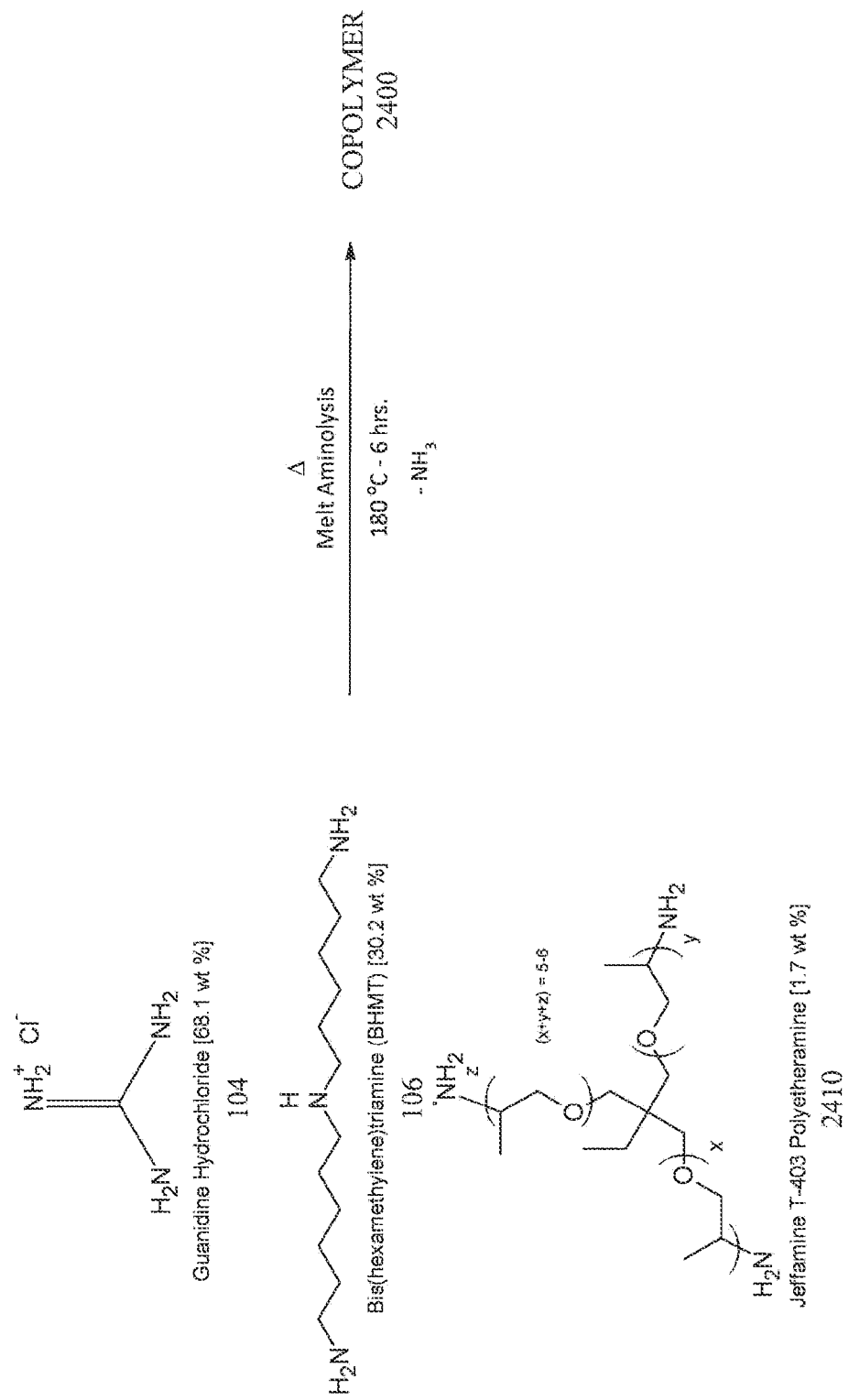
FIG. 24 shows the starting materials used to prepare Applicant's branched antipathogenic guanidinium copolymer 2400.

Referring now to FIG. 24, Applicant has prepared a branched random copolymer 2400 by the reaction of guanidine hydrochloride 104, Bis(hexamethylenetriamine) 106, and amino-capped polyether 2410. In certain embodiments, amino-capped polyether 2410 comprises Jeffamine T-403 sold in commerce by the Huntsman corporation.

Figure 25:
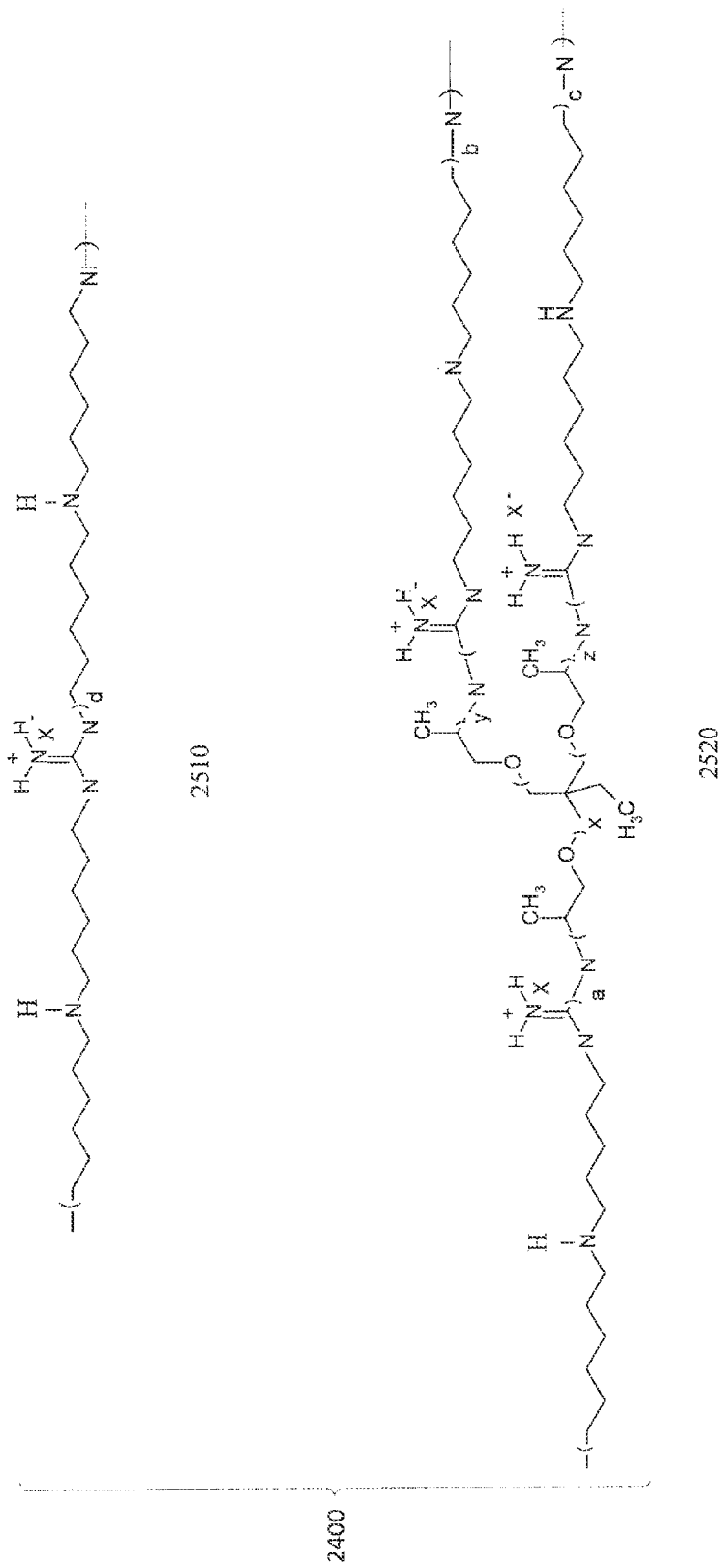
FIG. 25 shows the repeat units comprising Applicant's branched antipathogenic guanidinium copolymer 2400.

Referring now to FIG. 25, in certain embodiments copolymer 2400 comprises linear repeat units 2510, wherein (d) is between about 10 and about 100, in combination with branching repeat unit 2520, wherein (x)+(y)+(z) is between about 3 and about 10, and wherein (a), (b), and (c) are each independently between about 10 and about 100.

In order to promote the adhesion of the Applicant's copolymer upon a wide variety of surfaces, in certain embodiments Applicant grafts silyl ester moieties onto copolymer 2400. These silyl ester moieties are grafted via a ring opening reaction between the secondary amine groups along the copolymer 2400 backbone (e.g. previously unreacted secondary amines present on the BHMT derived repeat units) and the glycidyl functional group present upon gamma-glycidoxypropyltrimethoxysilane ester to give silylated copolymer 2600 comprising repeat units 2610 and 2620. The silylation procedure for modifying copolymer 1400 is detailed below.

COPOLYMER 1400 +

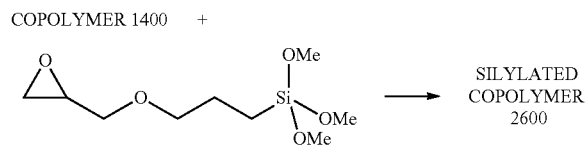

→ SILYLATED COPOLYMER 2600

Figure 26:
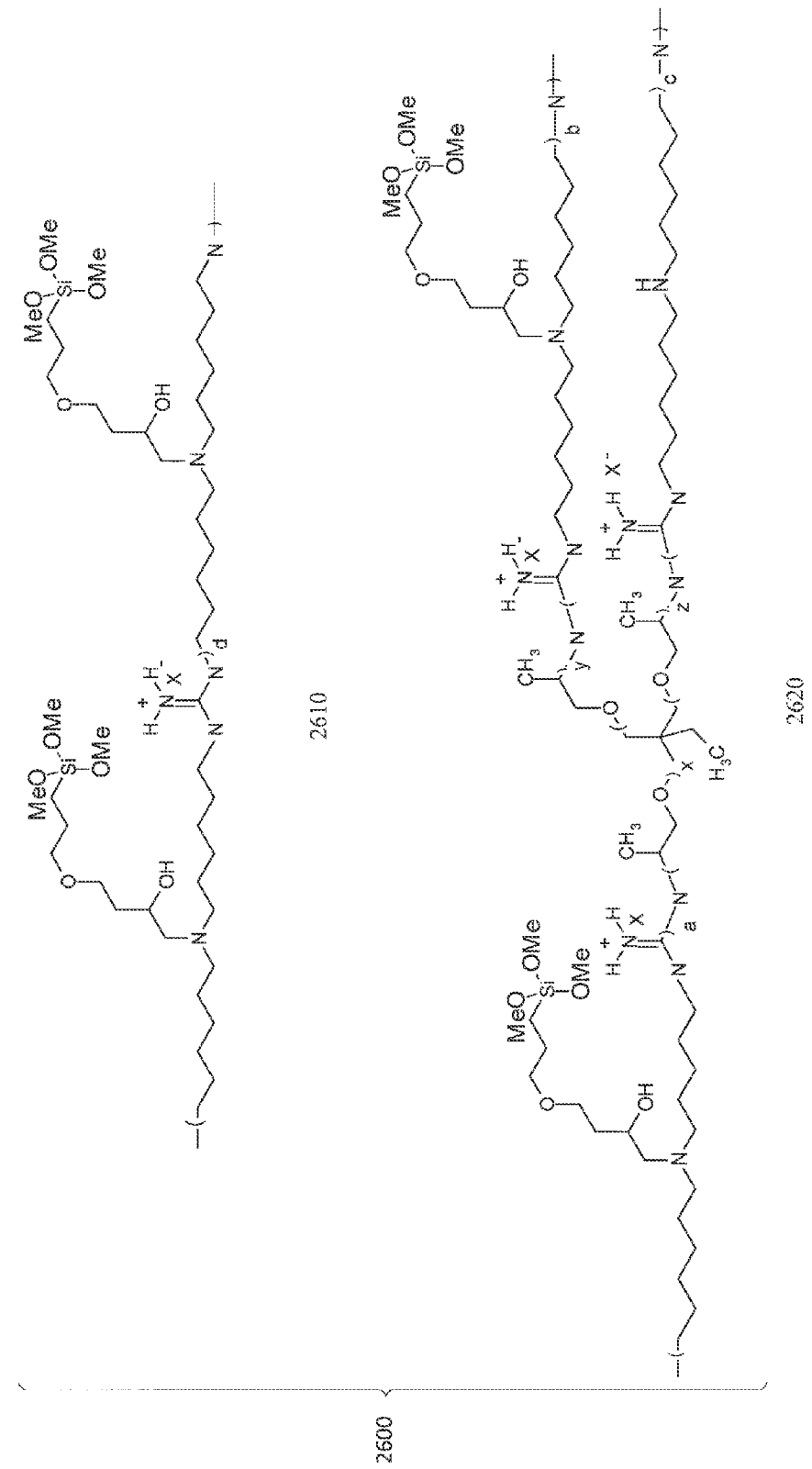
FIG. 26 shows Applicant's silylated branched antipathogenic guanidinium copolymer 2600.

Referring now to FIG. 26, in certain embodiments silylated copolymer 2600 comprises silylated linear repeat units 2610, wherein (d) is between about 10 and about 100, in combination with silylated branching repeat unit 2620, wherein (x)+(y)+(z) is between about 3 and about 10, and wherein (a), (b), and (c) are each independently between about 10 and about 100. Alternative silane ester reagents reactive towards secondary amines could also be employed in lieu of glycidoxypropyltrimethoxysilane including but not limited to chloropropyltrialkoxysilane, bromopropyltrialkoxyoxysilane, iodopropyltrialkoxysilane, isocyanatopropyltrialkoxysilane, the Michael Addition product between maleic anhydride and mercaptopropyltrialkoxysilane. In addition, in certain embodiments silylation is accomplished using a monosubstituted dichlorotriazine product formed via reaction of one molar equivalent of cyanuric chloride and either aminopropyltrialkoxysilane or mercaptopropyltrialkoxysilane. The secondary amine moieties on polymer backbones displace one of the chlorines on the triazine ring thereby effecting a silylation of copolymer 2400. In certain other embodiments cyanuric chloride can be directly grafted onto the secondary amine groups on the polymer backbone without pre-reaction with the aforementioned amine or mercaptopropylalkoxysilane esters. The resultant dichlorotriazine modified polymer backbone is capable of being grafted upon various surfaces.

Applicant has discovered that copolymer 2600 has the capacity to securely and readily bind to a wide variety of surfaces; imparting broad spectrum anti-pathogenic properties to the treated surfaces. In comparison to conventional disinfectants, copolymer 2600 is highly persistent and does not leach from the treated surface.

Example 1

Preparation of Copolymer 2400

A 0.8 L stainless steel (316 L Stainless Steel) reaction vessel was outfitted with an electric DC motor driven paddle stirrer, thermocouple, a gas outlet port on its lid and a silicone embedded electrical resistance heating element wrapped around its circumference. The reaction vessel was then charged with 193.70 g of bis-hexamethylenetriamine bifunctional primary amine monomer (BHMT-HP; Invista Corporation) (0.8993 mol) and heated until molten, 85.91 g of Guanidine-Hydrochloride bifunctional monomer (0.8993 mol) and 4.76 g of Jeffamine T-403 trifunctional monomer: Huntsman Corporation (stated as 6.3 meq amine groups/g Jeffamine) was subsequently added to the melt. The lid was affixed to the vessel and the contents of the reactor were flushed for five minutes with inert nitrogen gas to remove any residual oxygen within the reactor.

The gas exhaust port on the reactor lid was connected to a scrubber capable of removing the ammonia gas by product resulting from melt phase aminolysis reaction between the amine and guanidine hydrochloride monomers. Sufficient aqueous phosphoric acid solution was present in the scrubber on a molar basis to scavenge the ammonia and convert it to diammonium phosphate salt solute.

The reactor temperature was raised to 110° C. accompanied by slowly raising the stirrer rate in the melt to 150 revolutions per minute (RPM). This reactor temperature and stirring rate was maintained for 1.5 hours then the reactor temperature was increased to 160° C. for an additional hour. Finally the reactor was raised up to 180° C. The mixture was apparently still highly fluid Newtonian liquid melt since there was very little change in the stirrer shaft mixing torque observed up to this point. After a 3.5 hour reaction heating isotherm, the stirrer rate was gradually increased to 250 RPM and the stirrer mixing torque immediately increased to 2 in-lbs indicative of polymer formation.

After a total time of 5 hours, the stirrer torque read 6 to 7 in-lbs while the stirrer was rotating at a 250 RPM rate. The stir rate was then decreased to 200 RPM. After another 15 minutes the torque was starting to climb again, and the stirrer rotation rate was reduced to 150 RPM. Within a few minutes a mixing torque of between 5-6 in-lbs at 150 RPM was observed. The stirrer was gradually slowed until it stopped. A total reaction time of 6 hours and 10 minutes was noted.

The resin turned slightly cloudy upon allowing to cool. Significant portion of resin were removed from the reactor while still warm using Teflon spatulas. The remaining resin was removed from the reactor as a hard glassy solid by cooling the reactor's exterior with a dry ice/IPA bath. It is believed that the final polymer product isolated from the reactor was a branched random copolymer having alkyl guanidinium, polyether and secondary amine residues along its backbone. A schematic for the overall polymerization reaction and suggested chemical structures for the copolymer synthesis is depicted in the figures below.

An unexpected feature of this copolymer is that it forms homogeneous solutions within water and denatured alcohol solvents. Given that trifunctional Jeffamine monomer was utilized in its synthesis, one would expect a crosslinked product to be formed within the reactor but this is not observed given that the final product is solvent soluble.

Example 2

Silylation Procedure

An ethanolic solution of copolymer 2400 was first prepared in a large test tube composed of 0.20 g copolymer 1400 dissolved within 2.00 g denatured ethanol. The solution was carefully heated and ultrasonicated until a clear polymer solution resulted. Care was made to prevent ethanol solvent loss.

0.20 g of Silquest A-187 (Gamma-Glycidoxypropyltrimethoxysilane: Momentive Performance Materials) was added and the resultant solution was briefly mixed and heated until a slight reflux (with heat gun) occurred. This enabled the ring opening reaction and grafting of the epoxy silane ester onto the polymer backbone.

Finally, 2.50 g of deionized water was added to the solution along with 2.50 g of a 5 wt. % aqueous $NH_4OH$ solution accompanied by stirring. The active concentration within the resultant solution was 27,027 ppm. Finally isopropanol was added to this solution such that it was present in a 30 weight % overall concentration. This solution was then coated upon a variety of formica, stainless steel and glass coupons which were later submitted for antimicrobial testing.

Applicant has determined certain antimicrobial test results for copolymer 2600 against both gram positive and gram negative organism contaminants treated upon a variety of common material surfaces. These two candidate bacteria bear strong similarity to common odor causing bacteria and hence are often used as probes to determine whether or not a given candidate disinfectant composition has odor elimination properties. The testing results detailed herein demonstrate that copolymer 2600 is effective against odor causing bacteria.

The silylated copolymer of Example II hereinabove was dissolved in isopropanol (IPA) to give a 30% w/v (IPA) solution. This IPA solution was then diluted to a 0.1% w/v concentration with additional IPA solvent.

2"×2" test coupons of Formica and 316 Stainless Steel were first washed with soap and water then wiped with a 70 wt. % aqueous ethanol solution and dried. The copolymer 2600 solution was applied via misting onto the coupon surfaces using a Preval sprayer. The surfaces of the coupons were sprayed until completely covered by the copolymer solution and then dried horizontally for >3 hr. at room temperature. Control coupons were sprayed with 30 wt. % aqueous IPA solution followed by drying under identical conditions. The final areal concentration of the dried copolymer on the test coupon surface was 0.0299 g/m2. All coupons were then irradiated with a C wavelength germicidal Ultraviolet Lamp (UVC) situated within a biosafety cabinet. As a point of comparison, a similar series of test coupons were treated with a 3.5 wgt. % solution of AEGIS AEM 5772-5 3-(trihydroxysilyl) propyldimethyloctadecyl ammonium chloride (3.6 wgt. % active) commercial quaternary ammonium silane ester surface graftable antimicrobial biocide. The final surface concentration of the quaternary ammonium biocide after solution drying was 2.36 g/m2.

An overnight culture of bacteria in 100 ml nutrient broth was spun and washed with 50 ml sterile PBS. The wash step was performed once more and the culture was spun again. The pellet was reconstituted in 10 ml PBS then used to inoculate 10 ml of PBS to a MacFarland standard of 1 (47% transmittance). The amount required to bring 10 ml to 47% transmittance was added to a total volume of 1 ml to create an inoculum of ~1×10 E09 Colony Forming Units (CFU)/ml. 100 ul of inoculum was pipetted onto each coupon and spread with a sterile glass rod to cover the surface of the coupon. After either 10, 12 or 20 minutes, a swab pre-moistened with sterile PBS was swabbed across the surface of the coupon. The swab was placed in 2 ml of DE neutralizer broth, vortexed for 30 seconds then serially diluted and plated onto trypticase soy agar. Plates were incubated at 37° C. overnight prior to counting. Experiments were performed in triplicate.

Antimicrobial; testing was performed by Applicant and independently by Professor. Charles Gerba, Ph.D. As a control, Applicant also determined the antimicrobial properties of a material sold in commerce by Aegis under the tradename AEM 5772-5.

| Antimicrobial Test Results Obtained By Applicant Stainless Steel 2" × 2" Coupons | | |
|---|---|---|
|  | Ave. $Log_{10}$ Reduction ± SD v. control 10 min exposure | Ave. $Log_{10}$ Reduction ± SD v. control 12 min exposure |
| Applicant's Copolymer 2600 | | |
| Klebsiella pneumoniae ATCC 4352[a] | — | 5.10 ± 1.72 |
| Staphylococcus aureus ATCC 6538[b] | >6.67 ± 0.00 | — |
| Aegis Quaternary Ammonium Silane | | |
| Klebsiella pneumoniae ATCC 4352[a] | — | 1.15 ± 0.26 |
| Staphylococcus aureus ATCC 6538[b] | 0.00 | — |

[a] Challenged with $3.8 \times 10^7$ bacteria
[b] Challenged with $1.1 \times 10^7$ bacteria

| Independent Antimicrobial Testing Performed at University of Arizona Formica 2" × 2" Coupons | | |
|---|---|---|
|  | Ave. $Log_{10}$ Reduction ± SD 10 min exposure | Ave. $Log_{10}$ Reduction ± SD 20 min exposure |
| Applicant's Copolymer 2600 | | |
| Klebsiella pneumoniae ATCC 4352[a] | — | >4.13 ± 0.00 |
| Klebsiella pneumoniae ATCC 4352[b] | 4.57 ± 0.66 | — |
| Staphylococcus aureus ATCC 6358[c] | >6.10 ± 0.00 | — |

[a] Challenged with $5.5 \times 10^6$ bacteria
[b] Challenged with $4.9 \times 10^7$ bacteria
[c] Challenged with $1.1 \times 10^7$ bacteria Confirmatory antimicrobial testing was conducted upon stainless and formica test specimens treated with Applicant's copolymer 2600 by Professor Charles Gerba at the University of Arizona Department of Soil, Water & Environmental Science. The results are summarized in the table below.

Verification that Silylated Copolymer 2600 Is Non-Leaching When Coated Upon Surfaces

| Pathogen | Initial Challenge (CFU/ml) | Exposure Time (Minutes) | Log Kill (Stainless Steel Substrate) | Log Kill (Formica Substrate) |
|---|---|---|---|---|
| K. pneumoniae | 3.1 × 10E 07 | 12 | 3.1 | 3.7 |
| K. terrigena | 1.0 E 05 | 30 | >4.4 | >4 |
| B. Globigii Spores | 8.6 × 10E 07 | 10 | 1.4 | 1.7 |

The non leaching behavior of Applicant's copolymer 2600 were also verified via ASTM E2149-01 Antimicrobial Activity of Immobilized Antimicrobial Agents Under Dynamic Contact Conditions Test procedure. In this case, the above mentioned alcoholic solution of the copolymer 2600 was spray coated upon Kappler Provent 10,000 polyolefin protective garment fabric whose surface had been pre-primed with dried layers of W281-F polyurethane followed by a mixture of epoxypropyltrimethoxysilane/Aluminum Phthalocyanine hydrolyzate.

Microbiological test conditions were done according to the ASTM Standard whereby a bacterial lawn of *Klebsiella pneumoniae* (ATCC 4352) was first prepared and an 8 mm diameter plug cut out of plate. Thereafter, 1004 of broth solution from shaking flasks was then deposited into plug hole. No zone of inhibition was observed in the plates after incubation which verified that the Applicant's silylated copolymer 2600 did not leach from the fabric and was firmly attached to the its surface. Further comparative testing to verify that copolymer 2600 did not leach from treated fabric. In particular, swatches of 3 inch square fabric were separately treated with an 111.11 microgram/square inch loading of copolymer 2600 versus Teflex polyhexamethyleneguanidine hydrochloride (PHMG) homopolymer. Leaching testing was then conducted according to the ASTM E 2149 Method using a 1×10 E 05 CFU/ml initial challenge of *K. pneumoniae*. Wash water from the initial washing was tested for the presence of solubilized cationic guanidinium polymers (e.g. copolymer 2600 or Teflex) via addition of Eosin Y indicator to the respective wash solutions followed by UV Spectral Analysis. In the presence of guanidinium moieties, Eosin Y forms a strongly colored solution complex having a maximum absorption at 540 nm. UV Spectral analysis revealed that no Eosin Y-Guanidinium complex was detected in the aqueous solution used to wash copolymer 2600 treated fabric whereas a 3.75 micrograms/milliliter of Eosin Y-Guanidinium complex solute was detected after washing the Teflex treated fabric sample for 5 minutes. These results further supported the position that silylated copolymer 2600 was non-leaching and indeed firmly bound to the fabric surface.

Applicant's verified test results demonstrate that Applicant's copolymer 2600 kills 99.999% of gram negative and >99.9999% of gram positive bacteria on formica and stainless steel surfaces in less than 12 minutes of exposure to the treated surfaces. In addition, testing also verified that the copolymer 2600 maintained its antimicrobial/antipathogenic efficacy and did not leach when firmly attached upon textile surfaces.

While the invention is described through the above-described exemplary embodiments, it will be understood by those of ordinary skill in the art that modifications to, and variations of, the illustrated embodiments may be made without departing from the inventive concepts disclosed herein. For example, although some aspects of making and using Applicant's antipathogenic composition has been described, those skilled in the art should readily appreciate that functions, operations, decisions, etc., of all or a portion of each step, or a combination of steps, of the series of steps described may be combined, separated into separate operations or performed in other orders. Moreover, while the embodiments are described in connection with various illustrative structures and functional groups, one skilled in the art will recognize that the antipathogenic composition can be embodied using a variety of related structures and functional groups. Furthermore, disclosed aspects, or portions of these aspects, may be combined in ways not listed above. Accordingly, the invention should not be viewed as being limited to the disclosed embodiment(s).

The present invention may be embodied in other specific forms without departing from its spirit or essential characteristics. The described implementations are to be considered in all respects only as illustrative and not restrictive. The scope of the invention should, therefore, be determined not with reference to the above description, but instead should be determined with reference to the pending claims along with their full scope or equivalents, and all changes which come within the meaning and range of equivalency of the claims are to be embraced within their full scope.

I claim:

1. An antipathogenic copolymer, comprising a structure:

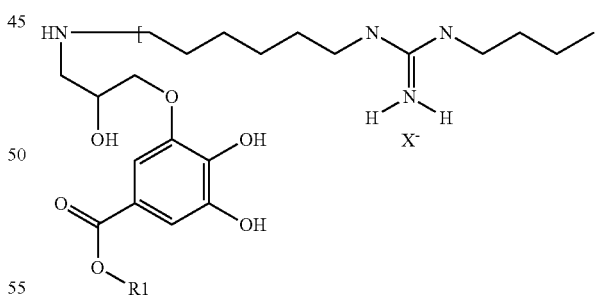

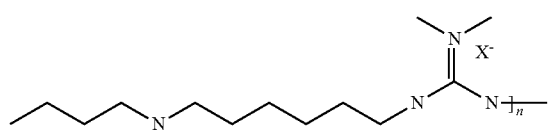

wherein R1 is alkyl and n is between 1 and 100 and wherein $X^-$ is an anion.

2. An antipathogenic copolymer, comprising a structure:
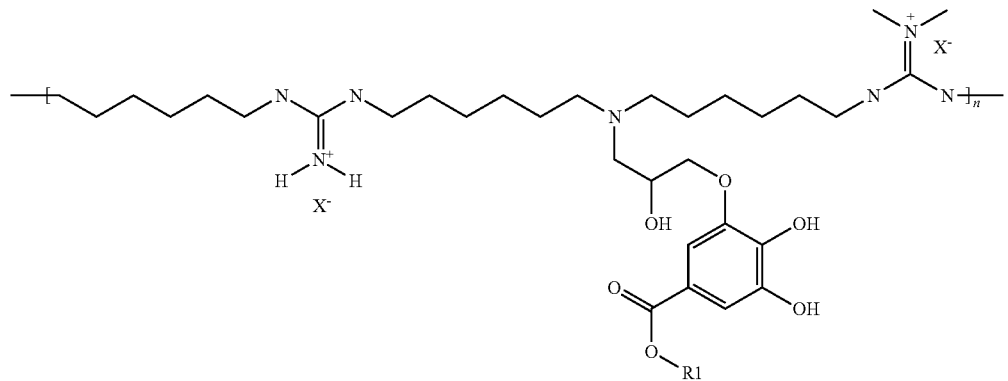
wherein R1 is alkyl and n is between 1 and 100 and wherein $X^-$ is an anion.
3. An antipathogenic copolymer, comprising a structure:
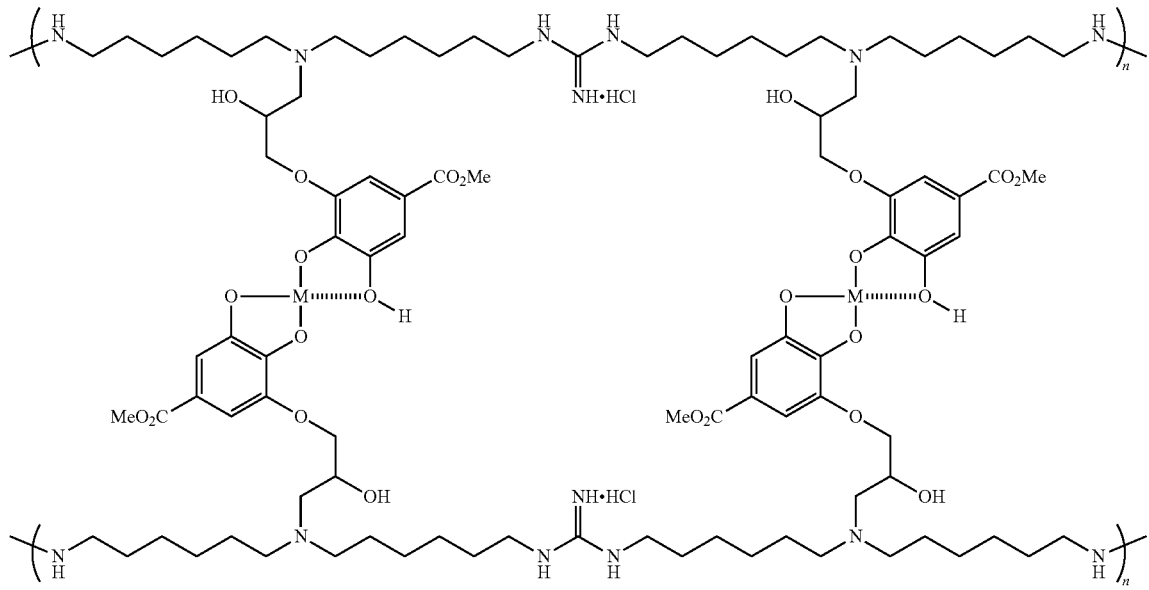
wherein M is selected from the group consisting aluminum, iron, boron, silicon, titanium, zirconium, and salts thereof and n is between 1 and 100.

4. An antipathogenic copolymer comprising a structure:
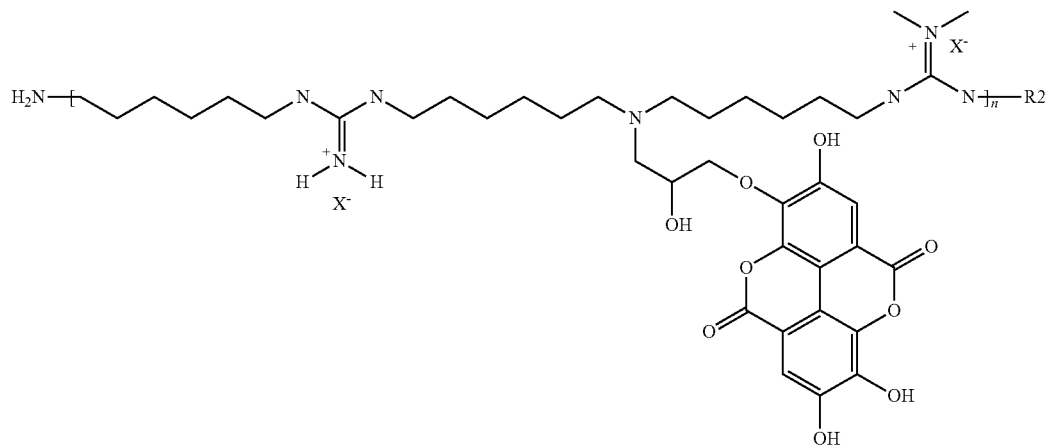
wherein n is between 1 and 100, and R2 is NH$_2$ and wherein X$^-$ is an anion.
5. An antipathogenic copolymer comprising a structure:
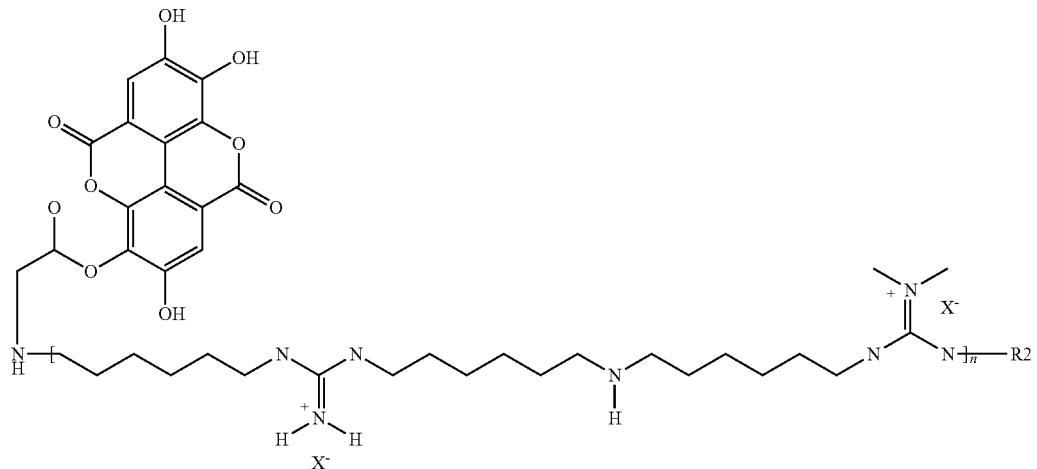
wherein n is between 1 and 100 and R2 is NH$_2$ and wherein X$^-$ is an anion.
* * * * *